US009974244B2

(12) United States Patent
Hu

(10) Patent No.: US 9,974,244 B2
(45) Date of Patent: May 22, 2018

(54) SYSTEM FOR TAPPING AND COLLECTING RUBBER

(71) Applicant: Hanmin Hu, Riverdale, MD (US)

(72) Inventor: Hanmin Hu, Riverdale, MD (US)

( * ) Notice: Subject to any disclaimer, the term of this patent is extended or adjusted under 35 U.S.C. 154(b) by 88 days.

(21) Appl. No.: 15/483,949

(22) Filed: Apr. 10, 2017

(65) Prior Publication Data
US 2018/0049379 A1 Feb. 22, 2018

Related U.S. Application Data

(60) Provisional application No. 62/376,394, filed on Aug. 18, 2016.

(51) Int. Cl.
A01G 23/10 (2006.01)
A01G 23/12 (2006.01)
A01G 23/14 (2006.01)

(52) U.S. Cl.
CPC ............ A01G 23/12 (2013.01); A01G 23/10 (2013.01); A01G 23/14 (2013.01)

(58) Field of Classification Search
CPC ................................ A01G 23/10; A01G 23/12
USPC ........... 47/10, 12; 30/121; 144/208.1, 208.2, 144/208.6, 208.8, 24.13
See application file for complete search history.

(56) References Cited

U.S. PATENT DOCUMENTS 1,068,497 A    7/1913  Graves
2,612,724 A *  10/1952 Llewellyn .............. A01G 23/08
                                                    144/208.2
5,301,459 A *  4/1994  Eliachar ................. A01D 46/20
                                                    144/208.2
5,438,793 A *  8/1995  Eliachar ................. A01D 46/20
                                                    144/208.2
6,453,604 B1 * 9/2002  Barranx ................. A01G 23/14
                                                    47/10
7,841,373 B2 * 11/2010 Rastatter ................... B27C 5/08
                                                    144/162.1

(Continued)

FOREIGN PATENT DOCUMENTS

CN      103415200 A    11/2013
CN      2039562000     11/2014

(Continued)

OTHER PUBLICATIONS

Video of Rubber Tapping Machines by Students of Mechanical Engineering, St. Joseph's College of Engineering and Technology, Palai, published on Mar. 25, 2011. https://youtu.be/4B4ZuwYTwug.

Primary Examiner — David Parsley
Assistant Examiner — Danielle Clerkley
(74) Attorney, Agent, or Firm — Winston & Strawn LLP

(57) ABSTRACT

The present invention relates to a system for tapping and collecting rubber. The system includes a tapping apparatus for tapping rubber and a collecting apparatus for collecting tapped rubber. The tapping apparatus includes a rail directing a drill bit or blade to move between one end of the rail to another end of the rail and to remove tree bark during the movement and a mounting structure configured to hold the rail and connect the tapping apparatus to a tree or plant. The collecting apparatus is positioned below the tapping apparatus for collecting rubber that exudes from a cut tree or plant. The collecting apparatus includes a slide and a tube having an opening and a divider that separates the tube into multiple sections.

18 Claims, 41 Drawing Sheets

(56) References Cited

U.S. PATENT DOCUMENTS

| | | | |
|---|---|---|---|
| 2007/0181217 A1* | 8/2007 | Ahdoot | A01G 23/0955 144/208.2 |
| 2013/0032045 A1 | 2/2013 | Li et al. | |
| 2015/0034209 A1 | 2/2015 | Davis | |

FOREIGN PATENT DOCUMENTS

| | | |
|---|---|---|
| CN | 104429813 A | 3/2015 |
| CN | 106718653 A | 5/2017 |
| FR | 2491290 A1 | 4/1982 |
| WO | WO2012017450 A2 | 2/2012 |
| WO | WO2011089467 A1 | 9/2012 |
| WO | WO2012121586 A1 | 9/2012 |

* cited by examiner

SYSTEM FOR TAPPING AND COLLECTING RUBBER

CROSS-REFERENCE TO RELATED APPLICATIONS

This application claims the benefit of U.S. Provisional Application 62/376,394 filed Aug. 18, 2016, the entirety of which is herein incorporated by reference.

FIELD OF THE INVENTION

The present invention relates to a system for tapping and collecting rubber, and particularly to a system comprising a tapping apparatus for tapping rubber and a collecting apparatus for collecting rubber.

BACKGROUND OF THE INVENTION

Rubber is an important raw material. Items such as vehicle tires, footwear, and conveyor belts, and industries such as aerospace, defense, and pharmaceutical industries are all inseparable from rubber. Due to high demand of rubber in recent years, countries around the world have been increasing rubber production in parity. Tapping trees for rubber in forest, however, is time consuming and labor intensive. The work area is also confined because of the remote location and density of multiple trees within forested farms where rubber is obtained. As such, there is a shortage of laborers in this field. Even if laborers are available, they may not be skilled enough to tap rubber efficiently and may not want to stay in the forest too long. Additionally, finding skilled laborers may be burdensome and may require higher compensation. While there are numerous tools available on the market to reduce the amount of labor and time required for tapping and collecting rubber, none of them is effective.

Accordingly, there remains a need for a system that is improved over what is known in the art and that solves the deficiencies of the tools currently on the market. Such a system should be inexpensive to manufacture, and should tap and collect rubber from trees automatically and efficiently.

SUMMARY OF THE INVENTION

In accordance with a first preferred embodiment of the present invention, a system for tapping and collecting rubber is contemplated. The system may comprise a tapping apparatus comprising a first rail, a second rail, a third rail, a cutter between the first and the second rail for contacting and cutting into a rubber tree, wherein the cutter comprising a first larger tubing section, a second smaller tubing section, and a blade, a mounting structure including a first structure holding the first rail, the second rail, the third rail, and the cutter at an angle and a second structure holding the first structure. The first structure may comprise a beam, a first set of legs connected perpendicularly to the beam, and a second set of legs connected perpendicular to the beam. The first set of legs connect the first rail and the second rail to the beam and the second set of legs connect the third rail to the beam. The second structure may comprise a first ring, a first beam connected to the first ring, a second ring, a second beam connected to the second ring, and a pillar connecting the first beam and the second beam. The system may also comprise a collecting apparatus positioned below the tapping apparatus.

In one variation of the first preferred embodiment, the system may further comprise a threaded member between the second structure allowing the first structure to move in longitudinal direction of a tree. The threaded member, in one embodiment, may be a screw or other external male thread.

In one variation of the first preferred embodiment, the threaded member may be parallel to the pillar.

In one variation of the first preferred embodiment, the threaded member and the pillar may have identical length measured from the first beam to the second beam.

In one variation of the preferred embodiment, the cutter may physically contact the third rail.

In one variation of the first preferred embodiment, the first rail, the second rail, and the third rail may be parallel.

In one variation of the first preferred embodiment, the first rail, the second rail, and the third rail may have a curvature of a circle.

In one variation of the first preferred embodiment, the collecting apparatus may comprise a slide, a tube, one or more brackets holding the tube, a conduit between the slide and the tube. The tube may be movable within the one or more brackets.

In accordance with a second preferred embodiment of the present invention, a system for tapping and collecting rubber is contemplated. The system may comprise a tapping apparatus comprising a first rail, a second rail, a third rail, and a cutter for contacting and cutting into a rubber tree located between the first and the second rail and physically contacting the third rail, wherein the cutter comprising a first larger tubing section, a second smaller tubing section, and a blade. The first rail, the second rail, the third rail may be parallel and have a curvature of a circle. The system may also comprise a collecting apparatus comprising a slide, a tube including a plurality of arms, one or more brackets holding the tube with each bracket including a trench accommodating the plurality of arms, and a conduit between the slide and the tube comprising a larger tubing section and a plurality of smaller tubing sections, the larger tubing section is closer to the slide and the plurality of smaller tubing sections are closer to a surface of the tube.

In one variation of the second preferred embodiment, the tube may be movable within the one or more brackets.

In one variation of the second preferred embodiment, the surface of the tube may comprise a door.

In one variation of the second preferred embodiment, the plurality of smaller tubing sections may be extendable into the tube.

In one variation of the second preferred embodiment, the plurality of arms may comprise a first set of arms and a second set of arms.

In one variation of the second preferred embodiment, the one or more brackets may be a pair of brackets. The pair of brackets may further have a pair of trenches with each trench accommodating each set of arms.

In one variation of the second preferred embodiment, the conduit may be situated between the pair of brackets without contacting the pair of brackets.

In one variation of the second preferred embodiment, the tapping apparatus and the collecting apparatus may be connected by wires.

In one variation of the second preferred embodiment, the system may further comprise a control system moving the tube to a large container.

In accordance with a third preferred embodiment of the present invention, a system for tapping and collecting rubber is contemplated. The system may comprise a tapping apparatus comprising a first rail, a second rail, a third rail, a cutter between the first and the second rail for contacting and cutting into a rubber tree, with the cutter comprising a first larger tubing section, a second smaller tubing section, and a blade; and a mounting structure including a first structure holding the first rail, the second rail, the third rail, and the cutter at an angle and a second structure holding the first structure. The first structure may comprise a beam, a first set of legs connected perpendicularly to the beam, and a second set of legs connected perpendicular to the beam, the first set of legs connecting the first rail and the second rail to the beam and the second set of legs connecting the third rail to the beam. The second structure may comprise a first ring, a first beam connected to the first ring, a second ring, a second beam connected to the second ring, and a pillar connecting the first beam and the second beam.

In accordance with a fourth preferred embodiment of the present invention, a system for tapping and collecting rubber is contemplated. The system may comprise a collecting apparatus for collecting rubber that exudes from a cut rubber tree, the apparatus may comprise a slide, a tube including a plurality of arms, one or more brackets holding the tube with each bracket including a trench accommodating the plurality of arms, and a conduit between the slide and the tube comprising a larger tubing section and a plurality of smaller tubing sections, the larger tubing section is closer to the slide and the plurality of smaller tubing sections are closer to a surface of the tube. The tube may be movable within the one or more brackets.

In accordance with a fifth preferred embodiment of the present invention, a system for tapping and collecting rubber is contemplated. The system may comprise a cutter for contacting and cutting into a rubber tree, wherein the cutter comprising a first tubing section, a second tubing section, a blade, a blade aligning mechanism, and a pin. The first tubing section may be larger than the second tubing section and the second tubing section may be movable within the first tubing section. The first tubing section may have a section with a plurality of teeth. The second tubing section may be an intermediary component between the first tubing section and the blade aligning mechanism and have a hollow interior to accommodate the blade aligning mechanism. The blade aligning mechanism may comprise a first leg, a second leg, and a blade pusher. The blade pusher may comprise a threaded member and a rotating device. The threaded member may have a first end connecting to the blade and a second end connecting to the rotating device. The second end may have a truncated cone configuration and the rotating device may also have a truncated cone configuration.

In accordance with a sixth preferred embodiment of the present invention, a system for tapping and collecting rubber from rubber trees is contemplated. The system may comprise a collecting apparatus for collecting rubber that exudes from a cut rubber tree. The apparatus may comprise a tube including a plurality of dividers dividing the tube into sections, each of the dividers having an upper portion and a lower portion with the upper portion being moveable toward the lower portion, a conduit, and a device configured to move the conduit into and out of the tube. The device may comprise a beam, a wire, and a set of columns, the beam may have an end in contact with the tube and another end connected to the wire, and the set of columns connect the beam, the wire, and the conduit together. Movement of the tube may cause the beam to move away and toward the tube and the conduit to move into and out of the tube.

In accordance with a seventh preferred embodiment of the present invention, a system for tapping and collecting rubber from rubber trees is contemplated. The system may comprise a tapping apparatus comprising a blade aligning mechanism that may include a first leg, a second leg, a blade adjuster connecting the first leg and the second leg, and a blade attached to the blade adjuster. The first leg may include a first elongated member and a pad and the second leg including a second elongated member and a pad. The blade adjuster may be configured to position tip of the blade and bottommost surface of the pad of the first leg parallel to each other, move the first leg and the blade simultaneously, and align the tip of the blade and the bottommost surface of the pad of the first leg in straight line. The blade adjuster may further comprise a spring exerting an amount of force on the pad of the first leg and the blade that extends the pad of the first leg and the blade to a position according to the distance between a surface and the blade adjuster.

In one variation of the seventh preferred embodiment, the blade adjuster may further comprise an opening accommodating the first leg and the first leg is moveable in the opening.

In one variation of the seventh preferred embodiment, the blade adjuster may further comprise a control configured to adjust the distance between the pad of the first leg and the blade and a surface.

In one variation of the seventh preferred embodiment, the control may be further configured to adjust an angel between the blade and a surface the blade is cutting.

In one variation of the seventh preferred embodiment the tapping apparatus may further comprise a mounting structure having a first ring, a first beam, and a threaded member.

In one variation of the seventh preferred embodiment, the threaded member may be configured to move the first beam and the first ring along the length of a tree and adjust the first beam and the first ring to accommodate the curvature of tree trunk.

In one variation of the seventh preferred embodiment, the first beam and the threaded member are adjustable to the thickness of tree trunk.

In accordance with an eighth preferred embodiment of the present invention, a system for tapping and collecting rubber from rubber trees is contemplate. The system may comprise an tapping apparatus and a collecting apparatus positioned below the tapping apparatus for collecting rubber that exudes from a cut rubber tree. The tapping apparatus may comprise a first rail, a second rail, a third rail, and a mounting structure including a first structure holding the first rail, the second rail, and the third rail at an angle and a second structure holding the first structure. The first structure may comprise a beam, a first set of legs connected perpendicularly to the beam, and a second set of legs connected perpendicular to the beam, the first set of legs connecting the first rail and the second rail to the beam and the second set of legs connecting the third rail to the beam. The second structure may comprises a first ring, a first beam connected to the first ring, a second ring, a second beam connected to the second ring, and a pillar connecting the first beam and the second beam. The collecting apparatus may comprise a slide, a tube including a plurality of arms, one or more brackets holding the tube with each bracket including a trench accommodating the plurality of arms, and a conduit between the slide and the tube.

In one variation of the eighth preferred embodiment, the tapping apparatus may further comprise a cutter between the first rail and the second rail for contacting and cutting into a rubber tree.

In one variation of the eighth preferred embodiment, the cutter may comprise a first larger tubing section, a second smaller tubing section, and a blade.

In one variation of the eighth preferred embodiment, the cutter may physically contact the third rail.

In one variation of the eighth preferred embodiment, the cutter may further comprise a blade aligning mechanism. The blade aligning mechanism may have a first leg, a second leg, and a blade pusher. The blade pusher may have a threaded member and a rotating device. The threaded member may have a first end connecting to the blade and a second end connecting to the rotating device. The second end may have a truncated cone configuration and the rotating device may also have a truncated cone configuration.

In one variation of the eighth preferred embodiment, the cutter may further comprise a blade aligning mechanism. The blade aligning mechanism may comprise a first leg, a second leg, a blade adjuster connecting the first leg and the second leg, and a blade attached to the blade adjuster. The first leg may include a first elongated member and a pad and the second leg includes a second elongated member and a pad.

In one variation of the eighth preferred embodiment, the blade adjuster may be configured to position tip of the blade and bottommost surface of the pad of the first leg parallel to each other, move the first leg and the blade simultaneously, and align the tip of the blade and the bottommost surface of the pad of the first leg in straight line. The blade adjuster may further comprise a spring exerting an amount of force on the pad of the first leg and the blade that extends the pad of the first leg and the blade to a position according to the distance between a surface and the blade adjuster.

In one variation of the eighth preferred embodiment, the blade adjuster comprises an opening accommodating the first leg and the first leg is moveable in the opening.

In one variation of the eighth preferred embodiment, the blade adjuster may comprise a control configured to adjust the distance between the pad of the first leg and the blade and a surface. The control may be further configured to adjust an angel between the blade and a surface the blade is cutting.

In one variation of the eighth preferred embodiment, the tube may be movable within the one or more brackets.

In one variation of the eighth preferred embodiment, the conduit may comprise a larger tubing section and a plurality of smaller tubing sections. The plurality of smaller tubing sections may be extendable into the tube.

In one variation of the eighth preferred embodiment, the plurality of arms may comprise a first set of arms and a second set of arms and the one or more brackets is a pair of brackets. The pair of brackets may have a pair of trenches with each trench accommodating each set of arms. The conduit may be situated between the pair of brackets without contacting the pair of brackets.

In one variation of the eighth preferred embodiment, the system may further comprise a control system moving the tube to a large container.

In one variation of the eighth preferred embodiment, the system may further comprise a device configured to move the conduit into and out of the tube, the device comprising a beam, a wire, and a set of columns, the beam having an end in contact with the tube and another end connected to the wire, the set of columns connecting the beam, the wire, and the conduit together, and movement of the tube causes the beam to move away and toward the tube and the conduit to move into and out of the tube In accordance with a ninth preferred embodiment, a system for tapping and collecting liquid from trees or plants is contemplated. The system may comprise a tapping apparatus. The tapping apparatus may include a rail directing a drill bit to move between one end of the rail to another end of the rail and to remove tree bark during the movement and a mounting structure configured to hold the rail and connect the tapping apparatus to a tree or plant. The mounting structure may include a pair of beams sandwiching the rail, a first ring with a first beam, a second ring with a second beam, and multiple rods extending between the pair of beams and through the rail. The first ring with the first beam is connected to one of the pair of beams and the second ring with the second beam is connected another one of the pair of beams.

In one variation of the ninth preferred embodiment, one of the multiple rods is a screw or other external male thread and is oriented parallel to other rods in the multiple rods.

In one variation of the ninth preferred embodiment, the rail includes a track having a plurality of teeth.

In one variation of the ninth preferred embodiment, the tapping apparatus further comprises a track engaging mechanism that connects the drill bit to the track, the track engaging mechanism includes a pair of parallel plates, a gear connecting the pair of parallel plates, and the plates and the gear include a space to accommodate the track.

In one variation of the ninth preferred embodiment, one of the multiple rods includes a wheel adjacent to the track, the wheel and track provides a space in between allowing one of the plates to pass through while the drill bit is moved between one end of the rail to another end of the rail.

In one variation of the ninth preferred embodiment, the rail further includes a pair of gears connected by a rod extending through the rail.

In one variation of the ninth preferred embodiment, one of the gears engages with the track engaging mechanism when the drill bit is directed to another end of the rail.

In one variation of the ninth preferred embodiment, another one of the gears is connected a plate via one or more tubes.

In one variation of the ninth preferred embodiment, the plate engages with the drill bit when the drill bit is directed to another end of the rail.

In one variation of the ninth preferred embodiment, the drill bit and the track engaging mechanism are connected by a drill aligning mechanism, the drill aligning mechanism includes a first leg with one end attached to the track engaging mechanism and another end attached to the drill bit and a second leg with one end attached to the track engaging mechanism and another end attached to a device configured to adjust height of the drill bit.

In one variation of the ninth preferred embodiment, the drill bit and the track engaging mechanism are connected by a blade aligning mechanism, the blade aligning mechanism includes a first leg, a second leg, and a blade pusher, the blade pusher comprising a threaded member and a rotating device, the threaded member has a first end connecting to the blade and a second end connecting to the rotating device, the second end has a truncated cone configuration, and the rotating device has a truncated cone configuration.

In one variation of the ninth preferred embodiment, the system further comprises a collecting apparatus positioned below the tapping apparatus for collecting rubber that exudes from a cut tree or plant. The collecting apparatus comprises a slide and a tube having an opening and a divider that separates the tube into multiple sections.

In one variation of the ninth preferred embodiment, the opening is aligned with the tapping apparatus to receive exuded rubber.

In one variation of the ninth preferred embodiment, the divider is movable within the tube between a closed position and an open position.

In one variation of the ninth preferred embodiment, the divider is moved away from the opening in the closed position.

In one variation of the ninth preferred embodiment, the divider is moved toward the opening in the open position.

In one variation of the ninth preferred embodiment, the divider is movable between the closed position and the open position in response to operation of a pressure generator.

In one variation of the ninth preferred embodiment, the divider further includes a protrusion that blocks exuded rubber from entering the tube when the divider is in the open position.

In one variation of the ninth preferred embodiment, the system further comprises a wire connecting the tapping apparatus and the collecting apparatus.

In one variation of the ninth preferred embodiment, the wire controls the movement of the drill bit.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION OF THE INVENTION

Figure 1:
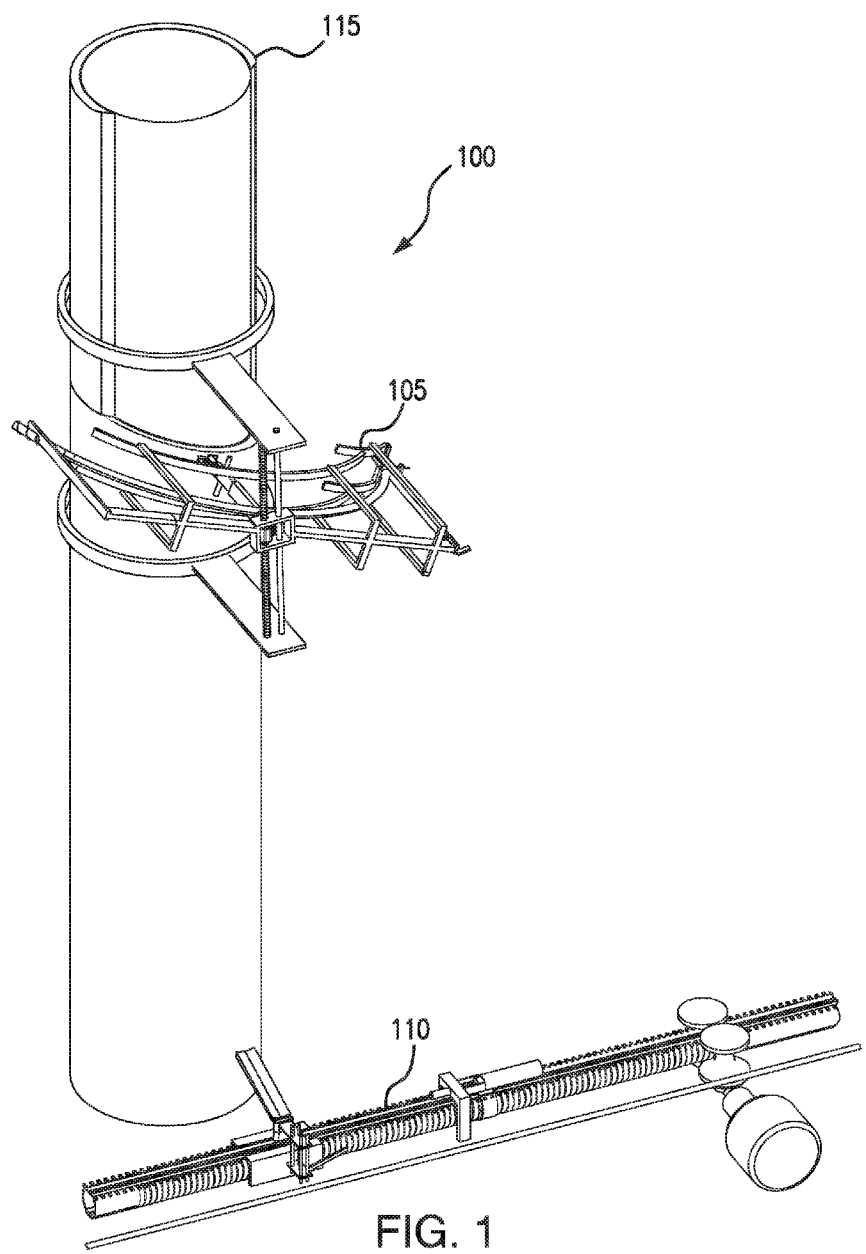
FIG. 1 depicts an illustrative system for tapping and collecting rubber in accordance with some embodiments of the present invention.

Referring to FIG. 1, one embodiment of the system 100 for tapping and collecting rubber is illustrated. The system 100 may comprise a tapping apparatus 105 for tapping rubber and collecting apparatus 110 for collecting rubber. The tapping apparatus 105 may be mounted on a trunk 115 of a tree that produces rubber, a stem of a plant that produces rubber, or any part of a plant that produces rubber. The collecting apparatus 110 may be placed in a location or in a manner such that it can receive rubber tapped by the tapping apparatus 105. In a preferred embodiment, the collecting apparatus 110 is positioned below the tapping apparatus 105 and is closer to the roots of the tree or plant compared to the tapping apparatus 105. Although the system 100 is described with respect rubber tree and rubber in this application, it may also be employed on other trees and other substances.

Figure 2:
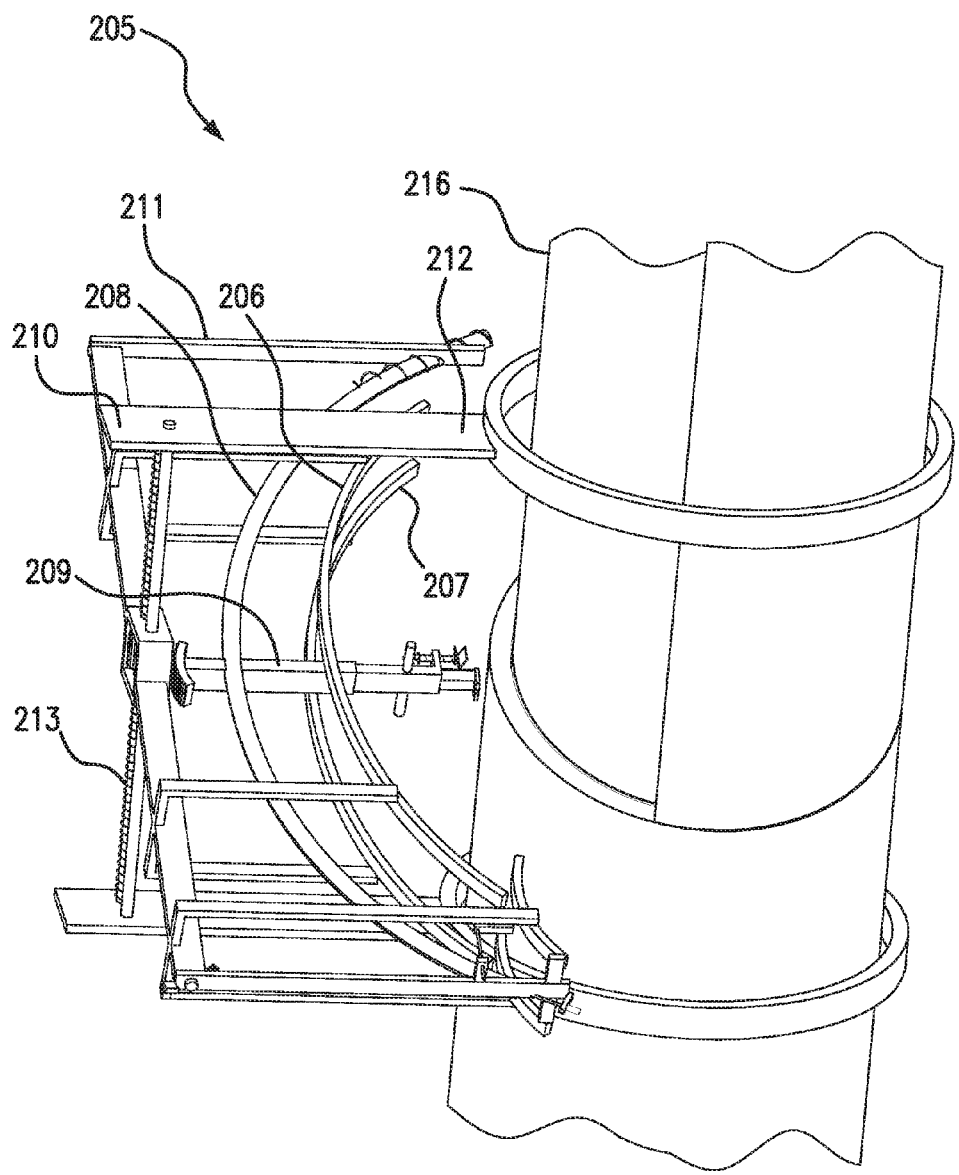
FIG. 2 depicts an illustrative tapping apparatus for tapping rubber in accordance with some embodiments of the present invention.
Figure 3A:
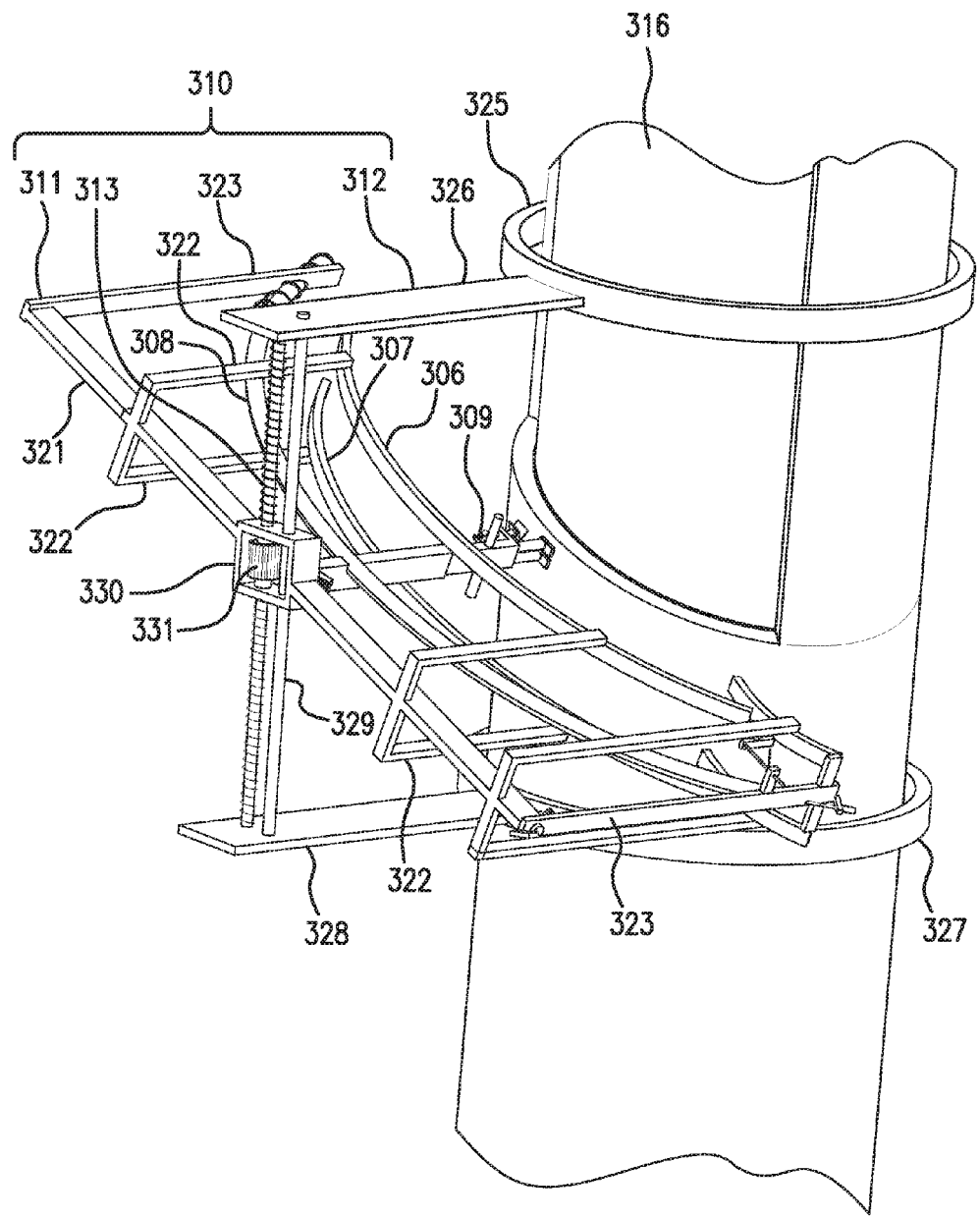
FIG. 3a depicts the illustrative tapping apparatus disclosed in FIG. 2 from a different viewing angle.

Referring to FIG. 2, one embodiment of the tapping apparatus 205 for tapping rubber is illustrated. The tapping apparatus 205 may comprise a first rail 206, a second rail 207, a third rail 208, a cutter 209 between the first rail 206 and the second rail 207 and physically contacting the third rail 208, and a mounting structure 210 including a first structure 211 holding the first rail 206, the second rail 207, the third rail 208, and the cutter 209 at an angle, a second structure 212 holding the first structure 212 (or holding the first structure 212 to a trunk 216 of a tree), and a threaded member 213 between the second structure 212 allowing the first structure 211 to move in a vertical direction of tree, a longitudinal direction of the tree, or up and down along the tree. The first rail 206, the second rail 207, and the third rail 208 should have a curvature matching to the contour of the trunk 216 of the tree or a curvature of a circle. Each of the first rail 206, the second rail 207, and the third rail 208 may have a curvature parallel to each other's curvature. The angle is greater than zero or unparalleled to the ground to which the tree is planted. The first and second rails 206, 207 are closer to the trunk 216 compared to the third rail 208. Since the first structure 211 holds the rails 206-208 and the cutter 209, moving the first structure 211 in the vertical direction also moves the rails 206-208 and the cutter 209 in the vertical direction. The first rail 206, second rail 207, and third rail 208 may have a circular, rectangular, square, or other shaped cross-section throughout their entire curvature or length. Preferably, the first rail 206 and second rail 207 have a rectangular cross-section and the third rail 208 has a circular cross-section. The circular cross-section facilitates the movement of the cutter 209 on the third rail 208. FIG. 3a depicts the embodiment disclosed in FIG. 2 from a different viewing angle to show the detail configuration of the mounting structure 310. Reference number 311 represents the first structure, reference number 312 represents the second structure, and reference number 313 represents the threaded member.

The first structure 311 may comprise a beam 321, a first set of legs 322 connected perpendicularly to the beam 321, and a second set of legs 323 connected perpendicularly to the beam 321. The first set of legs 322 may connect the first rail 306 and the second rail 307 to the beam 321. In a preferred embodiment, the first set of legs 322 may connect the first rail 306 and the second rail 307 to the beam 321 without contacting the third rail 308. The second set of legs 323 may connect the third rail 308 to the beam 321. In a preferred embodiment, the second set of legs 323 may connect the third rail 308 to the beam 321 without contacting either the first rail 306 or the second rail 307 or both the first rail 306 and the second rail 307. The beam 321, the first set of legs 322, and the second set of legs 323 hold the rails 306-308 and the cutter 309 at an angle with support from the second structure 312.

The second structure 312 may comprise a first ring 325, a first beam 326 connected to the first ring 325, a second ring 327, a second beam 328 connected to the second ring 327, and a pillar 329 connecting the first beam 326 and the second beam 328. The rings 325, 327 are connected to the trunk 316 of the tree, and the first beam 326 and the second beam 328 are aligned such that the first beam 326 is directly above the second beam 328 (or that the second beam 328 is directly below the first beam 326). The first structure 311 is between the pillar 329 and the tree 316 and between the first beam 326 and the second beam 328. The first ring 325 and the second ring 327 may have a configuration or design allowing them to be connected to the trunk 316. For example, each of the first ring 325 and the second ring 327 may be disconnected and connected at a region on the perimeter. When the ring is disconnected, the ring is open and can circumscribe the trunk. The ring is connected or closed after the ring is placed on the trunk. The ring and/or the associated beam (e.g., 326 or 328) may further include mechanisms that can tighten and loosen the ring. The ring can be tightened and loosened by adjusting the length of its perimeter. Preferably, the first ring 325 and the second ring 327 are made of flexible material or have configuration that can extend and retract along the curvature of the ring.

The threaded member 313 may be a screw or other external (male) thread. The threaded member 313 is parallel to the pillar 329, and is also connecting the first beam 326 and the second beam 328. The threaded member 313 and the pillar 329 may have identical length measured from the first beam 326 to the second beam 328.

Figure 3B:
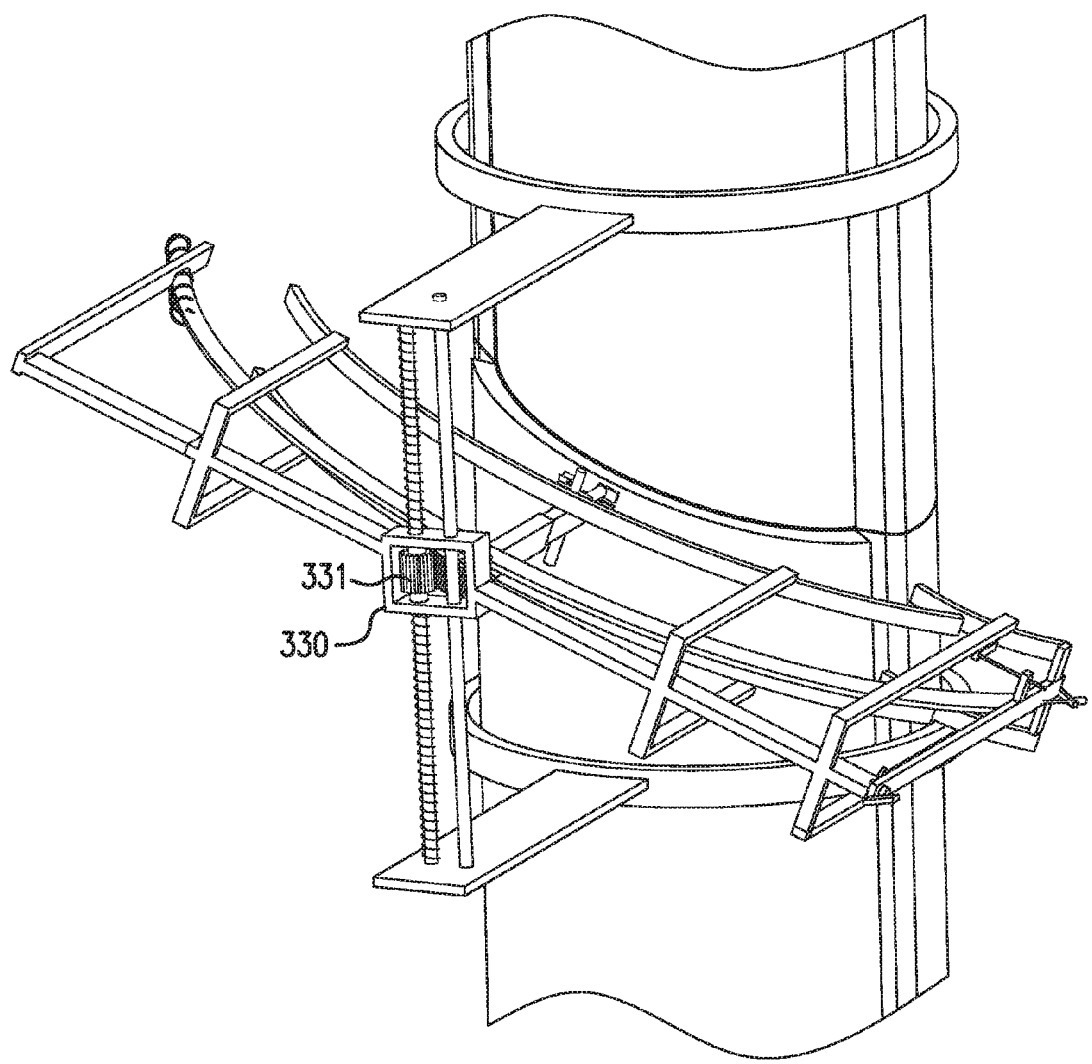
FIG. 3b depicts the illustrative tapping apparatus disclosed in FIG. 2 from another different viewing angle.

The first structure 311, the second structure 312, and the threaded member 313 may be connected together by a bracket 330. The bracket 330 may have any configuration to achieve this connection. In a preferred embodiment, the bracket 330 has either a square or rectangular configuration. With a square or rectangular configuration, the bracket 330 has a first pair of parallel sides and a second pair of parallel sides. The pillar 329 and the threaded member 313 connect the first beam 326 and the second beam 328 together by penetrating through the first pair of parallel sides. The beam 321 is connected to the second pair of parallel sides. In one embodiment, the beam 321 is connected to the second pair of parallel sides without penetrating through the second pair of parallel sides. Inside the bracket 330, there may be a wheel 331 with a plurality of teeth or grooves installed on the threaded member 313. The wheel 331 is installed in a manner such that the wheel 331 rotates in direction perpendicular to the direction the threaded member 330 extends between or toward the first beam 326 and the second beam 328. The plurality of grooves of the wheel 331 may be engaged with the plurality of teeth 441 of the section 440 (discuss in FIG. 4 below) to move the cutter 309/409 between the first set of legs 323 or around the perimeter of the trunk 316. FIG. 3b depicts another view of the bracket 330 and the wheel 331.

Figure 4:
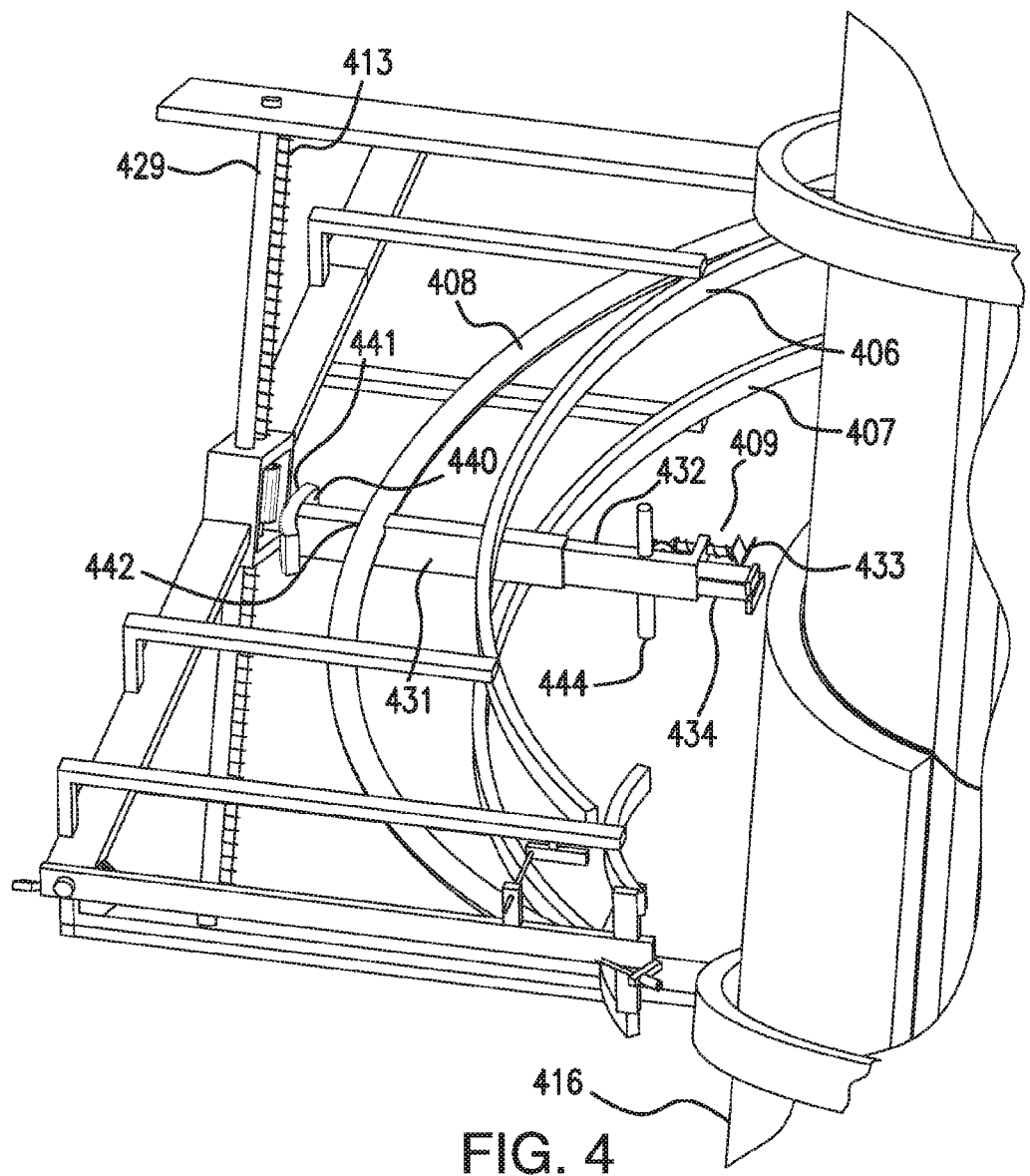
FIG. 4 depicts an illustrative cutter in accordance with some embodiments of the present invention.

Referring to FIG. 4, one embodiment of the cutter 409 is illustrated. The cutter 409 may comprise a first (larger) tubing section 431, a second (smaller) tubing section 432, a blade 433, a blade aligning mechanism 434, and a pin 444. The second tubing section 432 may be movable within the first tubing section 431. The first tubing section 431 and the second tubing section 432 may have a sliding engagement to achieve this movement. If desired, an alternative embodiment would have the first tubing section 431 smaller and the second tubing section 432 larger. Both tubing sections 431, 432 may be rectangular, square, circular, other shapes, or a combination thereof. Preferably, both tubing sections 431 and 432 are rectangular. The cutter 409 may extend from the trunk 416 of the tree to the 429 pillar or the threaded member 413. The pin 444 may extend across or penetrate through the second tubing section 432. The cutter 409 may be between the first rail 406 and the second rail 407 without contacting either rail.

The first tubing section 431 may have a section 440 with a plurality of teeth 441 on a surface of the section 440. With the section 440, the first tubing section 431 may have a T-shape from a top view or in cross-sectional view. The section 440 may have a curvature parallel to one or all of the curvatures of the rails 406-408. The section 440, and the rails 406-408, may extend from one end of the first structure, where one of the second set of legs is located (e.g., 323 to the left of FIG. 3a), to the other end of the first structure, where the other one of the second set of legs is located (e.g., 323 to the right of FIG. 3a). The section 440 and the plurality of teeth 441 extend in such a direction without contacting both ends and either the rails 406, 407. The first tubing section 431 may further have a notch 442 to which the third rail 408 is connected. Through this connection, the cutter 409 is movable or slidable along the third rail 408 and between the first rail 406 and the second rail 407. The section 440 and the plurality of teeth 441 may also be aligned with the beam of the first structure (e.g., 321 of FIG. 3).

The second tubing section 432 is an intermediary component between the first tubing section 431 and the blade aligning mechanism 434. The blade aligning mechanism 434 is an intermediary component between the second tubing section 432 and the blade 433 and that connects the blade 433 to the second tubing section 432. The second tubing section 432 may have a hollow interior and one or more springs in the hollow interior to accommodate the blade aligning mechanism 434. Part of the blade aligning mechanism 434 is inserted into the hollow interior and one or more springs in the hollow interior and part of the blade aligning mechanism 434 is connected an exterior surface of the second tubing section 432. The second tubing section 432 is inserted into a hollow interior of the first tubing section 431 that accommodates the second tubing section 432.

In a preferred embodiment, referring to FIGS. 3a, 3b, and 4, the wheel 331 may rotate to move the bracket 330 and the first structure 311 downward along the threaded member 313 when the cutter 309/409 moves from the end of the first structure 311 slanted closer to the ground to the end of the first structure 311 slanted further from the ground (returning direction). During this movement, the plurality of teeth 441 contact the wheel 331 to rotate the wheel 331 and move the bracket 330 and the first structure 311 downward. When the cutter 309/409 moves from the end of the first structure 311 slanted further from the ground to the end of the first structure slanted toward closer to the ground (cutting direction), the cutter 309/409, the first structure 311, the second structure 312, or any combinations thereof may be configured such that the cutter 309/409 moves without contacting the wheel 331 or moves and contacts the threaded member 331 but without rotating the wheel 331. In the latter scenario, the plurality of teeth 441 may be configured to be pushed down or toward the trunk 416 when the cutter 309/409 moves in the cutting direction and the plurality of teeth 441 contact the wheel 331. When the cutter 309/409 moves in the returning direction, the plurality of teeth 441 may remain standing without being pushed down or toward the trunk 416 to cause the wheel 331 to rotate. The plurality of teeth 441 may be configured to be flexible (so that they can be pushed down) only when the cutter 309/409 moves in the cutting direction or may have a spring such that the plurality of teeth 441 and the spring are configured to cause this rotation in only one direction.

Figure 5A:
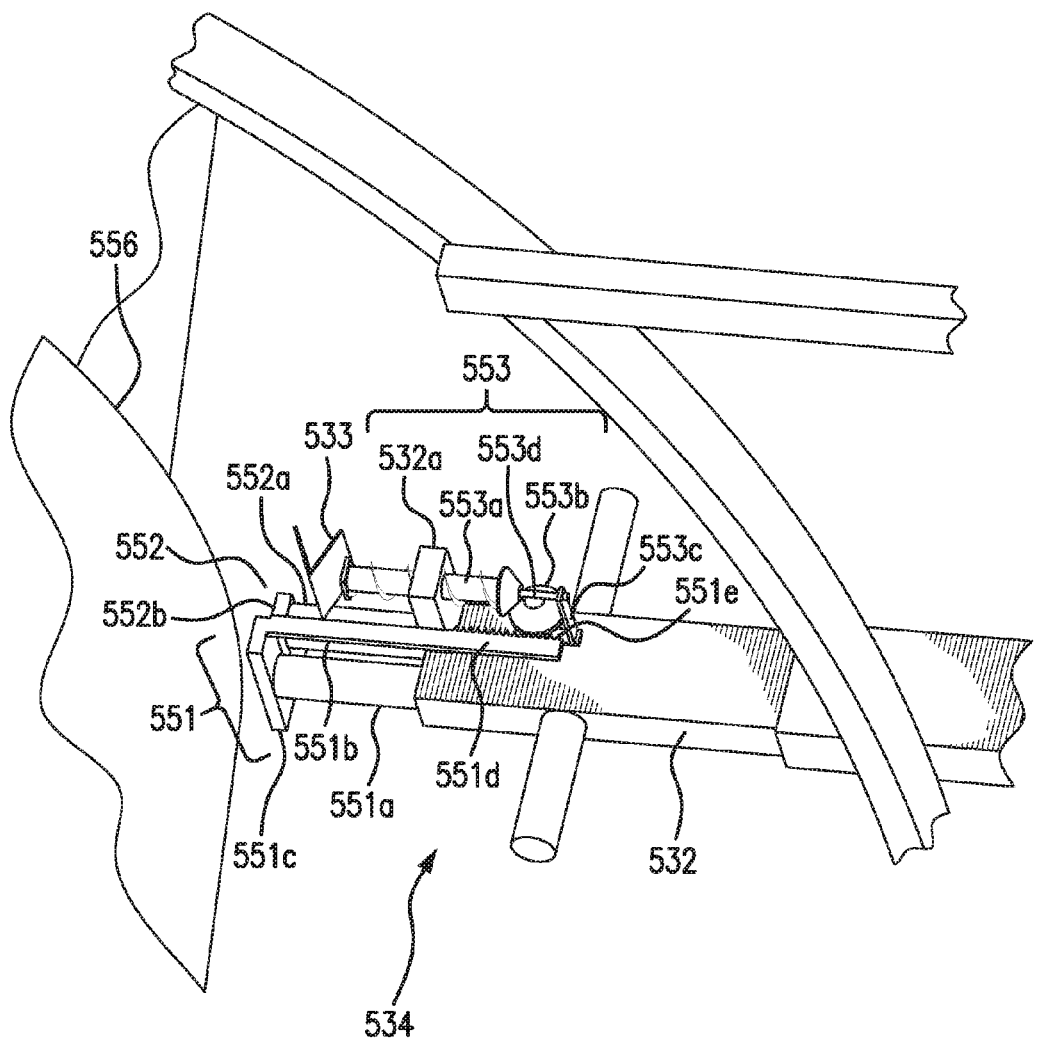
FIG. 5a depicts an illustrative blade aligning mechanism in accordance with some embodiments of the present invention.

Referring to FIG. 5a, one embodiment of the blade aligning mechanism 534 is illustrated. The blade aligning mechanism 534 may comprise a first leg 551, a second leg 552, and a blade pusher 553. The first leg 551 may include a first elongated member 551a, a second elongated member 551b, and a pad 551c connecting the first elongated member 551a and the second elongated member 551b. The first elongated member 551a and the second elongated member 551b may be parallel to each other, and the pad 551c may be perpendicular to both the first elongated member 551a and the second elongated member 551b. The first elongated member 551a may have, preferably, a cylindrical shape and is inserted into the hollow section of the second tubing section 532. There may be a spring inside the second tubing section holding the first elongated member 551a. The first elongated member 551a may also adopt other shapes. The second elongated member 551b, in its entirety, may be outside or external to the hollow section of the second tubing section 532 or the second tubing section 532. The second elongated member 551b may have, preferably, a rectangular shape but other shapes may also be adopted. The second elongated member 551b may have an end connected to the pad 551c and another end 551d connected to the blade pusher 553. Especially, another end 551d may have a plurality of teeth 551e connected to the blade pusher 553. The pad 551c preferably has a rectangular shape but other shapes may also be adopted.

The second leg 552 may comprise a first elongated member 552a having a first end and a second end, and a pad 552b connected to the first end of the first elongated member 552a. The second end of the first elongated member 552a is inserted into the hollow section of the second tubing section 532. There may be a spring inside the second tubing section 532 holding the first elongated member 552a. Preferably, the first elongated member 552a has a cylindrical shape but other shapes may also be employed. The first elongated member 551a of the first leg 551 and the first elongated member 552a of the second leg 552 are parallel to each other. The pad 552b preferably has a rectangular shape but other shapes are also acceptable.

The blade pusher 553 may comprise a threaded member 553a and a rotating device 553b. The thread member 553 has a first end connecting to the blade 533 and a second end connecting to the rotating device 553b. The second end may have a truncated cone or a conical configuration. The second end may also a trapezoid-shaped cross-sectional area. The rotating device 553b may have a truncated cone or a conical configuration. The rotating device 553b may also have a trapezoid-shaped cross-sectional area. When both the second end and the rotating device 553b have a truncated cone or a conical configuration, the slant height or the slant surface of the second end is connected to the slant height or the slant surface of the rotating device 553b. In this way, the rotating device 553b rotates in a direction perpendicular to the direction the second end rotates. The threaded member 553a and the rotating device 553b may be connected to the second tubing section 532 via a bracket 553c and a pin 553d. The bracket 553c may connect the rotating device 553b to the second tubing section 532. The bracket 553c and the pin 553d connect the threaded member 553a to the second tubing section 532. The second tubing section 532 may comprise an internal (female) thread 532a further connecting the threaded member 553a to the second tubing section 532. The internal (female) thread 532a is integrated with the second tubing section 532 so that the internal (female) thread 532a and the second tubing section 532 are an one-piece component or a component manufactured from a single mold. The pin 553d connects the threaded member 553a and the bracket 553c without contacting the rotating device 553b. On a side surface of the larger base of the rotating device (a truncated cone has a smaller base, a larger base, and a slant height or surface between the smaller base and the larger base), there may be a plurality of groves matching the plurality of teeth 551e. The threaded member 553a may be a screw or other external (male) thread.

The blade 533 may be any blade capable of removing the bark or skin 556 of a tree and may have any shape. Preferably, the blade 533 has a V-shaped configuration that has two sides joined to form a groove and a tip formed at the joint. The cutting edge of the blade 533 is located at the tip.

Figure 5B:
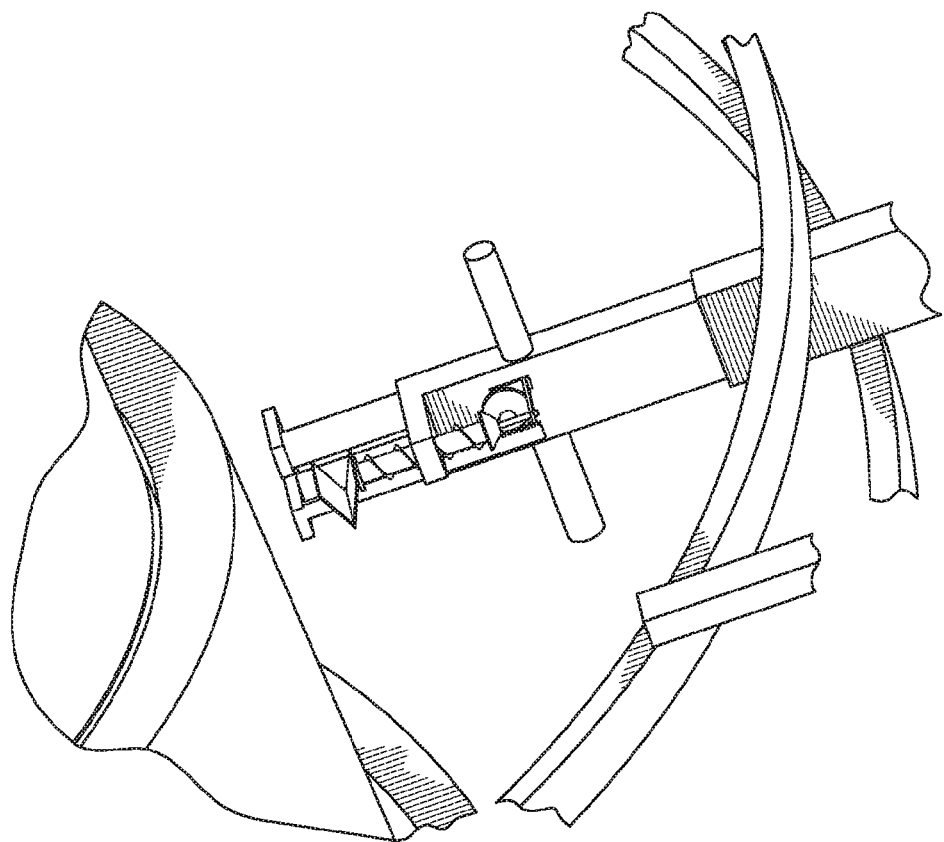
FIG. 5b depicts the illustrative blade aligning mechanism disclosed in FIG. 5a from a different viewing angle.

FIG. 5b is another view of the embodiment disclosed in FIG. 5 and the second tubing section.

Figure 6A:
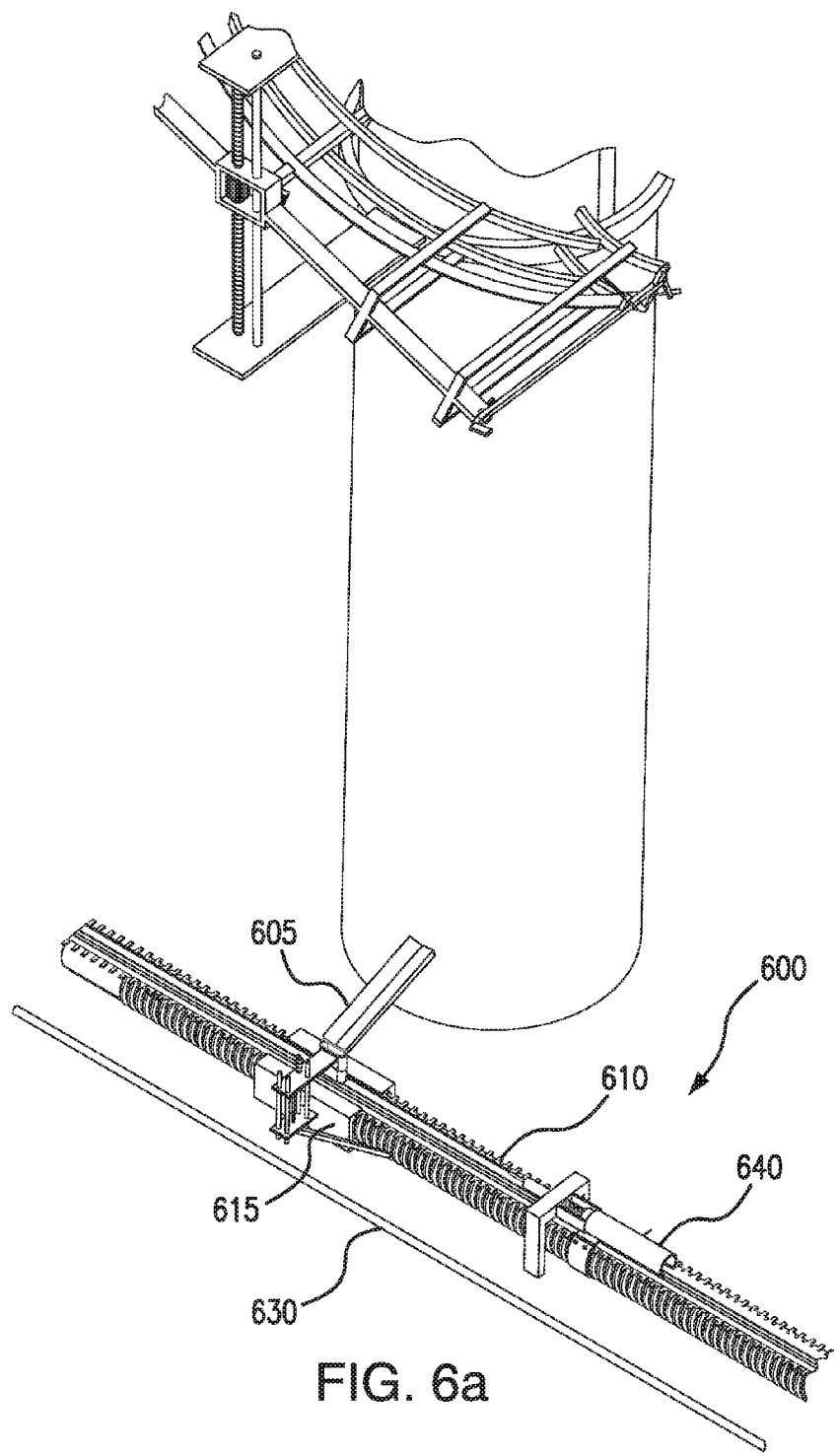
FIGS. 6a and 6b depict an illustrative collecting apparatus for collecting rubber in accordance with some embodiments of the present invention.
Figure 6B:
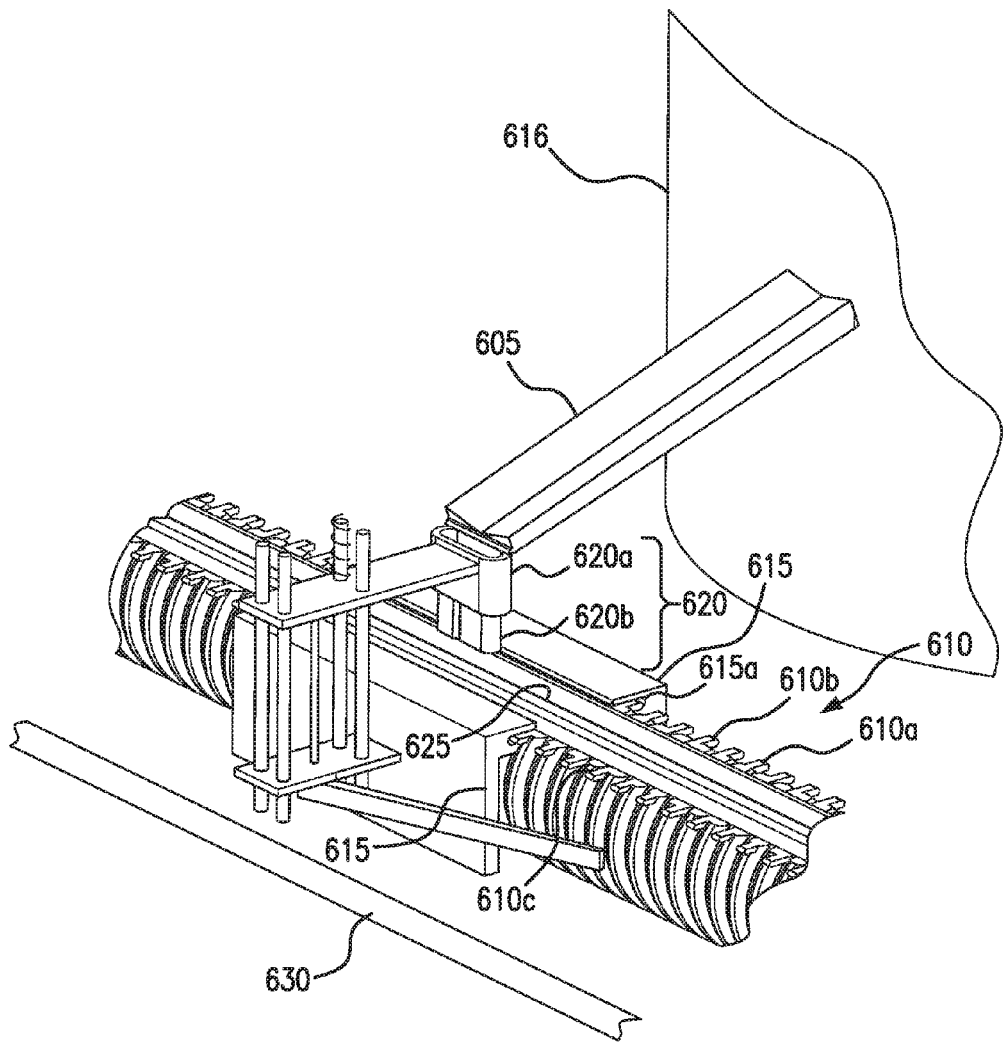

Referring to FIGS. 6a and 6b, one embodiment of the collecting apparatus 600 for collecting rubber is illustrated. The collecting apparatus 600 may comprise a slide 605, a tube 610, one or more brackets 615 holding the tube 605, and a conduit 620 between the slide 605 and the tube 610. The slide 605 has an end contacting or closer to the trunk 616 and another end further away from the trunk 616. In a preferred embodiment, the slide 605 is slanted in a manner such that the end contacting or closer to the trunk 616 is higher than the end further from the trunk 616 from the ground. The slide 605 receives rubber from the tapping apparatus from the higher end. The slide 605 also preferably has a triangular shape but other shapes may also be employed. The tube 610 may include a plurality of arms 610a, and each of the one or more brackets 615 may have a trench 615a accommodating the plurality of arms 610. The tube 610 is movable within the one or more brackets 615. The tube 610 may have a circular or elliptical shape or cross-section to facilitate movement, but other shapes or other cross-sectional shapes may also be employed. In a preferred embodiment, the tube 610 includes a first set of arms 610b on one side of the tube 610 and a second set of arms 610c on another side of the tube 610 opposite to the one side. The first set of arms 610b and the second set of arms 610c are parallel to each set. In a preferred embodiment, the one or more brackets 615 is a pair of brackets. The pair of brackets may have one end connecting or closer to the ground and another end further from the ground. The another end further from the ground may have a pair of trenches 615a with each trench accommodating each set of arms. The tube 610 is movable within the pair of brackets 615 via the first and second set of arms 610b, 610c moving in the pair of trenches 615.

The conduit 620 may be parallel to the trunk 616 and may be perpendicular to a surface of the pair of brackets 615, a surface of the tube 610, or both the surface of the pair of brackets 615 and the surface of the tube 610. The conduit 620 may have a larger tubing section 620a and a plurality of smaller tubing sections 620b. In a preferred embodiment, the larger tubing section 620a contacts or is closer to the slide 605 and the plurality of smaller tubing sections 620b contact or are closer to a surface of the tube 610. The conduit 620 may be situated between the pair of brackets 615 without contacting the pair of brackets 615. The conduit 620 may be configured to receive electricity from wire 630. The surface of the tube 610 to which the plurality of smaller tubing sections 620b contact or are closer may be the same surface from which the first and second set of arms 610b, 610c extend. The same surface may also be or include a door 625. The tube 610 or the door 625 may be configured to receive electricity from wire 630. With electricity, the door 625 may be opened and the plurality of smaller tubing sections 620b may be lowered into the tube 610. As such, rubber may flow from the slide 605 into the tube 610 via the conduit 620. In some embodiments, the conduit 620 and the tube 610 may be configured to transport and receive rubber without electricity. In those embodiments, the tube 610 may have an opening aligned with the conduit 620. The plurality of smaller tubing sections 620b may not need to be lowered or may have a length closer to the tube 610. The collecting apparatus 600 may further comprise a release device 640.

Figure 7A:
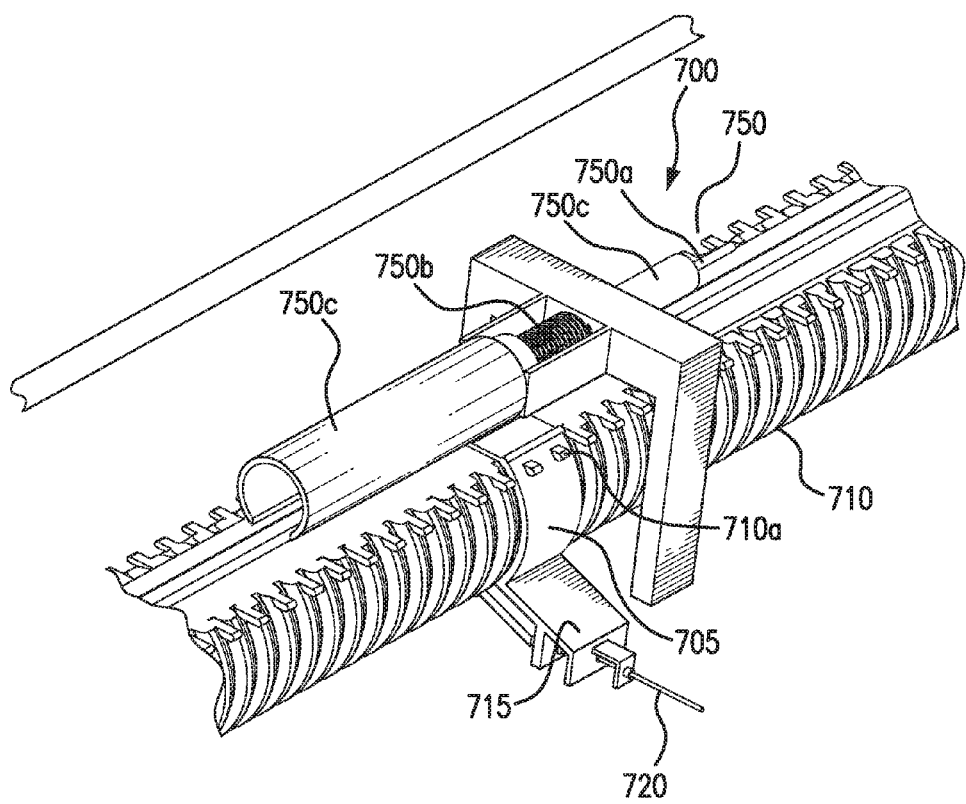
FIG. 7a depicts an illustrative release device in accordance with some embodiments of the present invention.

Referring to FIG. 7a, one embodiment of the release device 700 is illustrated. The release device 700 may comprise a first portion 705 corresponding to the shape of the tube 710 and a second portion 715 extending from the first portion 705. The first portion 705 may have a plurality of holes to accommodate some of the plurality of arms 710a and the first portion 705 is connected to the tube 710 by the inserting some of the plurality of arms 710a into the plurality of holes and/or by exerting a pressure on the tube 710 sufficient to render the tube 710 immovable by a control system pulling the tube 710 to transport collected rubber to one place or to a large container. The first portion 705 may be opened to release the tube 710 via the second portion 715 and a wire 720. In this case, the plurality of arms 710a are not connected to the first portion 705. As such, the release device 700 has a lock mode and an unlocked mode. A pulling device 750 may be installed on top of the release device 700 and the tube 710. The pulling device 750 may comprise a wire 750a, a spring 750b, and associated structures 750c to pull the cutter (e.g., 209 of FIG. 2). The wire 750a is connected to one of the second set of legs (e.g., 323 of FIG. 3) of the first structure (e.g., 311 of FIG. 3), and the wire 750a may be moved toward the spring 750b and the associated structures 750c to pull the cutter by the collaboration of the spring 750b and associated structures 750c. The pulling device 750 may be connected to the control system 1120 in FIG. 11 (discussed below) via the wire 705b and/or the associated structures 750c to receive the force needed to pull and release the wire 750a and 750b that in turn can move the cutter back and forth along the rails that in turn can lock and unlock the release device 700 (such that the arms 710a are detached from the first portion 705) to prevent and allow movement of the tube 710.

Figure 7B:
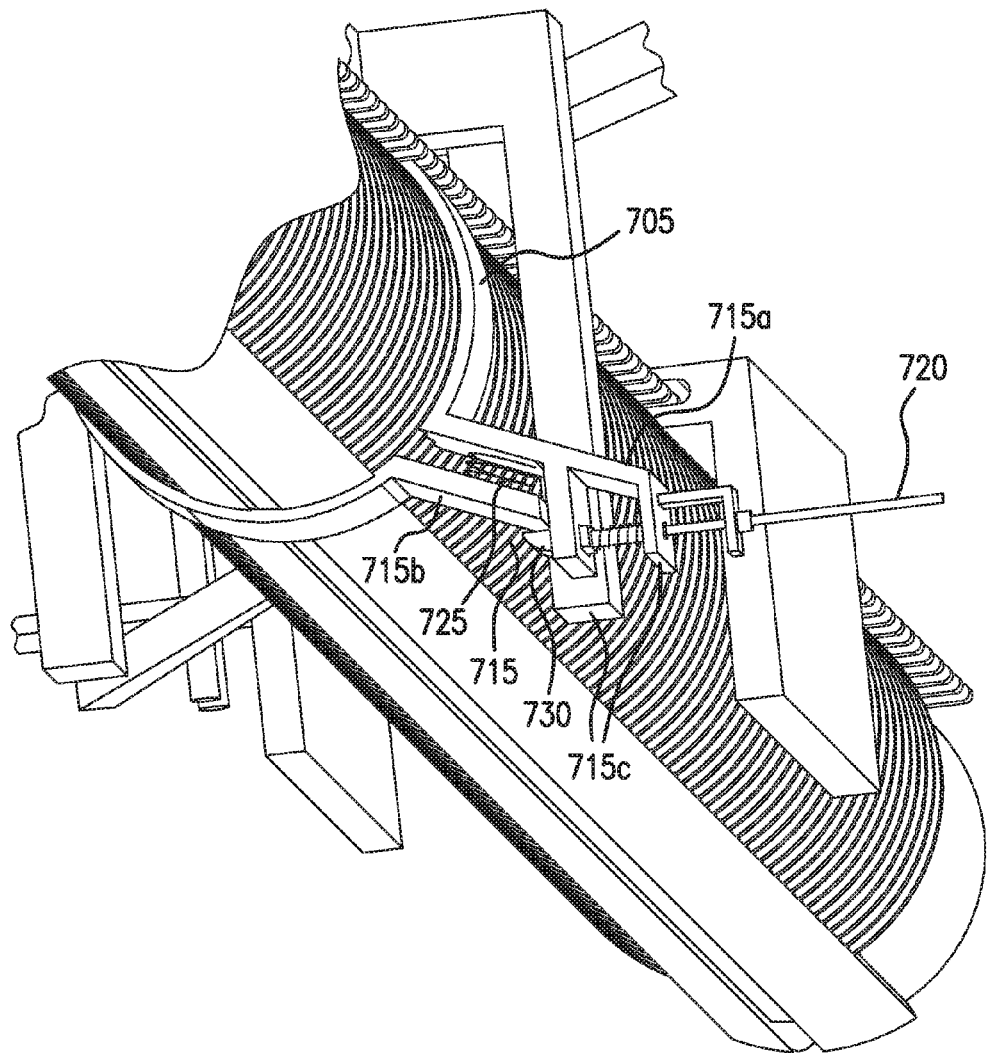
FIG. 7b depicts detail structure of the second portion of the release device and the connection of the second portion and the wire in accordance with some embodiments of the present invention.

Referring to FIG. 7b, detail structure of the second portion 715 and the connection of the second portion 715 and the wire 720 are illustrated. In one embodiment, the second portion 715 may comprise a first beam 715a and a second beam 715b shorter than the first beam 715a. The first beam 715a and the second beam 715 are parallel to each other. On a section of the first beam 715a away from the first 705 portion, the first beam 715a comprises a pair of parallel sub-beams 715c. Between the first beam 715a and the second beam 715b and between the first portion 705 and the pair of parallel sub-beams 715c, there is a spring 725 exerting force on the second beam 715b toward the ground. The wire 720 may penetrate through the pair of parallel sub-beams 715c to move a rod 730 or may be connected to a rod 730 that penetrates through the pair of parallel sub-beams 715c and that moves the rod 730. The wire 720 may move the rod 730 in a direction perpendicular to the pair of parallel sub-beams 715c. In an initial position of the rod (which is a locked position of the release device), the rod 730 contacts an end of the second beam 715b to hold the second beam 715b closer to the first beam 715a. The rod 730 contacts an end of the second beam 715b such that a portion of the rod 730 is between the first portion 705 and the pair of parallel sub-beams 715c. In a retreated position of the rod 730 (which is an unlocked position of the release device), the wire 720 moves the rod 730 to another position so that the rod 730 does not protrude from the pair of parallel sub-beams 715c and does not contact the second beam 715b. In this position, the spring 725 exerts its force on the second beam 715b to push the second beam 715b further from the first beam 715a compared to the second beam 715b in the initial position. In this position, the arms 710*a* (FIG. 7*a*) are also released from the first portion 705. Another end of the wire 720 may be connected to the first structure (e.g., 311 of FIG. 3)

Figure 8:
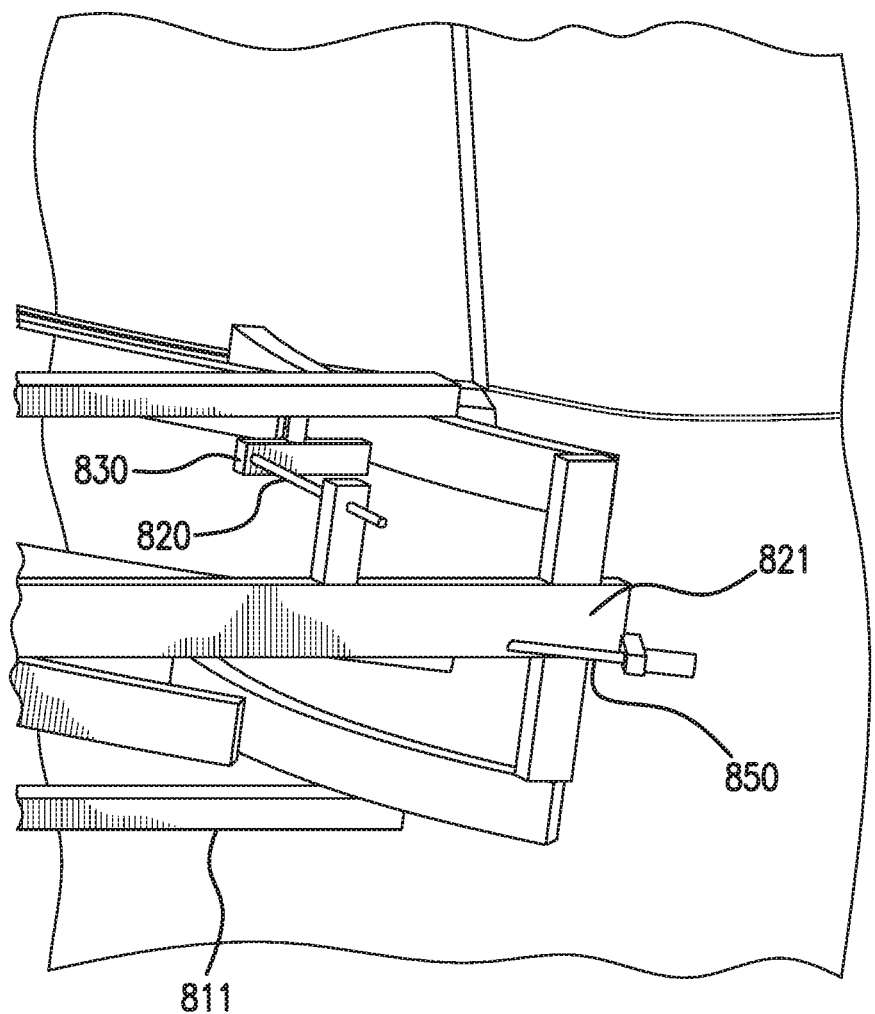
FIG. 8 depicts illustrative wire connections on the first structure of the mounting structure in accordance with some embodiments of the present invention.

FIG. 8 illustrates examples of wire connections on the first structure. Wire 820 may correspond to wire 720 in FIG. 7*b* and wire 850 may correspond to wire 750*a* in FIG. 7*a*. The wire 850 may be connected to the beam 821 and/or one of the second set of legs of the first structure 811. The wire 850 may extend to the third rail (e.g., 308 of FIG. 3*a*), and be placed either inside or outside the third rail to move the cutter (e.g., 309 of FIG. 3*a* and 409 of FIG. 4) along the third rail. The cutter is pulled by the wire 850 to move from the end slanted higher from the ground to the end slanted lower from the ground of the first structure (cutting direction). During this movement, the cutter cuts or removes a portion of the bark of the tree. The wire 850 may receive the necessary pulling force from the control system.

The wire 820 may be connected to the beam 821 and a pedal 830 of the first structure 811. The pedal 830 is movable by pulling the wire 820. The wire 820 is attached to one end of the pedal 830. When the cutter reaches the end slanted lower from the ground, the cutter is further moved by the wire 850*a* onto to another end of the pedal 830. The cutter lands on the other end via its pin (e.g., 444 of FIG. 4), and the pin pushes the end on which it lands in a direction away from the bark of the tree or toward the beam 821 and the end to which the wire 820 is connected in a direction toward the bark of the tree or away from the beam 821. When the end to which the wire 820 is connected is pulled toward the bark of the tree, the wire 720 in FIGS. 7*a* and 7*b* is pulled to retreat the rod 730 and to release the beam 715*b*.

The wire 850 may also be configured to return the cutter to the end slanted higher from the ground after cutting a portion of the bark. The pull tension of the wire 850 may be loosened by the control system so that the cutter can be released back to the end slanted higher from the ground. In this configuration, the cutter or the pin of the cutter is not pulled onto the pedal 830 after the cutter reaches to the end slanted lower from the ground. As such, the cutter may be removing portions of the bark between the two ends of the first structure until some or all the portions between the first beam (e.g., 326 of FIG. 3*a*) and the second beam (e.g., 328 of FIG. 3*a*) are removed. After removing some or all the portions between the first beam and the second beam, the cutter or the pin of the cutter then may be loaded onto the pedal 830 to loosen the release device for collection.

In an illustrative operation, the tapping device is installed on a rubber tree via the first ring and the second ring. The cutter starts cutting a portion of the bark between the two rings and between the two slanted ends of the first structure. The cutter starts cutting from the end slanted higher from the ground to the end slanted slower from the ground. In this cutting direction, the cutter is pulled by a first wire to move along the third rail. When the cutter reaches the end slanted lower from the ground, the cutter is pulled by the first wire back to the end slanted higher from the ground. During this returning direction, the plurality of teeth of the first tubing section engage with the wheel on the threaded member to rotate the wheel. The rotation of the wheel causes the bracket connecting to the threaded member, the pillar, and the first structure to move downward which also moves the first structure downward. The cutter is then aligned with another or next portion of the bark and is able to cut the another or next portion of the bark. This cutting and returning process may be repeated until some or all of the portions between the two rings and between the two slanted ends of the first structure are removed.

Before the cutter cuts a portion of the bark, the tree may have an incision on the bark at a location aligned with one of the first elongated beams (e.g., 551*a* or 552*a* of FIG. 5*a*) of the cutter. This incision may be near the end slanted higher from ground of the first structure. This incision may be created before or after the tapping apparatus is installed on the tree and may be created by a blade different from the blade of the cutter (e.g., 553 of FIG. 5) or by the blade of the cutter. Before the cutter or both of the pads contact the tree, both pads are aligned and this incision allows one of the first elongated beams, such as 552*a* of FIG. 5, to extend into the tree when the cutter comes into contact with the bark and/or the incision. During this contact, the first elongated beam 552*a* is extended into the tree by a spring in the second tubing section holding the first elongated beam 552 and the other first elongated beam 551*a* is pushed up by the bark (toward the first tubing section) or due to the difference in height caused by the incision. This pushed-up movement causes the blade 533 to move toward the tree via components 551*b*, 551*d*, 532*a*, 553*a*, and 553*b* so that the blade 533 and the pad 552*b* of the first elongated member 552*a* are contacting the same surface on the tree. The second elongated member 551*b* is pushed in a direction toward the first tubing section which rotates component 553*b* and pushes component 553 toward the tree. As such, the cutter may be able to remove a thickness of the bark or the thickness between the pad 551*c* and the pad 552*b*.

Figure 9:
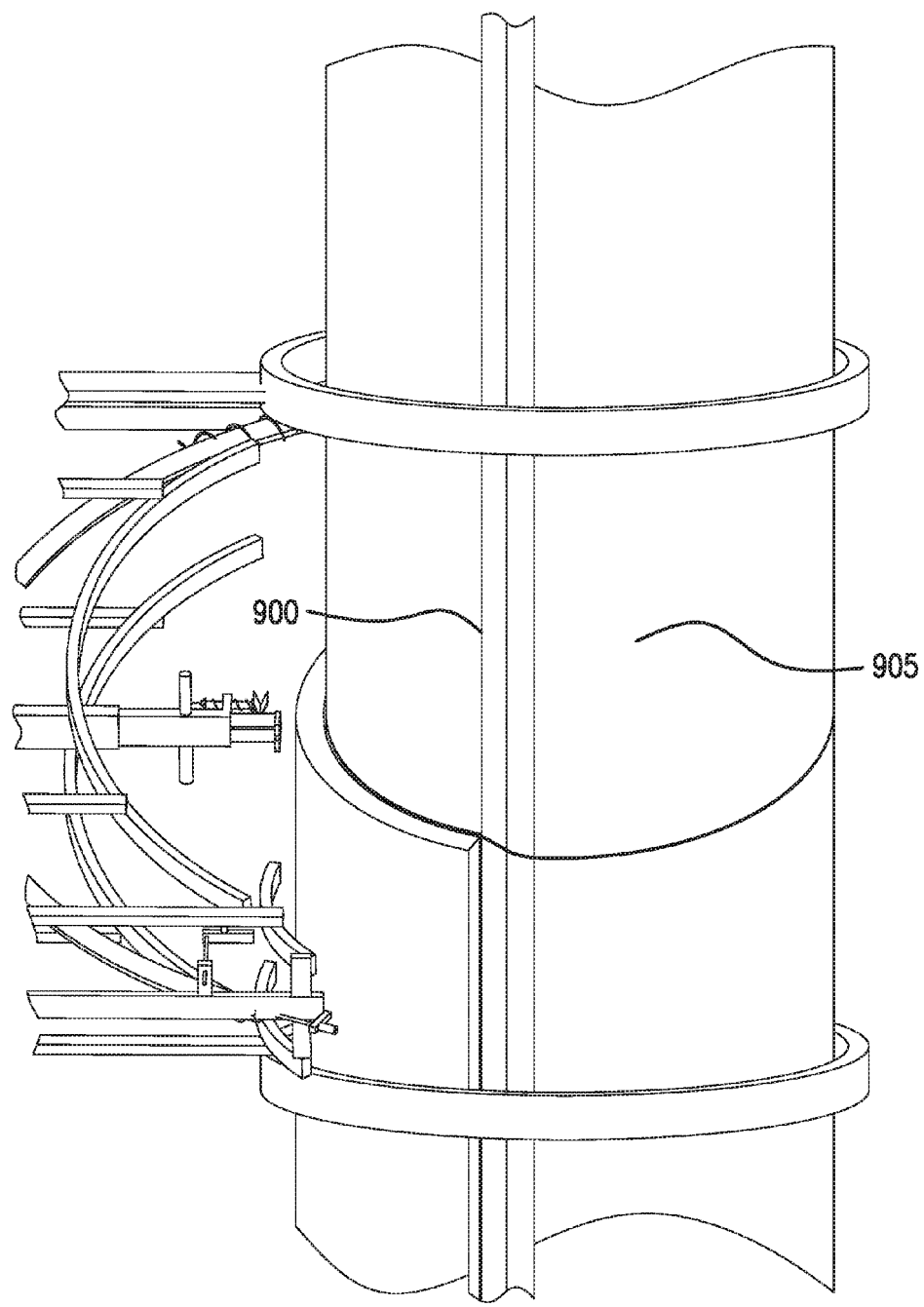
FIG. 9 depicts an illustrative incision on the bark near the end slanted lower from the round of the first structure in accordance with some embodiments of the present invention.
Figure 10:
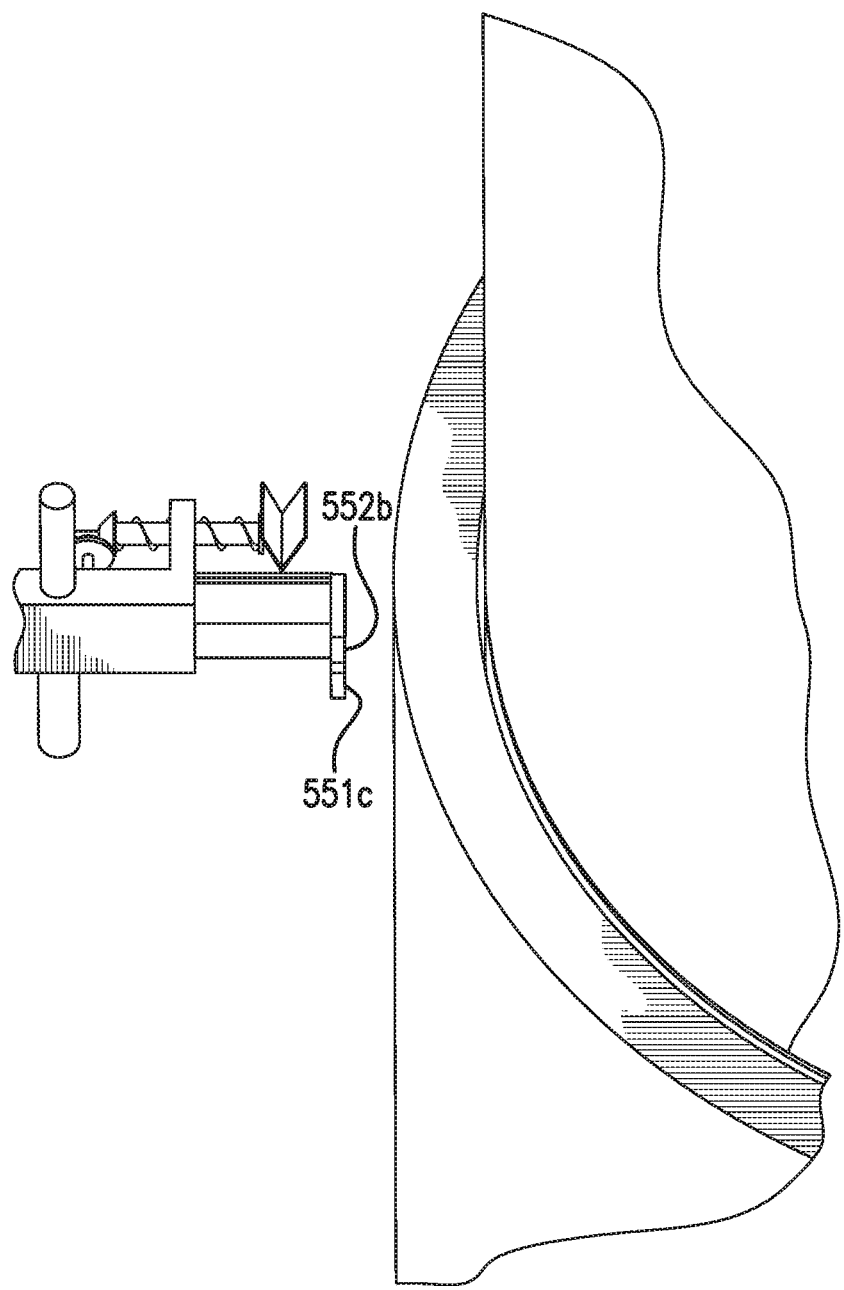
FIG. 10 depicts illustrative pads with a rounded corner in accordance with some embodiments of the present invention.

Moreover, there may be another incision on the bark near the end slanted lower from the ground of the first structure. FIG. 9 depicts an example of such an incision 900. This incision 900 may be created before or after the tapping apparatus is installed on the tree and may be created by a blade different from the blade of the cutter (e.g., 553 of FIG. 5) or by the blade of the cutter. Such an incision 900 may indicate where cutting should end before moving to the next portion of the bark or before moving the cutter downward. The incision provides a path help aligning the pads 551*c* and 552*b* and moving the blade away from the tree. The path allows the first elongated beam 552*a* and/or the pad 552*b* to move onto the bark 905 from a position into the bark or the tree. To facilitate this movement, an edge or corner of the pad 552*b*, or both of the pads 551*c*, 552*b* may be round as shown in FIG. 10. After moved onto the bark 905, the pads 551*c* and 552*b* are aligned and the blade 533 is moved up (away from the bark) via the collaboration of components 553, 551 and 552 described above. The incision 900 may also be optional since the first structure can already control where cutting should stop.

For the incision near the end slanted higher from ground of the first structure and the incision near the end slanted lower from ground of the first structure, the incision may be made in a longitudinal direction of the tree. Moreover, the user of the system 100 may create either incision using a different blade.

Figure 11:
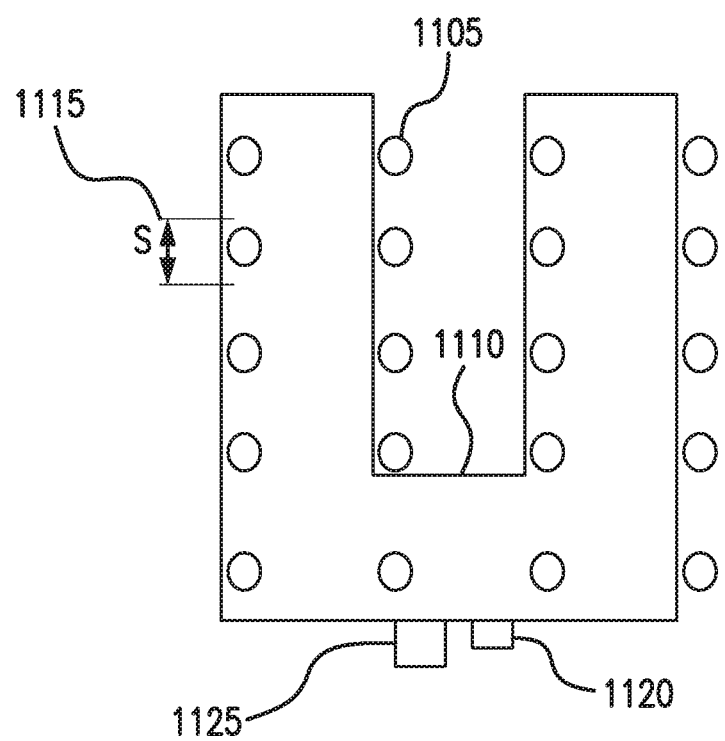
FIG. 11 depicts an illustrative interaction between the tube and the control system and the application of the interaction to a plurality of rubber trees.

The collecting apparatus is placed below the tapping apparatus at a location capable of receiving rubber tapped by the tapping apparatus. The slide of the collecting apparatus may be aligned with or be placed near the end slanted lower from the ground. Rubber may drip from area where bark has been removed into the slide, then flow into the tube via the conduit. The door of the tube is open when the collecting apparatus is collecting rubber and the smaller tubing may extend into the tube if the tube and the smaller tubing is configured in that manner and if necessary. After a certain amount of time or after the tube is full, the tube may be pulled or transported by a control system to a large container to unload the collected rubber into the large container. FIG. 11 illustrates the interaction between the tube and the control system and the application of this interaction to a plurality of rubber trees.

Figure 12:
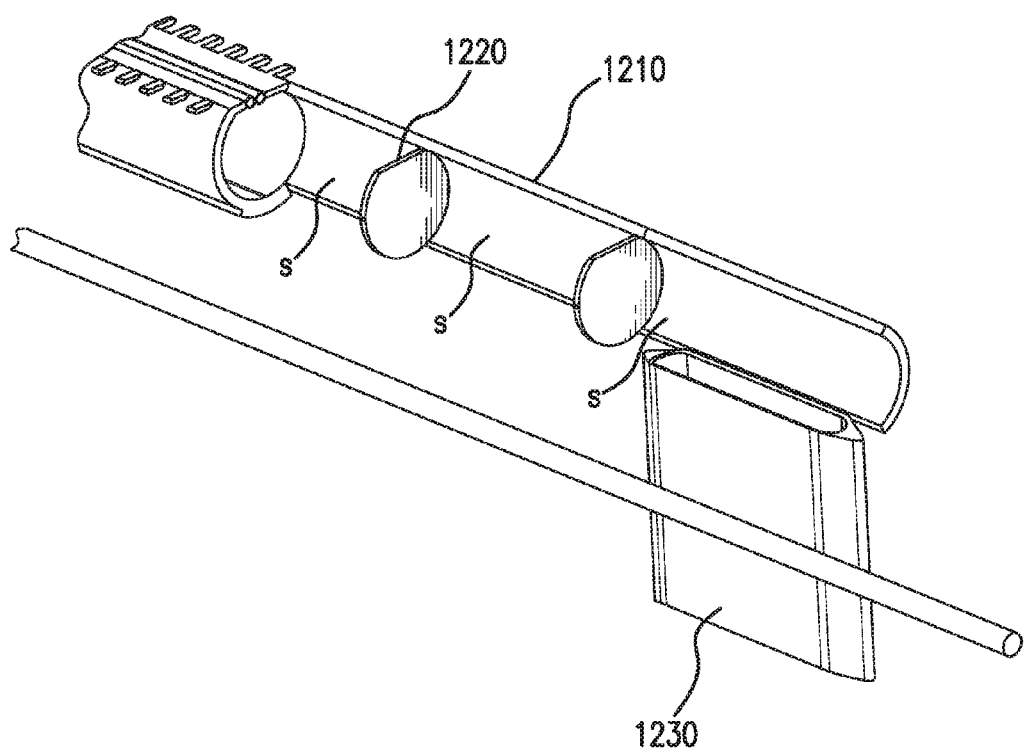
FIG. 12 depicts an illustrative interior of the tube in accordance with some embodiments of the present invention.

Referring to FIG. 11, a plurality of rubber trees 1105 are surrounded by a tube 1110. In one embodiment, the tube 1110 may be a long tube with multiple sections S, and the plurality of rubber trees 1105 are surrounded by the tube 1110 in a manner such that each section S is provided to each rubber tree 1105 and has a capacity to contain tapped rubber. In another embodiment, the tube 1110 may comprise a plurality of shorter tubes S connecting together with each shorter tube S provided to each rubber tree 1105. In either embodiment, there may be a divider 1115 between adjacent sections or adjacent shorter tubes. The control system 1120 may be programmed to move each section through a large container 1125 at a frequency such as every hour, every day, or other frequency depending on the capacity of each section, the size of the rubber trees, and/or the amount of rubber in the rubber tress. The control system 1120 may include an engine or motor and a computer configured to control the operation of the engine. The control system 1120 may include its power source such as a battery or be connected to a separate power source such as a power generator or an electrical outlet. The engine may also be powered by oil or other resource. The engine is the machine that provides the force or energy needed to move the tube 1110 and operate the devices shown in FIG. 7a-7b and the tapping apparatus. When each section S passes through the large container 1125, each section S unloads the rubber it contains into the large container 1125. The tube may be unloaded from the door that receives the tapped rubber by turning each section 180° degrees and then opening the door when each section arrives above the large container 1125. The rubber may also include another door opposite to the door receiving tapped rubber to open and unloaded the collected rubber without turning each section 180° degrees. This process may be repeated until all the sections have unloaded their rubber. The tube 1110 is moved or pulled by the control system 1120 when the release device is unlocked. Wheels, such as those adjacent to the tube as shown in FIG. 1, may be provided to the tube to facilitate the movement of the tube. FIG. 12 depicts an illustrative interior of the tube 1210. The tube 1210 comprises a plurality of sections or shorter tubes S and a divider 1220 between adjacent sections or shorter tubes. The divider 1220 may be a plate having a shape corresponding to the shape of the cross-section of the tube 1210. The adjacent dividers 1220 may completely prevent or prevent a substantial amount of the collected rubber in a section S from flowing into another section S. The divider 1220 may be fixed to the interior of the tube 120 so that it is immobile with respect to the tube 1210. 1230 may represent a pipe connected to the large container and the rubber in each section may be unloaded into the large container through the pipe when each section moves to the top of the pipe.

Figure 13:
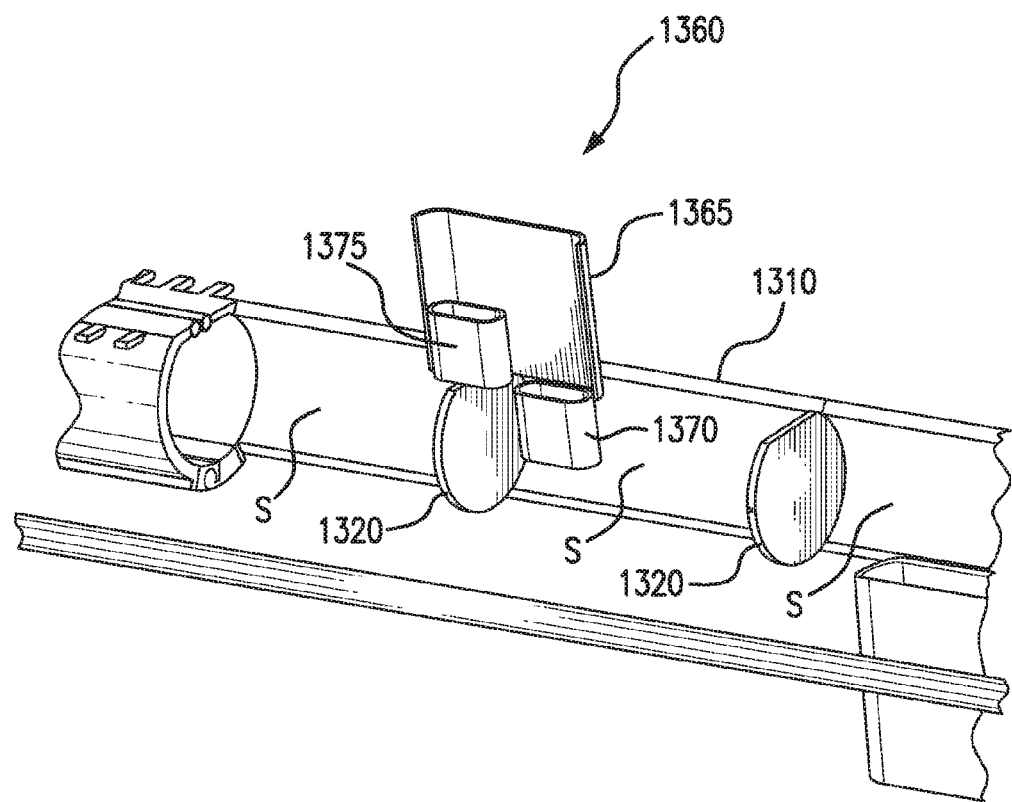
FIG. 13 depicts a detail view of the conduit of the collecting apparatus in accordance with some embodiments of the present invention.

Referring to FIG. 13, a detail view of the conduit 1360 of the collecting apparatus is illustrated. The conduit 1360 may comprise a larger tubing section 1365 and a plurality of smaller tubing sections 1370, 1375. The employment of a plurality of smaller tubing sections 1370, 1375, rather than one single smaller tubing section, ensures that one of the plurality of smaller tubing sections 1370, 1375 can always be lowered into the tube 1310. When the conduit 1360 is aligned with a section S of the tube 1310, all of the plurality of smaller tubing sections 1370, 1375 can be lowered into or closer to the tube 1310 without the divider 1320 interfering the movement of one or both of the smaller tubing sections 1370, 1375 or preventing one or both of the smaller tubing sections 1370, 1375 from being lowered. When the conduit 1360 is misaligned with the section S, i.e., the divider 1320 prevents one 1375 of the plurality of smaller tubing sections 1370, 1375 from being lowered, the other one 1370 of the plurality of smaller tubing sections 1370, 1375 may still be lowered to direct tapped rubber into the tube 1310. Each of the plurality of smaller tubing sections 1370, 1375 may have a first end closer to the tube 1310 and a second end further from the tube 1310. The first end may have a door that may be opened to release tapped rubber into the tube 1310. When misalignment occurs, only the door of the smaller tubing section 1370 being lowered is opened and the door of the other smaller tubing section 1375 is kept closed.

The plurality of smaller tubing sections may have more than two smaller tubing sections. When the conduit 1360 is misaligned with the section S, one or more of the plurality of smaller tubing sections (e.g., 3) may be prevented from lowering into the tube and the remaining of the plurality of the smaller tubing sections (e.g., 5) may be lowered into the tube to release the tapped rubber through the doors of the remaining smaller tubing sections. The doors of the smaller tubing sections being prevented from lowering are kept closed. When only one single smaller tubing section is employed, the only one single smaller tubing section cannot be lowered when there is misalignment. The utilization of a plurality of smaller tubing sections solves that problem. As such, the conduit 1360 may transport tapped rubber into the tube 1310 regardless whether is misalignment.

Figure 14:
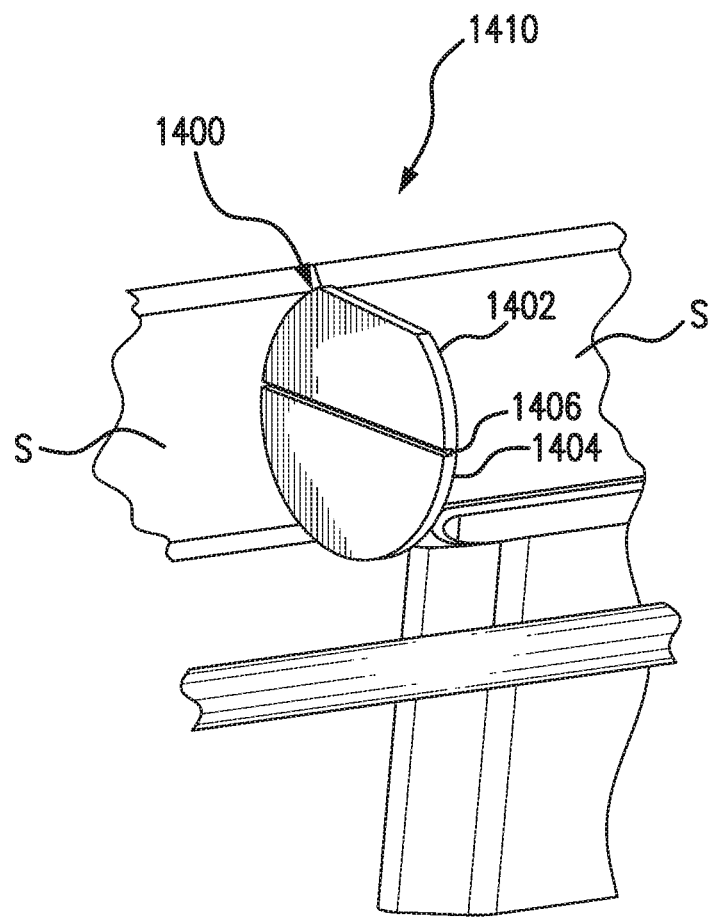
FIG. 14 depicts another illustrative divider separating adjacent sections of the tube in accordance with some embodiments of the present invention.
Figure 15:
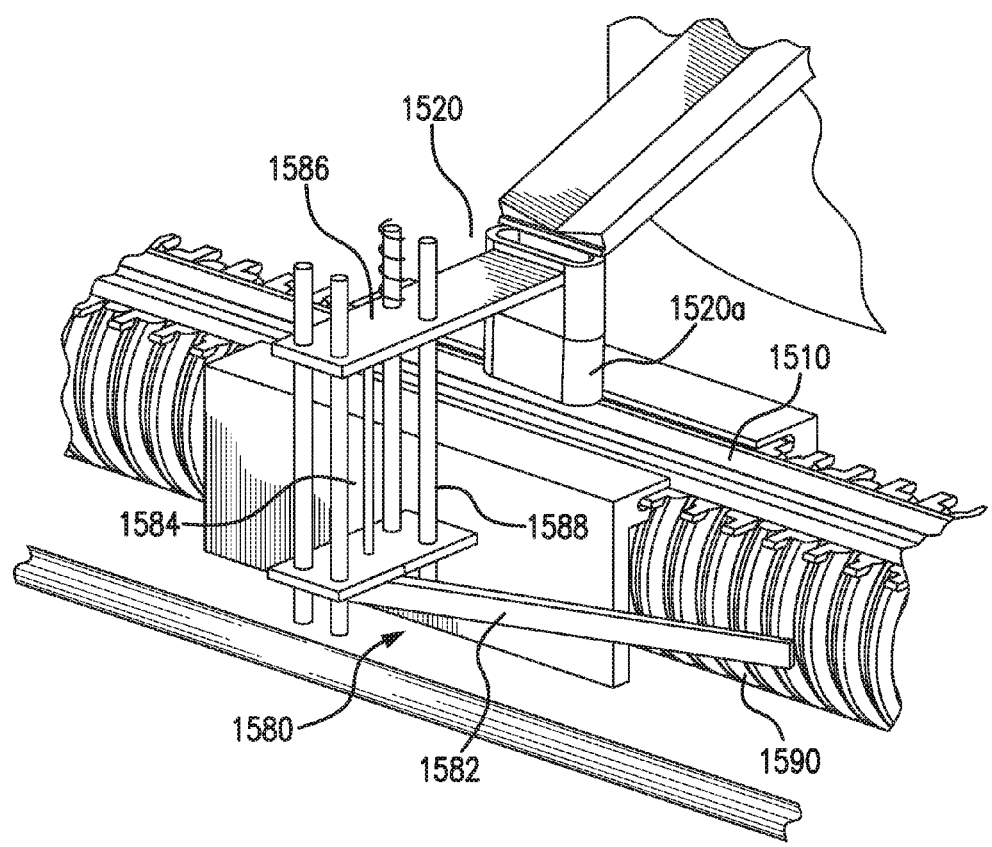
FIG. 15 depicts another illustrative conduit of the collecting apparatus and an illustrative device configured to move the conduit into and out of the tube in accordance with some embodiments of the present invention.

Referring to FIG. 14, another embodiment of the divider 1400 is illustrated. The divider 1400 may comprise an upper portion 1402 and a lower portion 1404. The divider 1400 may be configured such that the upper portion 1402 is bendable toward the lower portion 1404. The upper portion 1402 may be bended to a position such that the upper portion 1402 is perpendicular to the lower portion 1404. The divider 1400 may be made of a flexible material. The divider 1400 may comprise a channel 1406 between the upper portion 1402 and the lower portion 1404 that facilitates the movement of the upper portion 1402 toward the lower portion 1404. The upper portion 1402 and the lower portion 1404 may also be made of a rigid material and the channel 1406 may be configured to allow the upper portion 1402 to pivot toward the lower portion 1404. The upper portion 1402 may be pushed by the conduit (e.g., 1520 as shown in FIG. 15) from an initial position to a second position when the conduit is inserted into the tube 1410 and exerts force on the upper portion 1402. When the conduit is withdrawn from the tube 1410, the upper portion 1402 may return to the initial position from the second position. The initial position may refer to a position when the upper portion 1402 and the lower portion 1404 are planar. The second position may refer to a position when the upper portion 1402 is perpendicular to the lower portion 1404 or a position that the upper portion 1402 is tilted with respect to the lower portion 1404. The divider 1400 may also have other features described with respect to FIG. 12 to the extent they are applicable.

FIG. 15 depicts another embodiment of the conduit 1520 and an illustrative device 1580 configured to move the conduit 1520 into and out of the tube 1510. With the divider 1400 shown in FIG. 14, the conduit 1520 may have only one tubing section 1520a (as opposed to multiple different size tubing sections 620a, 620b as shown in FIGS. 6b and 13) and the tubing section 1520a may have the same circumference or perimeter across the entire length of the tubing section 1520a. The circumference or perimeter may refer to the circumference or perimeter of the cross-section of the tubing section 1520. The length may refer to a direction that is perpendicular to the cross-section. The divider 1400 and the conduit 1520 provide a simpler structure to transport rubber into the tube 1510.

The device 1580 may comprise a beam 1582 and a wire 1584. The beam 1582 has one end in contact with the tube 1510 and another end connected to the wire 1584. The wire 1582 has one end connected to the beam 1582 and another end connected to the conduit 1520. The device 1580 may further comprise a set of columns 1586, 1588 configured to connect the beam 1582, the wire 1584, and the conduit 1520 together. The device 1580 is configured such that when the tube 1510 is moved by the control system in a reverse direction, the tube 1510 exerts force on the beam 1582 through the end of the beam 1582 in contact with the tube 1510 that causes the other end of the beam 1582 to turn away from the tube 1510. As a result, the wire 1584 is pulled toward the beam 1582 or tightened and causes the conduit 1520 to move toward the tube 1510 via the set of columns 1586, 1588. The device 1580 is also configured such that when the tube 1510 is moved by the control system in a forward direction, the tube 1510 exerts force on the beam 1582 through the end of the beam 1582 in contact with the tube 1510 that causes the other end of the beam 1582 to turn toward the tube 1510. As a result, the wire 1584 is loosened and causes the conduit 1520 to move away from the tube 1510 via the set of columns 1586, 1588. The tube 1510 may comprise a plurality of ribs 1590 and a plurality of indentations between the ribs 1590 to exert force on the beam 1582 and to turn the other end of the beam 1582 away or toward the tube 1510 as described. With the device 1580, the conduit 1520 may be operated without electricity.

Figure 16:
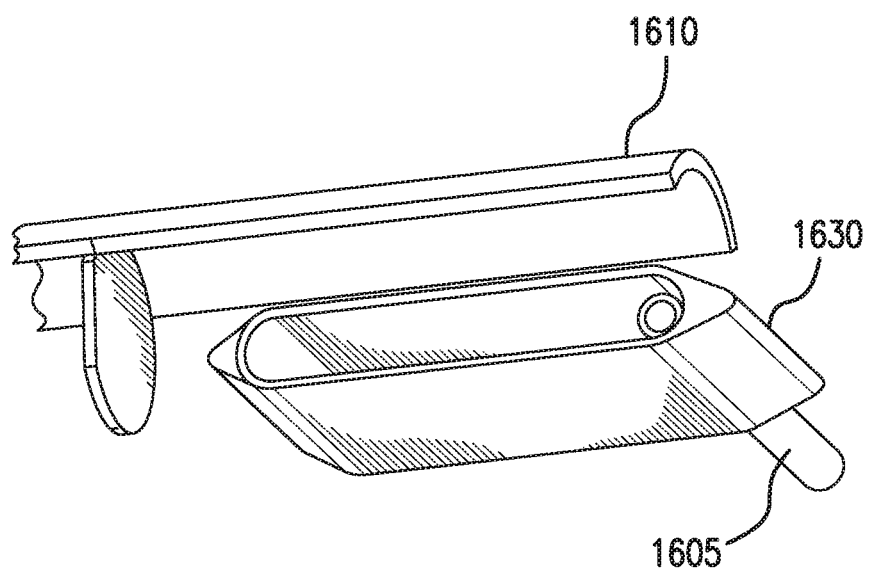
FIG. 16 depicts an illustrative duct inserted into the pipe and connected to a pressure pump to facilitate transferring of rubber from the tube into the large container in accordance with some embodiments of the present invention.

Referring to FIG. 16, one embodiment of a duct 1605 inserted into the pipe 1630 and connected to a pressure pump to facilitate transferring of rubber from the tube 1610 into the large container is illustrated. The pressure pump may generate pressure into the duct 1630 and the tube 1610 or draw pressure out of the duct 1630 and the tube 1610 to expedite the flow of rubber since rubber has a high viscosity that may slow the rubber collection process. The collected rubber may flow into the large container via the pipe 1630 and/or the duct 1605.

Figure 17A:
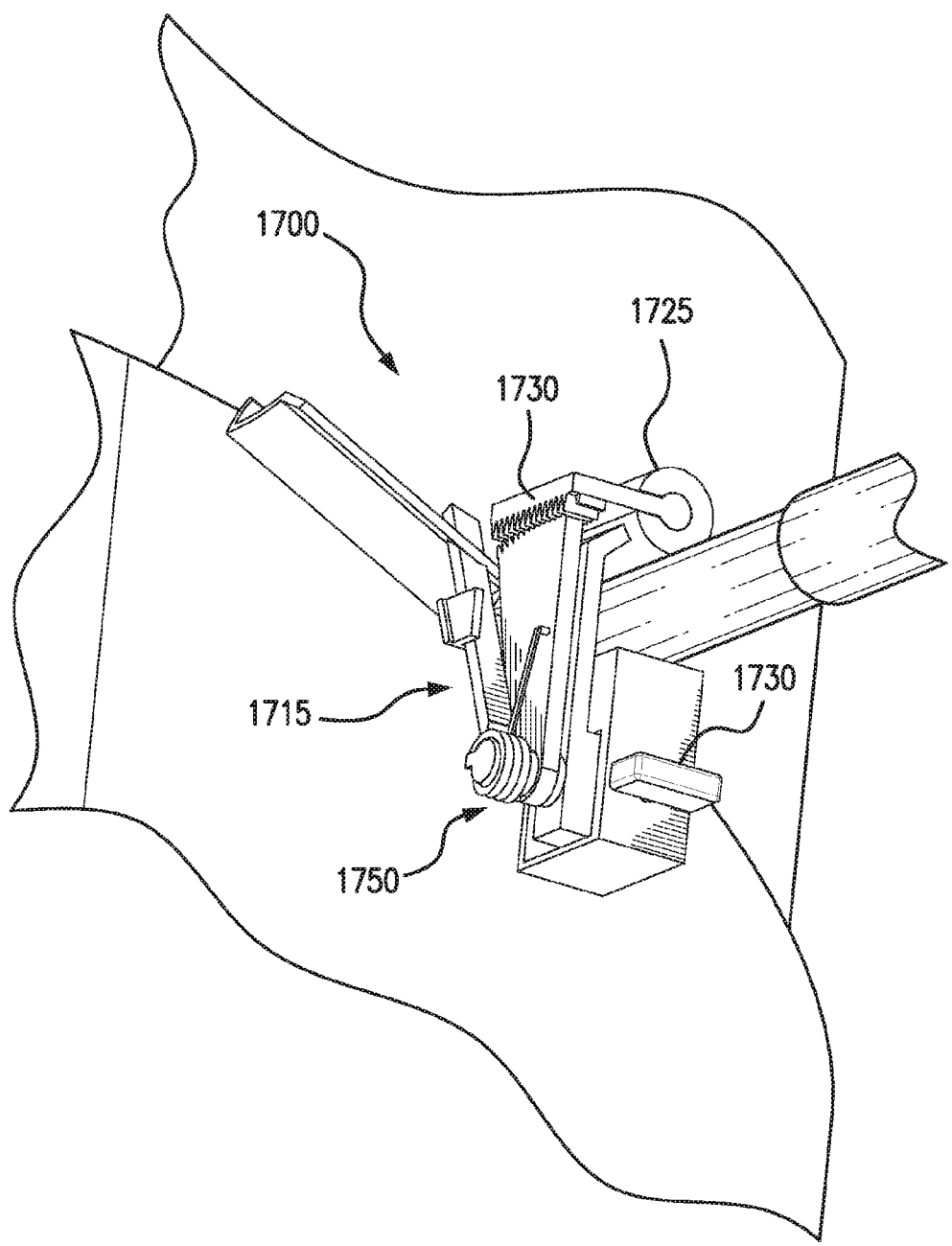
FIGS. 17a and 17b depict another illustrative blade aligning mechanism in accordance with some embodiments of the present invention.
Figure 17B:
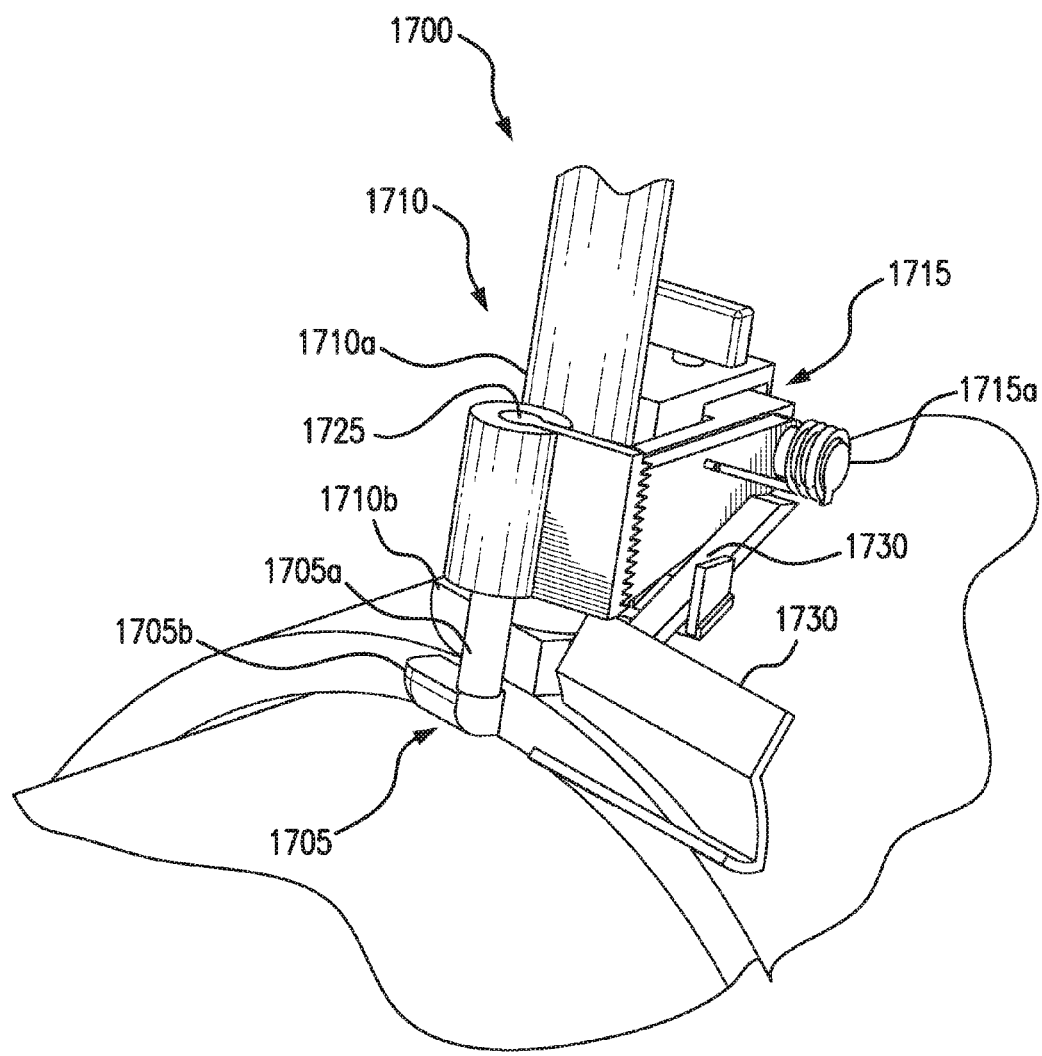

Referring to FIGS. 17a and 17b, another embodiment of the blade aligning mechanism 1700 is illustrated. The blade aligning mechanism 1700 may comprise a first leg 1705, a second leg 1710, a blade adjuster 1715 connecting the first leg 1705 and the second leg 1710, and a blade 1720 attached to the blade adjuster 1715. The first leg 1705 may comprise a first elongated member 1705a and a pad 1705b. The second leg 1710 may also comprise a second elongated member 1710a and a pad 1710b. The blade adjuster 1715 may be configured such that it positions the tip of the blade 1720 and the bottommost surface of the pad 1705b parallel to each other, it moves the first leg 1705 and the blade 1720 simultaneously, and it aligns the tip of the blade 1720 and the bottommost surface of the pad 1705b in a straight line. The simultaneous movement may be achieved through a gear 1730. The blade adjuster 1715 may comprise a spring 1715a that exerts force on the first leg 1705 and the blade 1720. The spring 1715a may exert an amount force that pushes the pad 1705b and the blade 1720 against a surface (e.g., the surface of the bark) and that extends the pad 1705b and the blade 1720 to a position according to the distance between the surface and the blade adjuster 1717. The blade adjuster 1715 may comprise an opening 1725 accommodating the first leg 1705 and the first leg 1705 may move in the opening 1725 according to the thickness of the bark. The blade adjuster 1715 may also comprise a control 1730 configured to adjust the distance between the pad 1705b (or the first leg 1705) and blade 1720 and a surface, or the position of the pad 1705b (or the first leg 1705) and blade 1720 with respect to the second leg 1710. The control 1730 may also be configured to adjust the angle between the blade 1720 and the surface the blade 1720 is cutting (e.g., the cutting angle). As such, in case that the spring 1715a does not have enough elasticity or force to extend the pad 1705a (or the first leg 1705) and the blade 1720 all the way into the bottom of a cut made in the bark, the pad 1705a (or the first leg 1705) and the blade 1720 may be manually adjusted through the control 1730 to reach the bottom of the cut. In some cases, it may be desired not to have the pad 1705a (or the first leg 1705) and blade 1720 extending all the way to the bottom of the cut and the pad 1705a and blade 1720 may be manually adjusted through the control 1730 to extend to a depth less than the depth of the cut. In case that the blade 1720 is misaligned with the surface the blade 1720 is cutting, the cutting angle may be adjusted to ensure that the bark is removed properly or that the cut is made properly to tap rubber. All these adjustment can be made before or during tapping. The blade aligning mechanism disclosed in FIGS. 5a and 5b may also be modified to include such a blade adjusting feature. Features described with respect to FIGS. 5a and 5b may also be incorporated into FIGS. 17a and 17b to the extent they are applicable.

Figure 18:
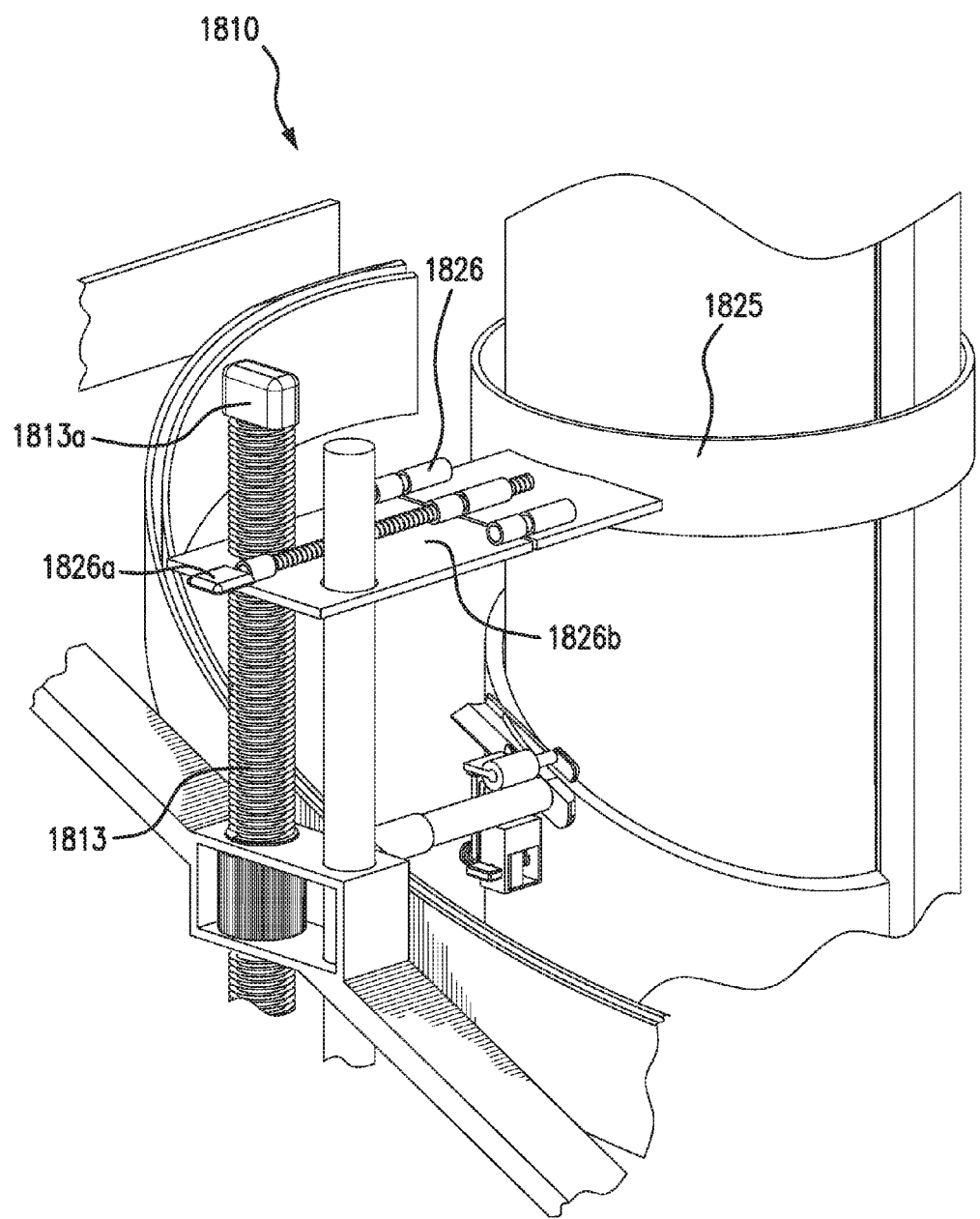
FIG. 18 depicts another illustrative mounting structure of the tapping apparatus in accordance with some embodiments of the present invention.

Referring to FIG. 18, another embodiment of the mounting structure 1810 of the tapping apparatus is illustrated. The first ring 1825, the first beam 1826, and the threaded member 1813 of the mounting structure 1810 are configured differently from those of the mounting structure 310 shown in FIG. 3a. The threaded member 1813 may be configured to move the first beam 1826 and the first ring 1825 along the length of the tree even if the trunk of the tree is curved. The threaded member 1813 may be provided with a control 1813a that can move the first beam 1826 and the first ring 1825 along the length of the tree and adjust the first beam 1826 and the first ring 1825 to accommodate the curvature of the trunk. The first ring 1825 and the first beam 1826 may be adjustable to the thickness of the trunk. The first beam 1826 may be provided with a control 1826a and a threaded member 1826b that are configured to adjust the diameter of the first ring 1825. The control in FIGS. 17 and 18 may be a switch, knob, or the like that may be operated by an user to make adjustments of the corresponding structure.

Figure 19:
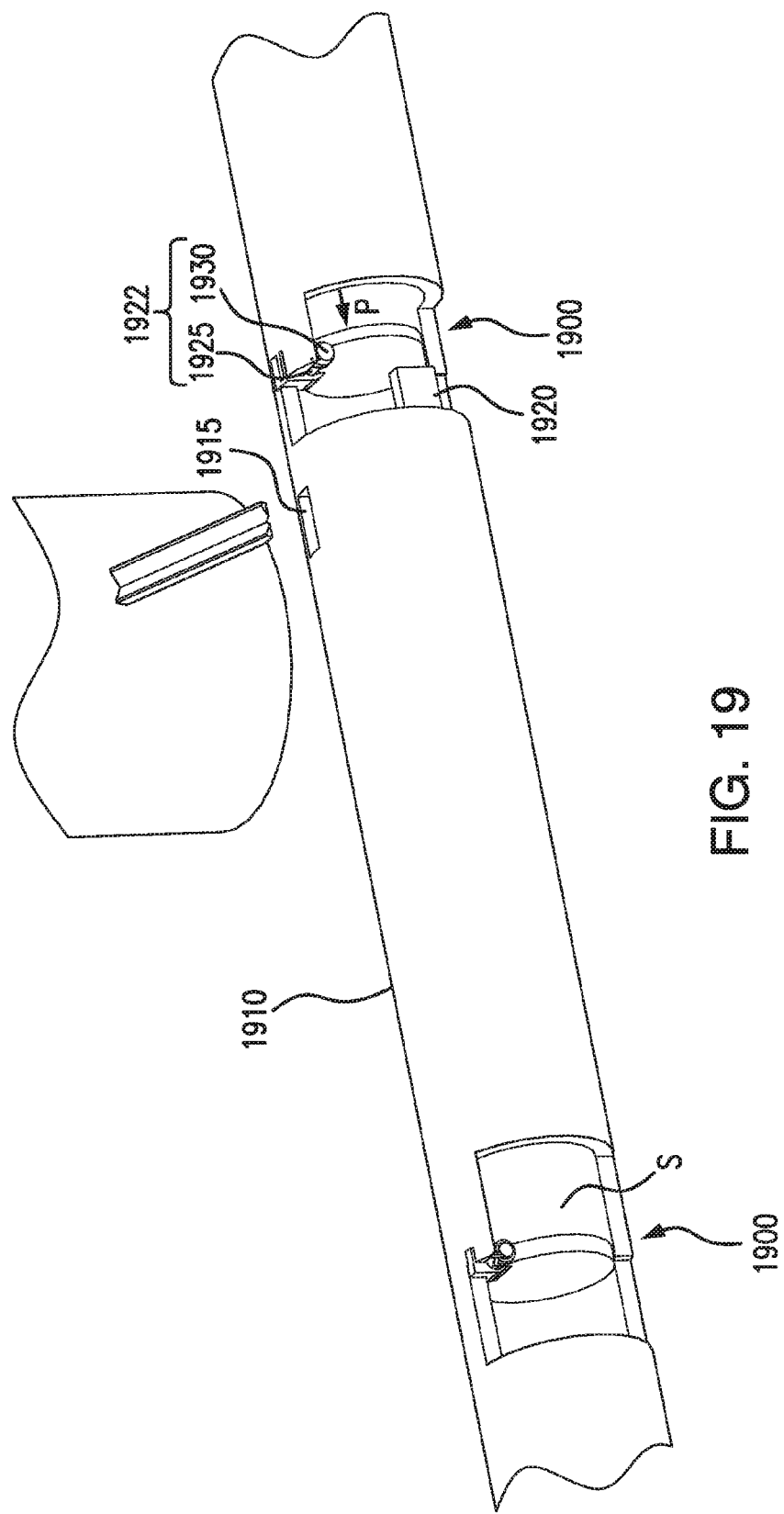
FIG. 19 depicts another illustrative divider separating adjacent sections of the tube in accordance with some embodiments of the present invention.

FIG. 19 depicts another illustrative divider 1900 separating adjacent sections of the tube in accordance with some embodiments of the present invention. The divider 1900 is similar to the dividers discussed in FIGS. 12-14 except that the divider 1900 is movable within the tube 1910 between a closed position and an open position. In the closed position (shown in the figure), the divider 1900 extends across the tube 1910 and prevents all or a substantial amount of the rubber in the section S from flowing into another section. In the open position, the divider 1900 is maneuvered toward an opening 1915 on the tube 1910 configured to receive tapped rubber and allows the rubber in the section S to flow freely between adjacent sections. The divider 1900 includes an end attached to the interior of the tube 1910 through a flexible device 1922 and a protrusion 1920 attached to another end opposite to the one end. The flexible device 1922 is configured to engage the interior of the tube 1910 and the divider 1900 and to provide the movement between the close position and the open position. The flexible device 1922 may include a screw 1930 and a spring 1925 to facilitate such engagement and movement. The protrusion 1920 includes a structure or shape corresponding to the structure or shape of the opening 1915. When the divider 1900 is moved to the open position, the protrusion 1920 is inserted into the opening 1915. When the divider 1900 is moved to the closed position, the protrusion 1920 is removed from the opening 1915. The protrusion 1920 may have a rectangular, square, circular, or other shape.

The tube 1910 is connected to a pressure generator to receive an air pressure P strong enough to move the divider 1900 from the closed position to the open position or to push the rubber in the section S in a direction (e.g., from right to left) that moves the divider 1900 from the closed position to the open position and maintains the divider 1900 in the open position. When the pressure is turned off or reduced, the divider 1900 is returned to the closed position. The flexible device 1922 or spring 1925 exhibits an elasticity high enough to hold the divider 1900 in the closed position without being mobilized by the rubber received during the collection process (e.g., when the rubber drips into the tube 1910 and/or as the rubber accumulates in the section S) and low enough to give away when the air pressure is applied to the divider 1900 or rubber. The other divider 1900 (on the left of FIG. 19) operates similarly and includes a similar protrusion. When the pressure is applied to the interior of the tube 1910, both dividers 1900 are moved from the closed position to the open position. In this way, all the rubber can be transported in one direction and be disposed into the large container.

Figure 20:
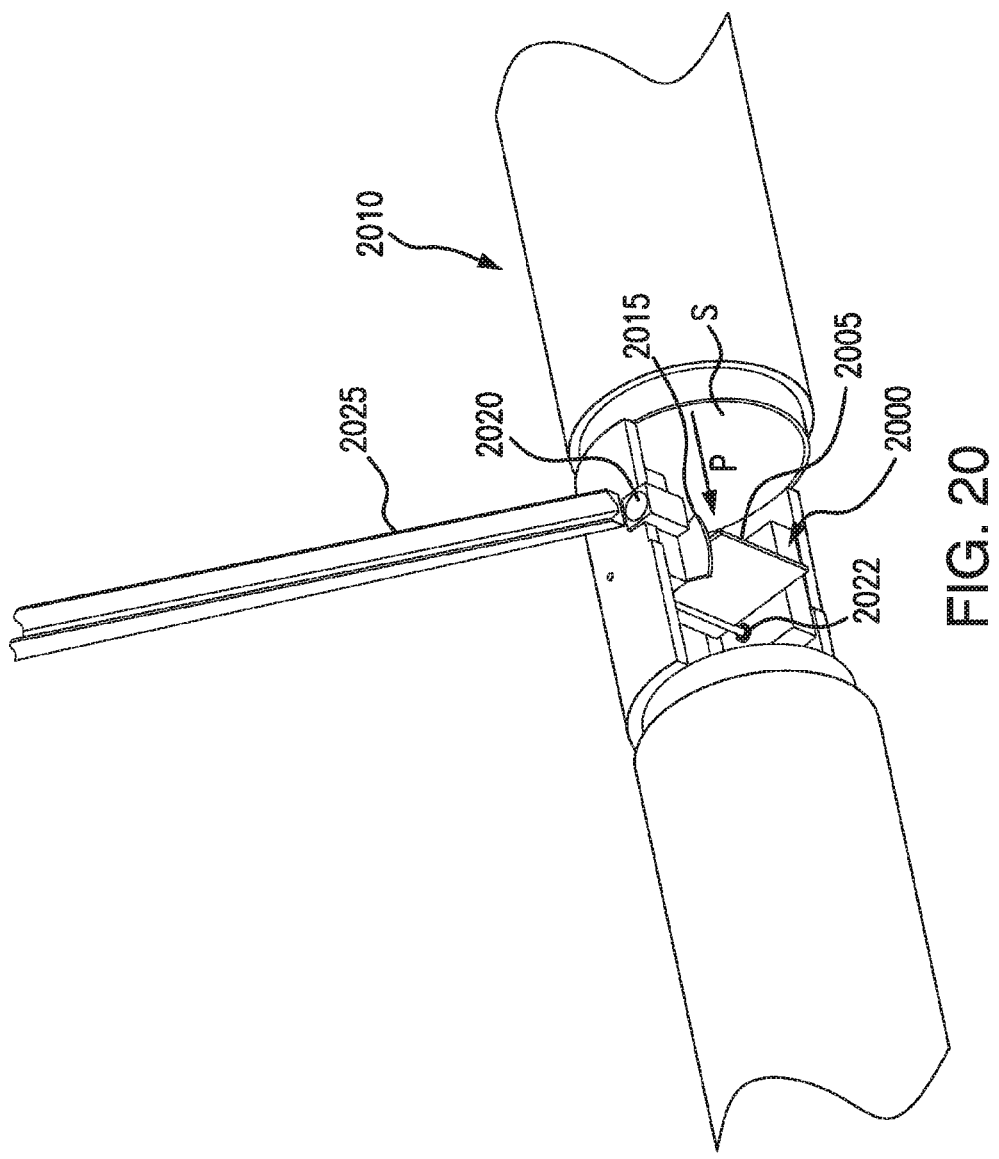
FIG. 20 depicts yet another illustrative divider separating adjacent sections of the tube in accordance with some embodiments of the present invention.

FIG. 20 depicts yet another illustrative divider 2000 separating adjacent sections of the tube in accordance with some embodiments of the present invention. The divider 2000 is similar to the divider 1900 except that the divider 2000 has a different structure and operation. The divider 2000 includes a first plate 2005 configured to move between a closed position and an open position. In the closed position (shown in the figure), the first plate 2005 extends across the tube 2010 and prevents all or a substantial amount of the rubber in the section S from flowing into another section. In the open position, the first plate 2005 is maneuvered toward an adjacent section and allows the rubber in the section S to flow freely between adjacent sections. The divider 2000 also includes a second plate 2015 configured to move between a closed position and an open position. In the open position (shown in the figure), the second plate 2015 is moved to a location away from an opening 2020 on the tube 2010 configured to receive tapped rubber. In this position, the tapped rubber can flow from the slide 2025 into the tube 2010 through the opening 2020. In the closed position, the second plate 2015 is moved to a location directly below the opening 2020. In this position, the tapped rubber on the slide 2025 is blocked from entering the tube 2010. The second plate 2015 has a size larger than the diameter of the opening 2020 and smaller than the size of the first plate 2005. The second plate 2015 is attached to one end of the first plate 2005, and another end of the first plate 2005 is attached to the interior of the tube 2010 through a flexible device 2022. The flexible device 2022 is configured to engage the interior of the tube 2010 and the first plate 2005 and to provide the movement between the close position and the open position for both the first plate 2005 and the second plate 2015. The flexible device 2022 may include a screw and a spring to facilitate such engagement and movement. In some embodiments, the flexible device 2022 may be located on the same end where the second plate 2015 is located. The first plate 2005 may have a rectangular shape, a square shape, a shape corresponding to the cross-section of the tube 2010, or other shape. The second plate 2015 may have a rectangular shape, a square shape, a shape corresponding to the cross-section of the opening 2020, or other shape.

The tube 2010 is connected to a pressure generator to receive an air pressure P strong enough to move the first plate 2005 from the closed position to the open position or to push the rubber in the section S in a direction (e.g., from right to left) that moves the first plate 2005 from the closed position to the open position and maintains the first plate 2005 in the open position. The same pressure also moves the second plate 2015 from the open position to the closed position and maintains the second plate 2015 in the closed position. When the pressure is turned off or reduced, the first plate 2005 is returned to the closed position and the second plate 2015 is returned to the open position. The flexible device 2022 or spring exhibits an elasticity high enough to hold the first plate 2005 in the closed position and the second plate 2015 in the open position without being mobilized by the rubber received during the collection process (e.g., when the rubber drips into the tube 2010 and/or as the rubber accumulates in the section S). The same elasticity is also low enough to give away when the air pressure is applied to the first plate 2005, the second plate 2015, and/or rubber. When the pressure is applied to the interior of the tube 2010, the plates 2005, 2015 are moved to their corresponding position. In this way, all the rubber can be transported in one direction and be disposed into the large container.

With the above configurations, the conduit, bracket, arms, and release mechanism discussed in FIGS. 6-7 are unnecessary and the tube does not need to be pulled or rotated by the control system. The collected rubber can be transported with the tube being stationary. The divider or plate may be surrounded by a seal so they can completely prohibit the rubber in one section from leaking into another section when it is in the closed position.

Figure 21:
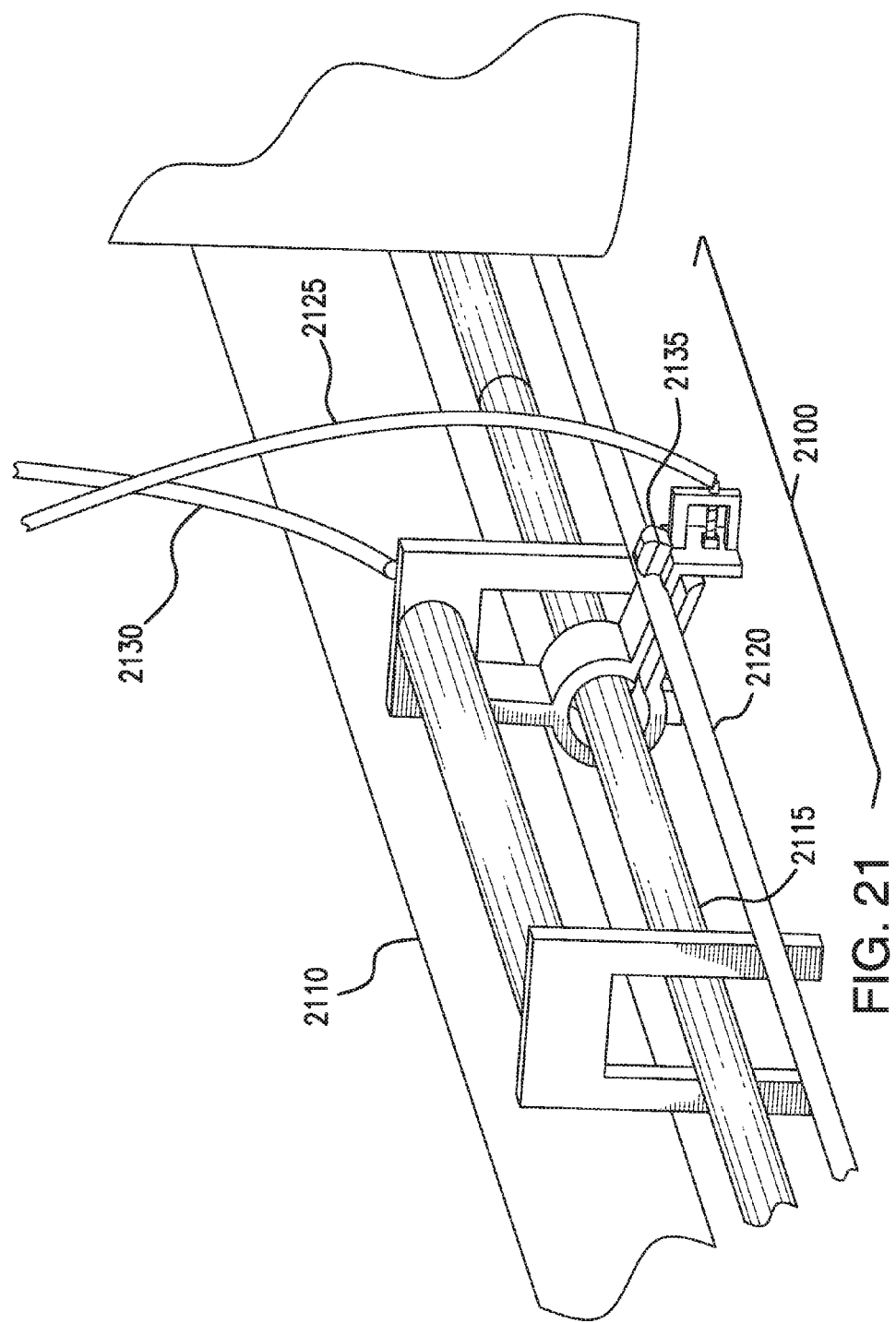
FIG. 21 depicts a release device configured to operate the tapping apparatus in accordance with some embodiments of the present invention.

FIG. 21 depicts a release device 2000 configured to operate the tapping apparatus in accordance with some embodiments of the present invention. The release device 2000 is similar to the release device discussed in FIGS. 6-7 except that release device 2000 is installed on different components. Instead of installing on the tube 2110, the release device 2000 is installed on a mechanical wire 2115 and an electrical wire 2120. The wires 2115, 2120 are connected to the control system and routed similarly to the tube shown in FIG. 11. The mechanical wire 2115 is controlled by the control system such that it can be rotated in a forward direction and a reversed direction. The mechanical wire 2115 is configured to provide only mechanical movement and any component attached to it is also moved by the wire 2115 when the wire 2115 moves. The electrical wire 2120 is configured to transmit electricity and is stationary. Another difference between the release device 2000 and the release device in FIGS. 6-7 is that the release device 2000 includes a magnet 2135. When electricity is conducted over the wire 2120, the electricity generates magnetism that bonds the first beam (e.g., 715*a*) and a second beam (e.g. 715*b*) together with collaboration from the magnet 2135. As a result, the movement of the wire 2115 causes the release mechanism 2100 to move that in turn causes the corresponding component on the tapping apparatus to move via the wire 2130. When no electricity is conducted, the first beam and second beam are loosened that in turn loosens the first portion (e.g., 705). As a result, the movement of the wire 2115 does not actuate the corresponding component on the tapping apparatus via the wire 2130.

The electricity is provided by the control system. The wire 2125 corresponds to the wire 720 shown in FIG. 7a and the wire 2130 corresponds to the wire 750a. The wires 2125, 2130 and the release mechanism 2100 operate similar to the wires 720, 750a and the release mechanism 700, respectively, and the description provided with respect to FIGS. 7-8 equally applies to FIG. 21.

Figure 22:
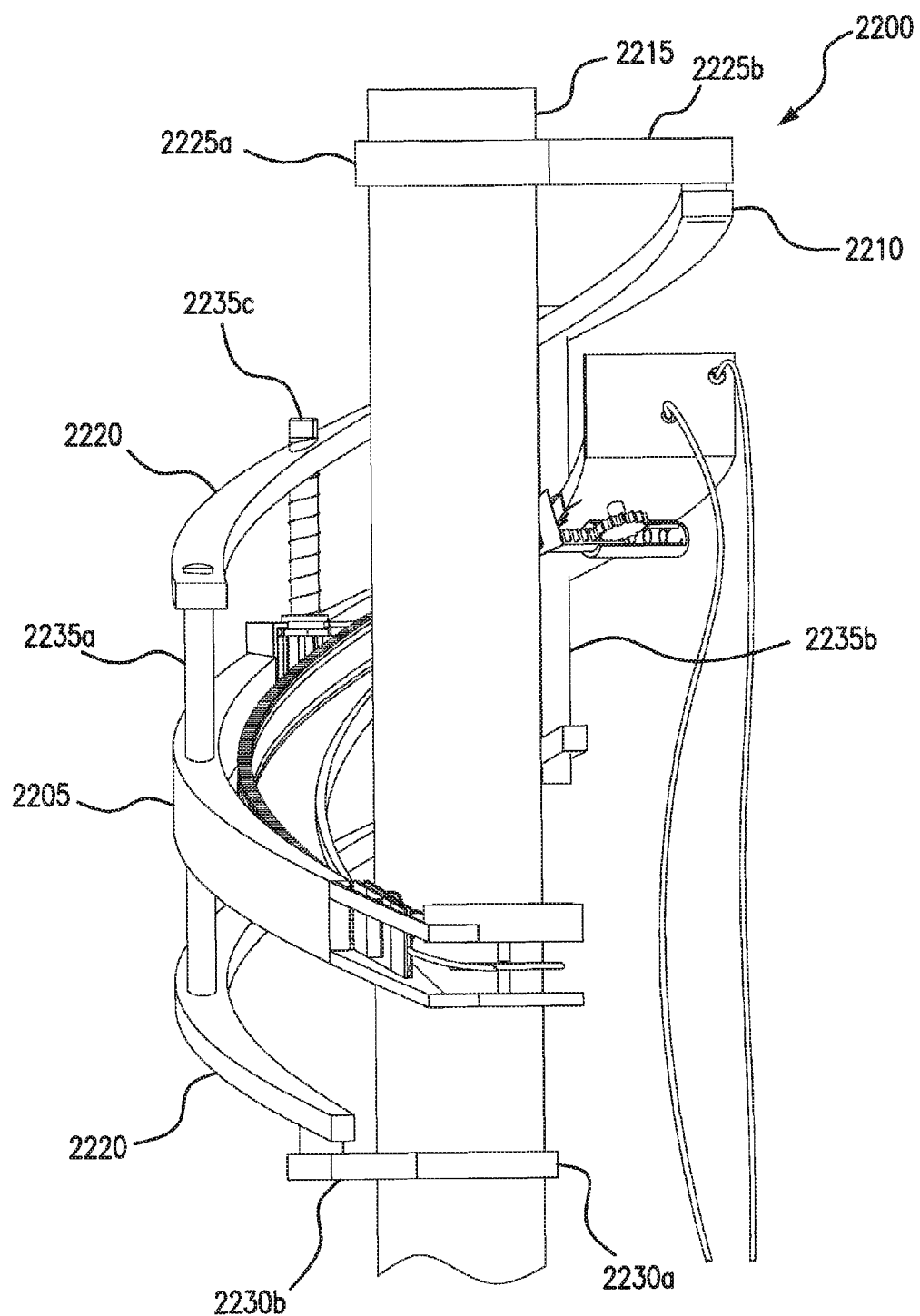
FIGS. 22-23 depict another illustrative tapping apparatus for tapping rubber in accordance with some embodiments of the present invention.
Figure 23:
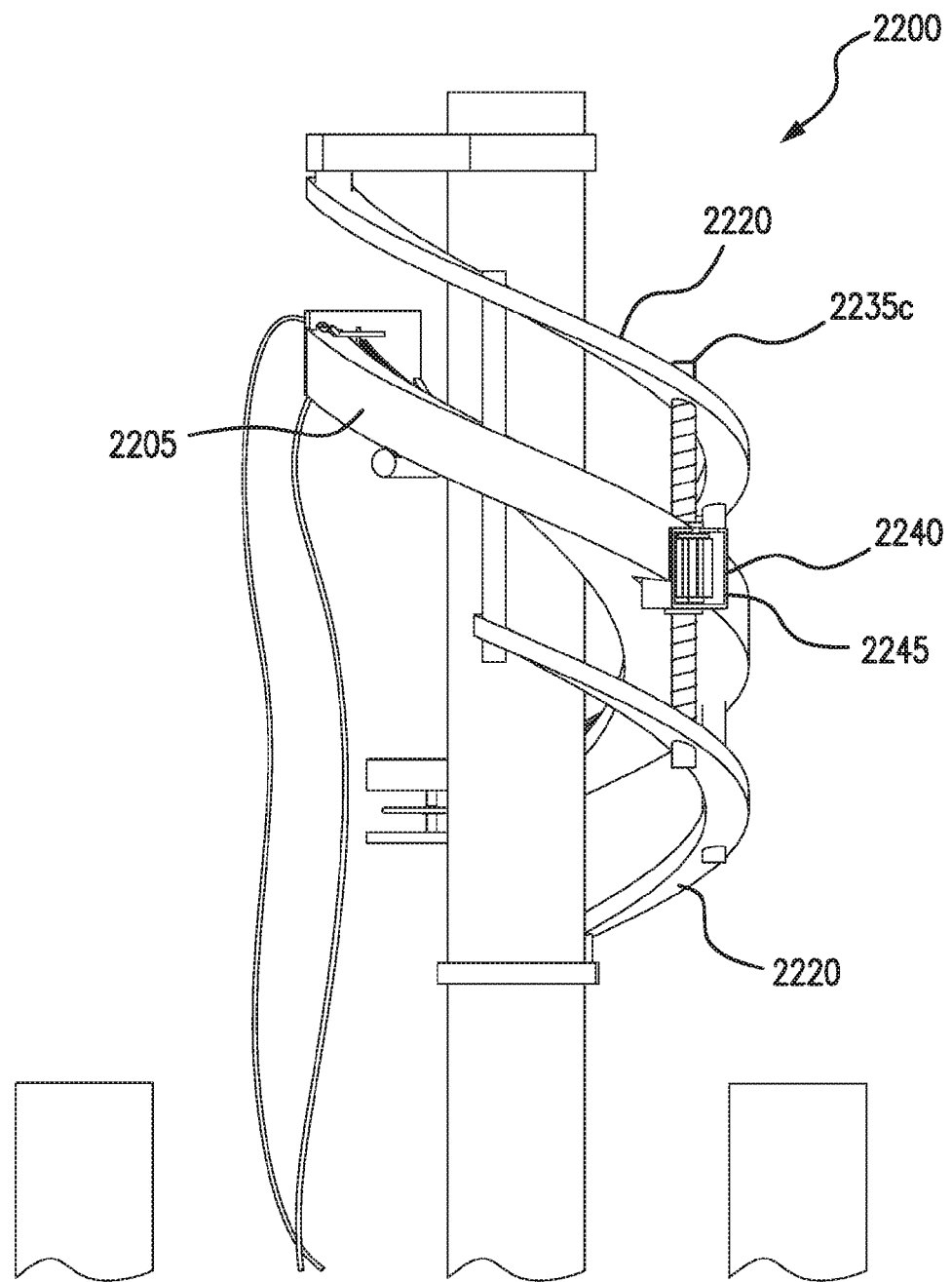

FIGS. 22-23 depict another illustrative tapping apparatus 2200 for tapping rubber in accordance with some embodiments of the present invention. The tapping apparatus 2200 comprises a rail 2205 and a mounting structure 2210 configured to hold the rail 2205 and connect the tapping apparatus 2200 to a tree trunk 2215. The mounting structure 2210 includes a pair of beams 2220 sandwiching the rail 2205, a first ring 2225a with a first beam 2225b, a second ring 2230a with a second beam 2230b, and one or more rods 2235a-2235c extending between the pair of beams 2220 and through the rail 2205. The first ring 2225a with the first beam 2225b is connected to the upper beam of the pair of beams 2220 on one end of the upper beam and the rod 2235a is connected to the upper beam on another end of the upper beam that is opposite to that one end. The second ring 2230a with the second beam 2230b is connected to the lower beam of the pair of beams 2220 on one end of the lower beam and the rod 2235b is connect to the lower beam on another end of the lower beam that is opposite to that one end. The rod 2235c is positioned between the rods 2235a, 2235b, and the rods 2235a-2235c are parallel to each other. The rods 2235a-2235c may have the same length and be arranged on the mounting structure 2210 to have different height when the tapping apparatus 220 is installed on the tree and the rodes 2235a-2235c are measured from the ground. The rod 2235b closer to the first ring 2225a with the first beam 2225b may be arranged higher than the remaining rods 2235a, 2235c. The first ring 2225a and the second ring 2230a (and/or their respective beams 2225b, 2230b) are configured in a manner such that they can be opened and closed, be secured on the tree trunk 2215, and are adjustable to the size or diameter of the tree trunk. The rod 2235c is similar to the threaded member 213 in FIG. 1 and the threaded member 1813 in FIG. 18. The rod 2235c also includes a bracket 2240 and a wheel 2245 similar to the bracket 330 and the wheel 331 in FIGS. 3a and 3b. The structure and operation of the rod 2235c, the bracket 2240, and the wheel 2245 are comparable to their counterparts and will not be repeated here. The tapping apparatus 220 is configured such that the rail 2205 is movable between the upper beam and the lower beam.

Figure 24:
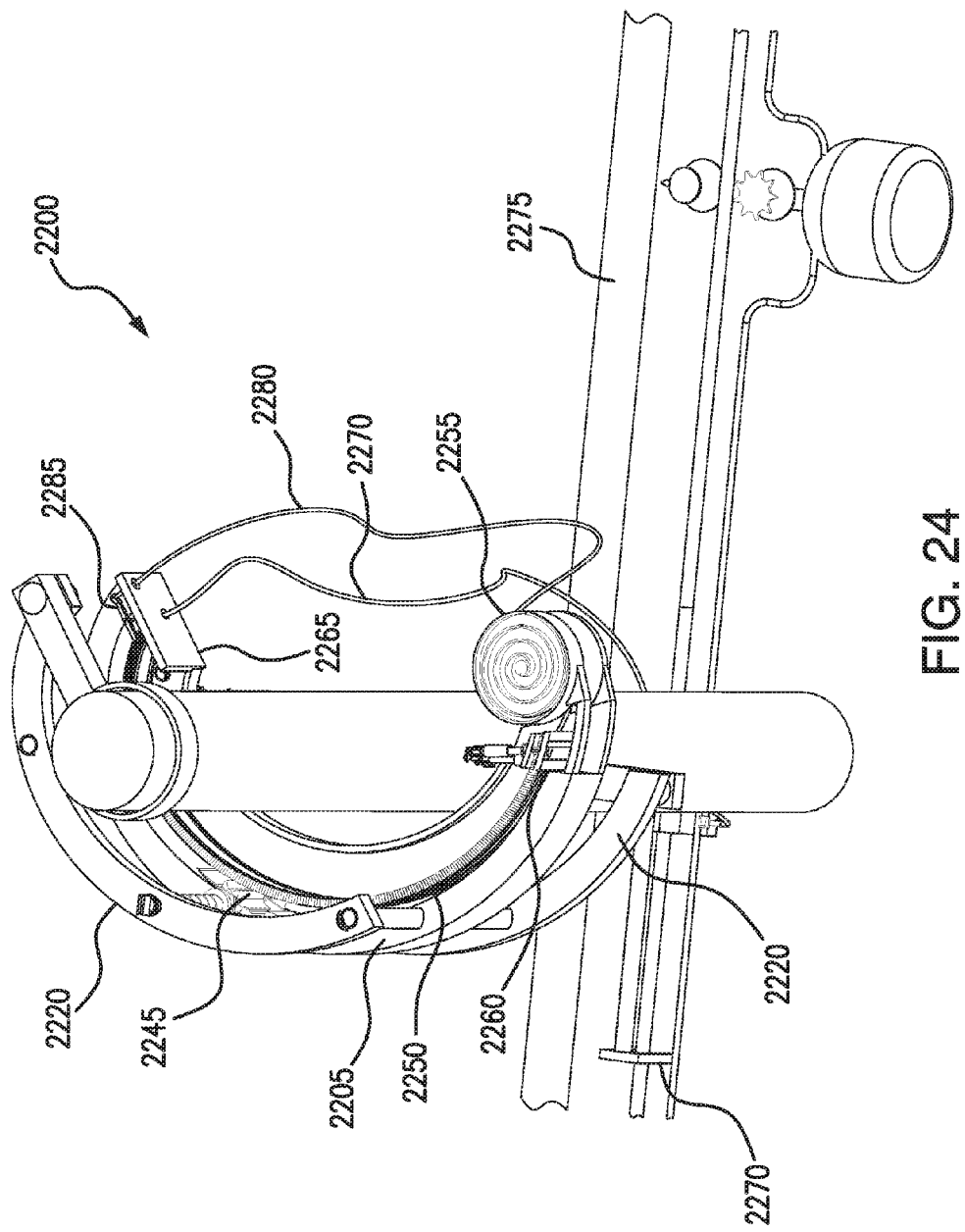
FIGS. 24-25 depict another view of the tapping apparatus shown in FIGS. 22-23 in accordance with some embodiments of the present invention.
Figure 25:
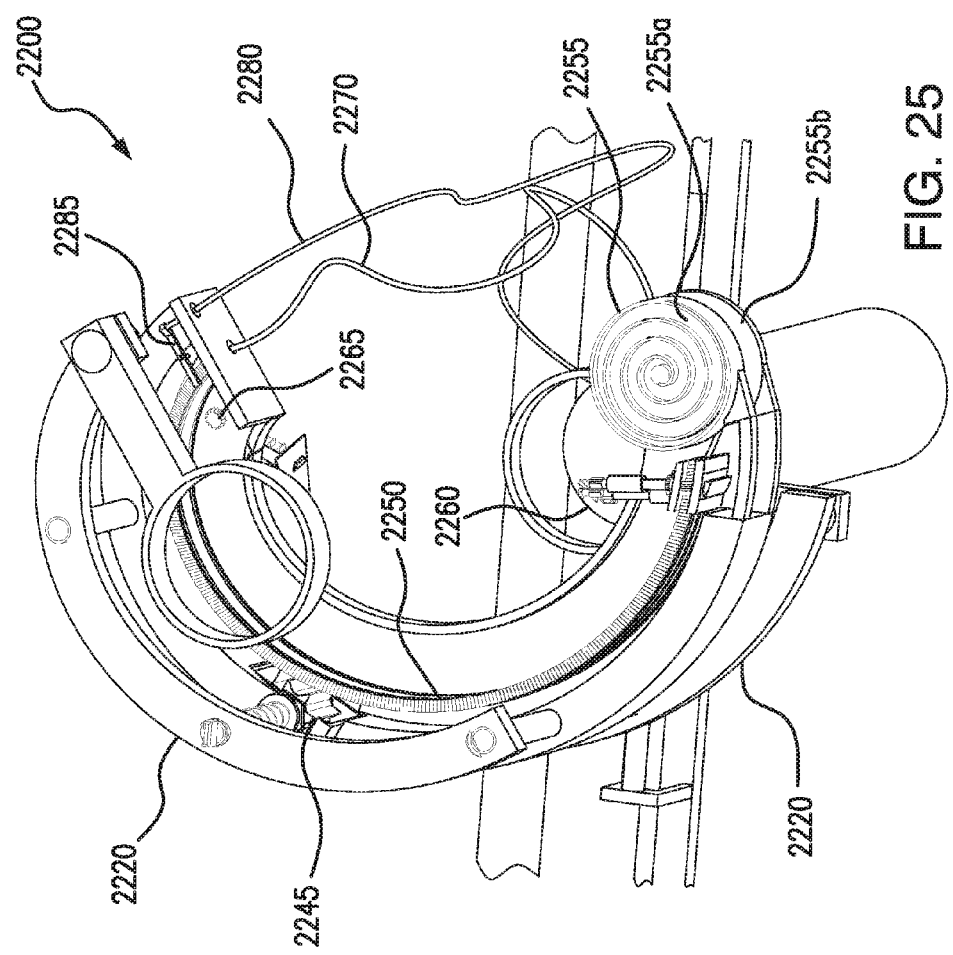

FIGS. 24-25 depict another view of the tapping apparatus 2200. The rail 2205 comprises a track 2250, a wire storage 2255, a cutter 2260, and a gear 2265. The track 2250 includes a plurality of teeth configured to engage with a gear of the cutter 2260. The track is routed from one end of the rail 2205 (where the wire storage 2255 is positioned) to another end of the rail 2205 (where the gear 2265 is positioned). The cutter 2260 is connected to the track 2250 and configured to move along the track 2250. The movement of the cutter 2260 is controlled by wire 2270 that connects the rail 2250 and the release mechanism 2270. When the tube 2275 is rotated, the release mechanism 2270 or the tube 2275 provides the force needed to pull the cutter 2260 toward the other end of the rail 2205 or the gear 2265. On the way to the other end, part of the cutter 2260 may engage the wheel 2245 but without moving the rail 2205 toward the upper beam or the lower beam. Once the cutter 2260 reaches the other end and the force need to pull the cutter 2260 no longer exists, the cutter 2260 is pulled toward the wire storage 2255. On the way to the wire storage 2255, part of the cutter 2260 may engaged the wheel 2245 to move the rail 2205 toward the upper beam or the lower beam. The wire storage 2255 includes a spring or similar device that exerts enough force to pull the cutter 2260 on the other end toward the wire storage 2255 when there is no force being applied by wire 2270 on the other end. The force needed to pull the cutter to the other end is greater than the force exerted by the spring. The cutter may remove a portion of the skin or bark of the tree on the way to the other end or to the wire storage 2255. Wire 2270 corresponds to wire 750a in FIG. 7a and wire 850 in FIG. 8, and wire 2280 corresponds to wire 720 in FIG. 7a and wire 820. The rail 2205 also includes a pedal 2285 connected to wire 2280. The pedal 2285 corresponds to the pedal 830 in FIG. 8. The structure and operation of the wires 2270, 2280, the pedal 2285, and the release mechanism 2270 are similar to their respective counterparts and will not be repeated here. The structure and operation of the wires 2270, 2280, the pedal 2285, and the release mechanism 2270 (and other necessary components) function in a manner to transport the cutter 2260 between the two ends of the rail 2205 and to maneuver the rail 2205 between the pair of beams 2220.

Figure 26:
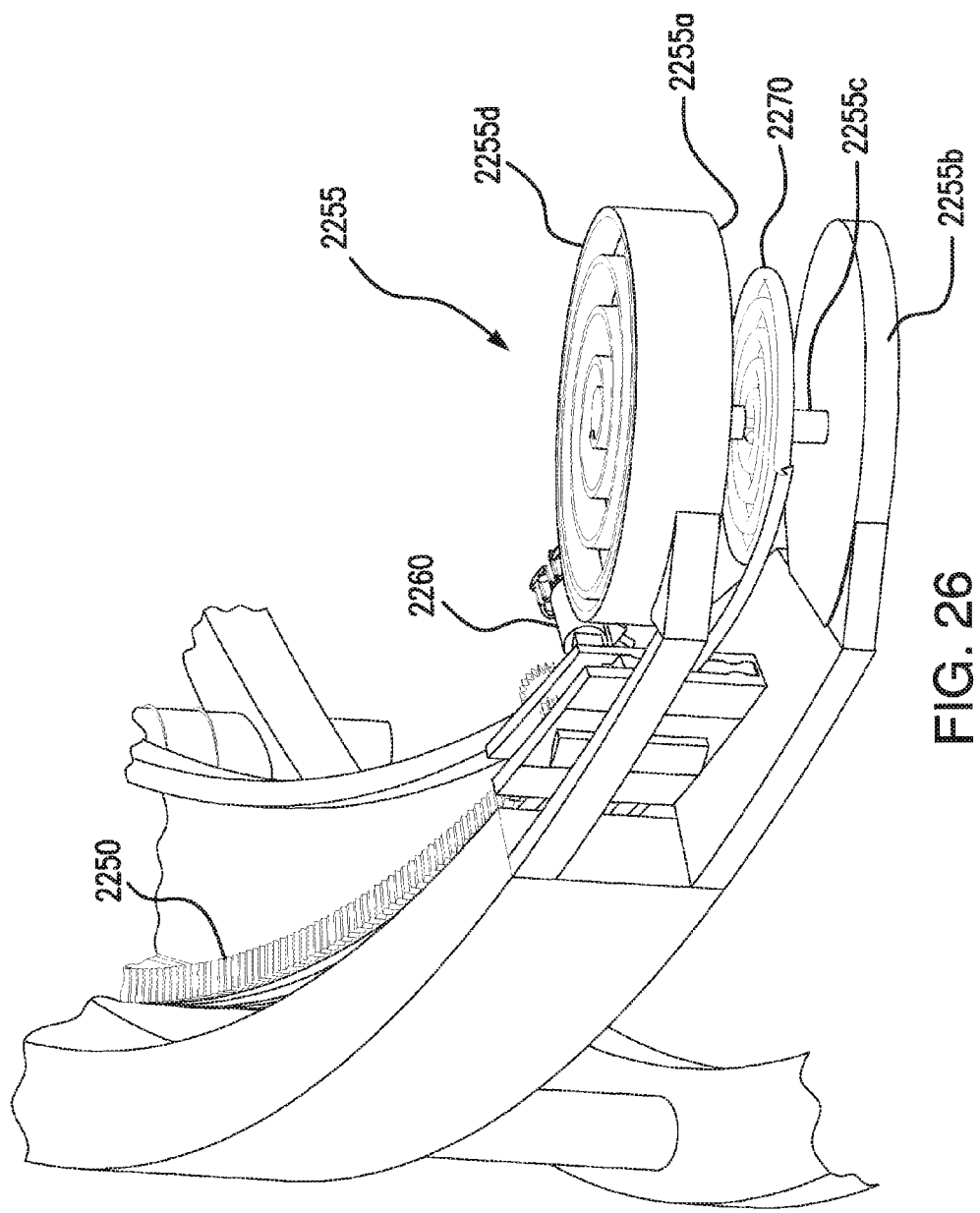
FIG. 26 depicts an illustrative wire storage in accordance with some embodiments of the present invention.

FIG. 26 depicts the wire storage 2255 in greater detail. The wire storage 2254 includes a pair of parallel plates 2255a, 2255b (see FIG. 25) and a rod 2255c attaching the plates 2255a, 2255b together. The wire storage 2255 also includes a spring 2255d or similar device adhere to one of the plates 2255a, 2255b. In some embodiments, the plate to which the spring 2255d is adhered is part of the spring 2255d such that the plate the spring 2255d are one single integrated device. In some embodiments, the plate to which the spring 2255d is adhered is optional and the wire storage 2254 includes only one plate. The tip of the wire 2270 is secured to the rod 2255c and the wire 2270 can be pulled or collected by the wire storage 2255 via the spring 2255d. The spring 2255d exerts force strong enough to pull the cutter 2260 to a position that contacts the wire storage 2255, that stops removing a portion of the bark, or that is close enough to the wire storage 2255. The force is sufficient to rotate the rod 2255c and/or pull the wire 2270 in a circular motion so the wire 2270 can be collected on the rod 2255c. In one embodiment, the spring 2255d has a whirl configuration and the rod 2255c is inserted into the center of the whirl configuration. The whirl configuration controls the amount of elasticity or force that can be exerted by the spring 2255d, and the whirl configuration can be modified by changing the material used to manufacture the spring 2255d such as a more rigid or soft material or by changing the physical structure of the spring 2255d such as making the spring 2255d larger or smaller, the fringe spacing larger or smaller, or the dimension of the fringe larger or smaller. The plates 2255a, 2255b preferably have a circular shape so they correspond to the shape formed by the collected wire or the circular motion but they may have other shapes as well. The wire 2270 is placed below or adjacent the track 2250.

Figure 27:
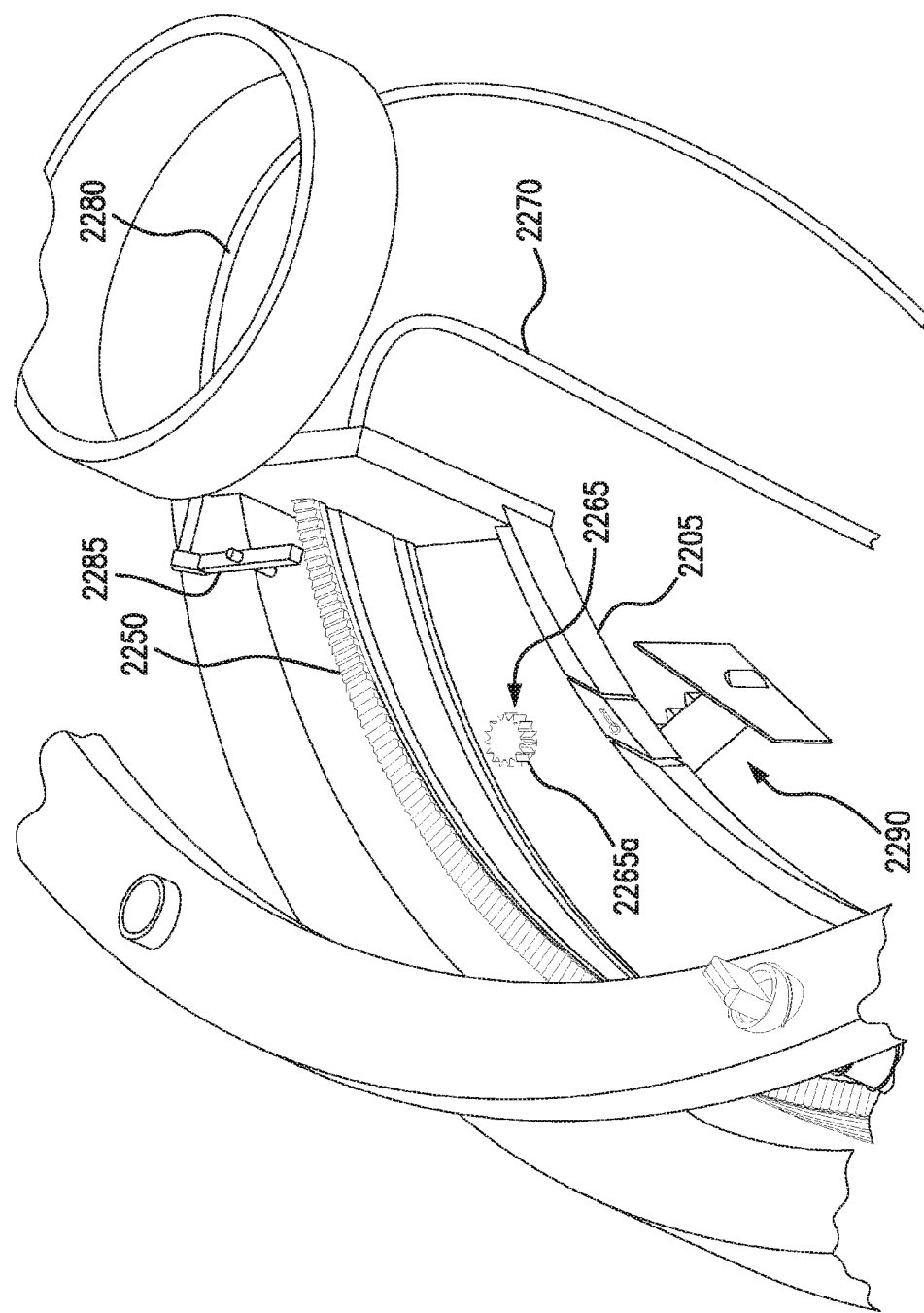
FIGS. 27-28 depict illustrative gears of the rail and an illustrative cutter lifting device in accordance with some embodiments of the present invention.
Figure 28:
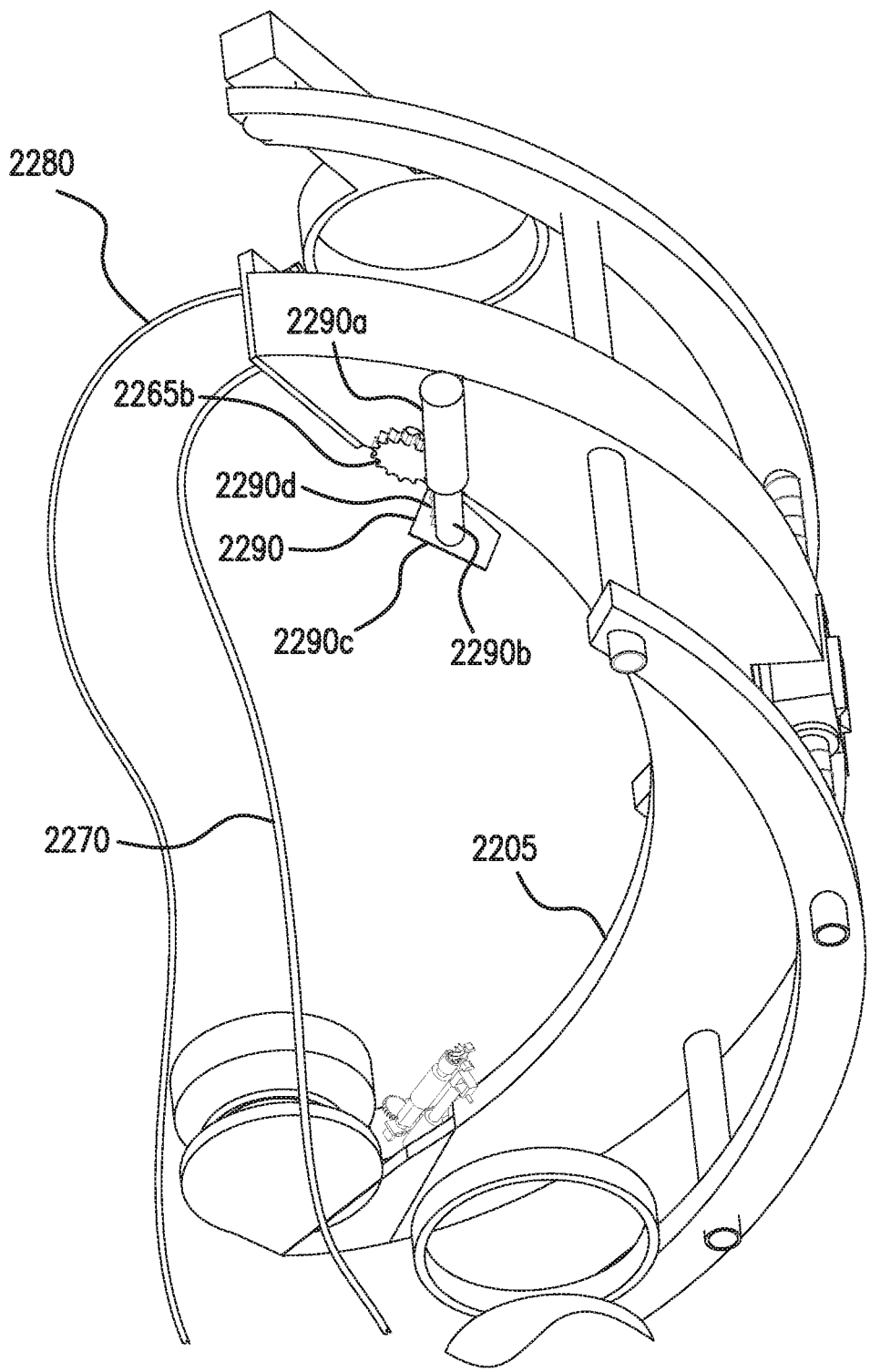

FIGS. 27-28 depict the gear 2265 in greater detail. The gear 2265 having a rod extending through the rail 2205 to engage with a cutter lifting device 2290 that is also part of the rail 2205. On the upper side of the rail 2205 or the side on which the track 2250 is located, the gear 2265 is configured to engage with the cutter 2260 when the cutter 2260 is pulled to the other end of the rail 2205 by the wire 2270. Upon engagement, the cutter 2260 rotates the gear 2265 in one direction that also rotates the bottom portion of the gear 2265 to rotate in the same direction. The gear 2265 also refer to a top gear 2265a, a bottom gear 2265b, and a rod connecting the top gear and the bottom gear. The bottom portion may correspond to the bottom gear 2265b, and the bottom gear 2265b is a gear located on the lower side of the rail 2205. The rotation of the bottom gear 2265b can control the length (or position) of the cutter lifting device 2290 by moving the small tube 2290b into or out the large tube 2290a. In one embodiment, the cutter lifting device 2290 comprises a large tube 2290a, a small tube 2290b, and a plate 2290 attached to an end of the small tube 2290b. The large tube 2290 and the small tube 2290b are in slidable engagement and the slidable movement is controlled by the rotation of the bottom gear 2265b. The large tube 2290a and/or the small tube 2290b include a plurality of teeth to engage with the bottom gear 2265b so that the movement of or the energy from the bottom gear 2265 can be transferred onto the cutting lifting device 2290. When the cutter 2260 engages with the top gear 2265a, the cutter 2260 also engages with the plate 2290c. The cutter 2260 may also engage with the plate 2290c before the cutter 2260 engages with the top gear 2265a. Further movement by the cutter 2260 on the track 2250 can cause the cutter 2260 on the plate 2290c to lift up, lift away from the tree trunk, or to lift the cutter 2260 toward the rail 2205 (via the top gear 2265a, the rod, the bottom gear 2265b, and the larger and small tubes 2290a, 2290b). Movement or further movement of the cutter 2260 may refer to movement toward the other end of the rail 2205 or the wire storage or movement before or after touching the pedal 2285. The cutter 2260 is pulled to a position to contact the pedal 2285 so the movement of the cutter 2260 can control the operation of the release mechanism or other component via the wire 2280. FIG. 28 is also a bottom view of the tapping apparatus.

Figure 29:
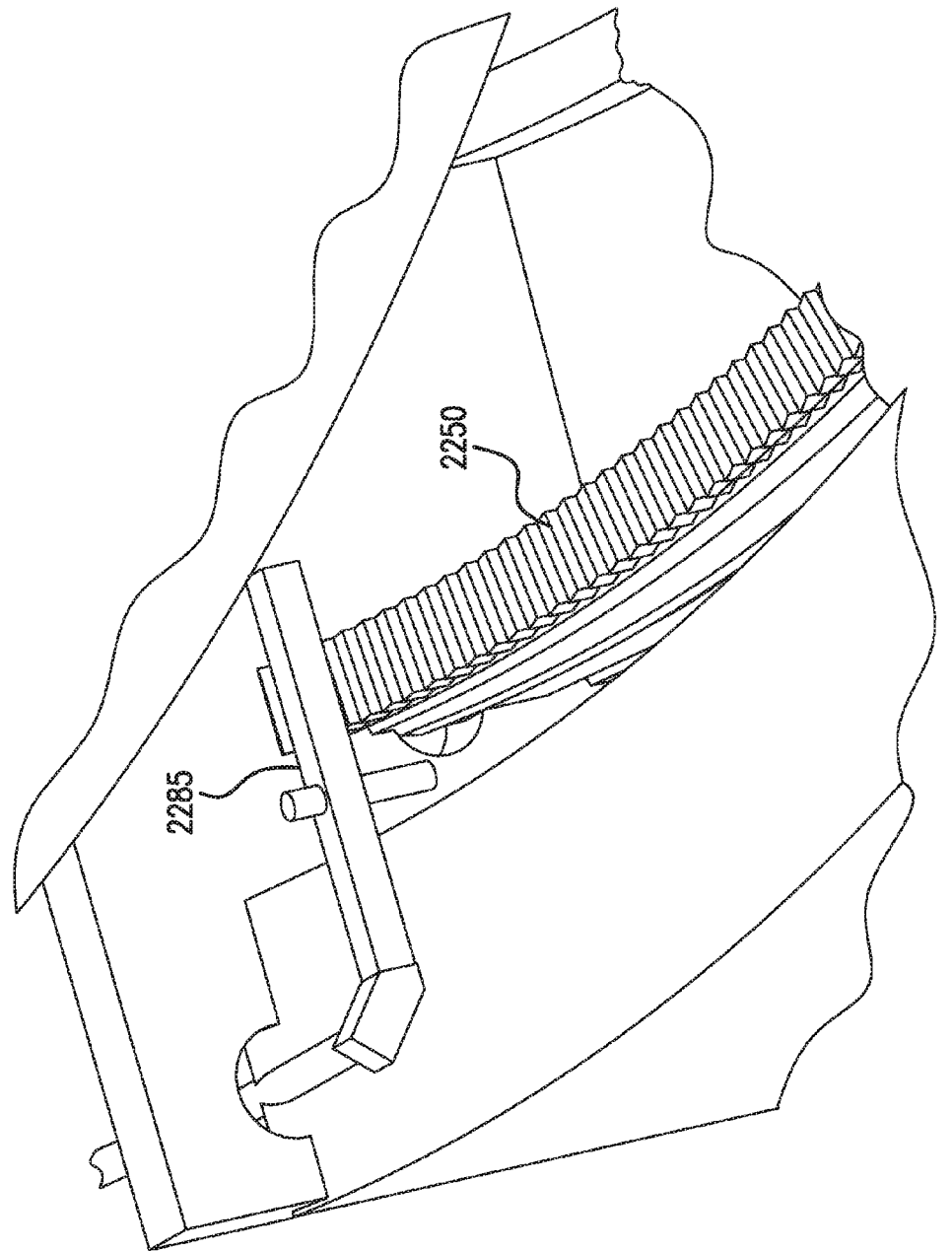
FIG. 29 depicts an enlarged view of an illustrative pedal and an illustrative track in accordance with some embodiments of the present invention.

FIG. 29 depicts an enlarged view of the pedal 2285 and the track 2250. The pedal 2285 has a length sufficient to be contacted by the cutter 2260 when the cutter 2260 is pulled to the pedal 2285. In one embodiment, the pedal 2285 has a length sufficient to extend into the path of the track 2250. In another embodiment, the pedal 2285 has a shorter length without extending into the path of the track 2250 (see FIG. 27). In either embodiment, the cutter 2260 can physically contact the pedal 2285 when the cutter 2260 is pulled to the pedal 2285.

Figure 30:
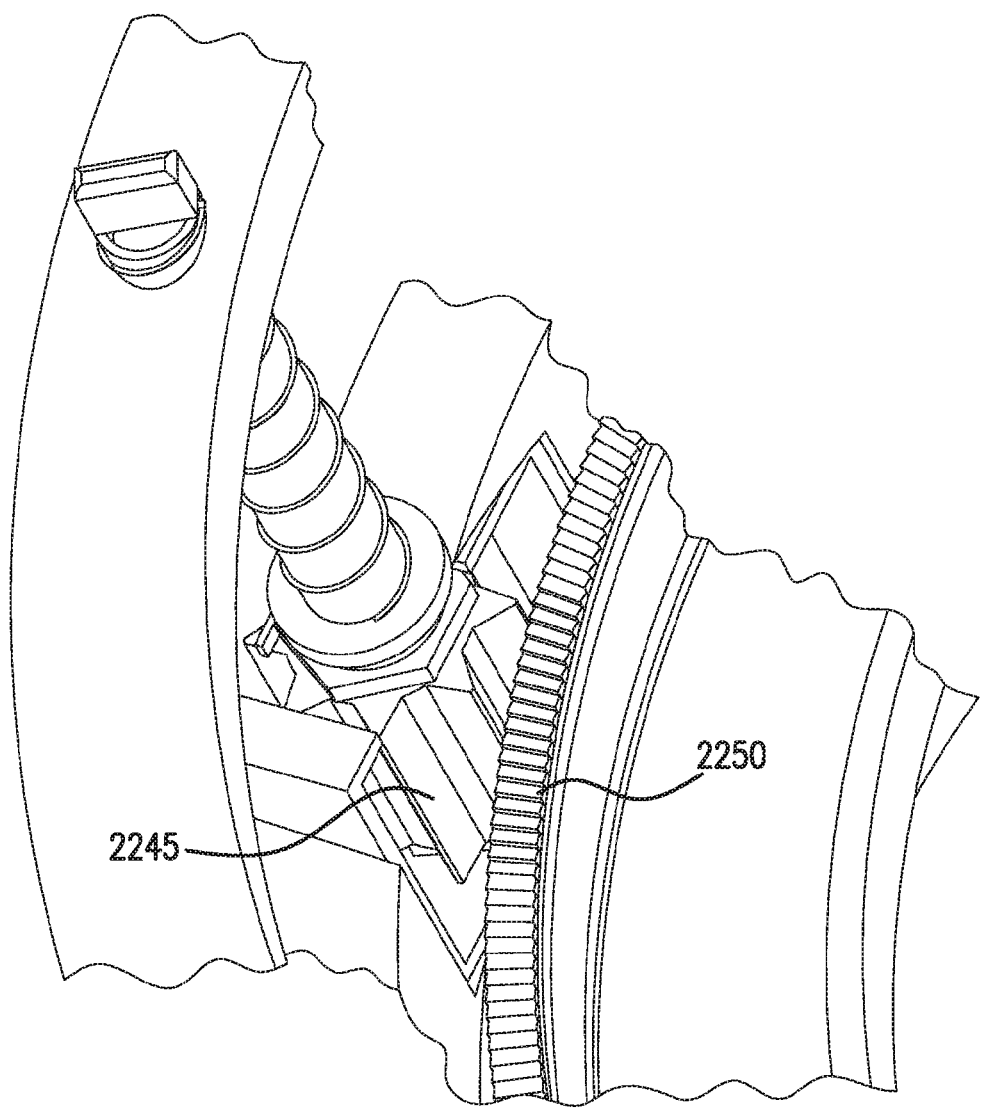
FIG. 30 depicts an enlarged view of an illustrative wheel and an illustrative track in accordance with some embodiments of the present invention.

FIG. 30 depicts an enlarged view of the wheel 2245 and the track 2250. The wheel 2245 and the track 2250 are arranged in a manner such that there is a space between the wheel 2245 and the track 2250 and that a portion of the cutter can pass through the space (e.g., plate 3002 in FIG. 32). The movement of the cutter in one direction (e.g., from the other end of the rail to the wire storage) can cause the wheel 2245 to rotate but not in the other direction (from the wire storage to the other end of the rail). The rotation of the wheel 2245 can move the rail downward or upward.

Figure 31:
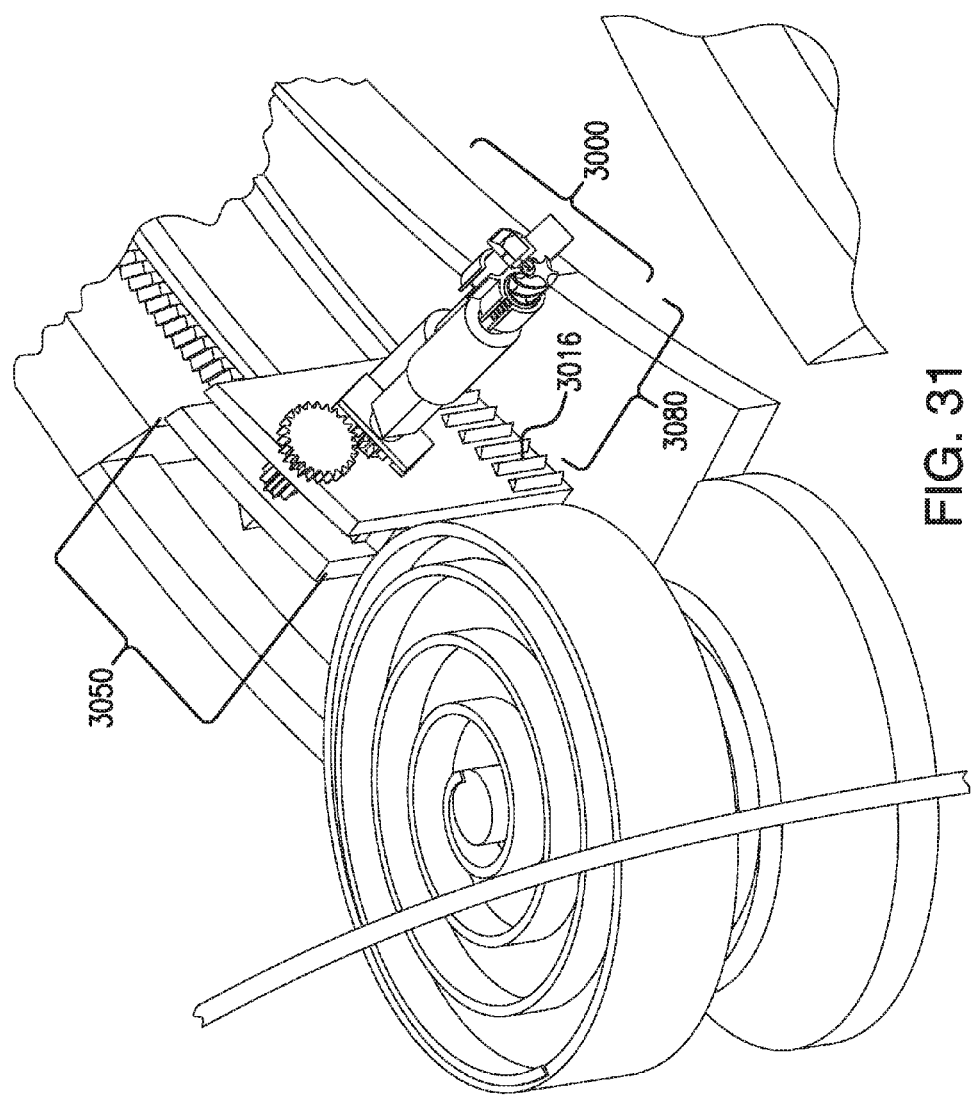
FIGS. 31-32 depict an enlarged view of an illustrative cutter in accordance with some embodiments of the present invention.
Figure 32:
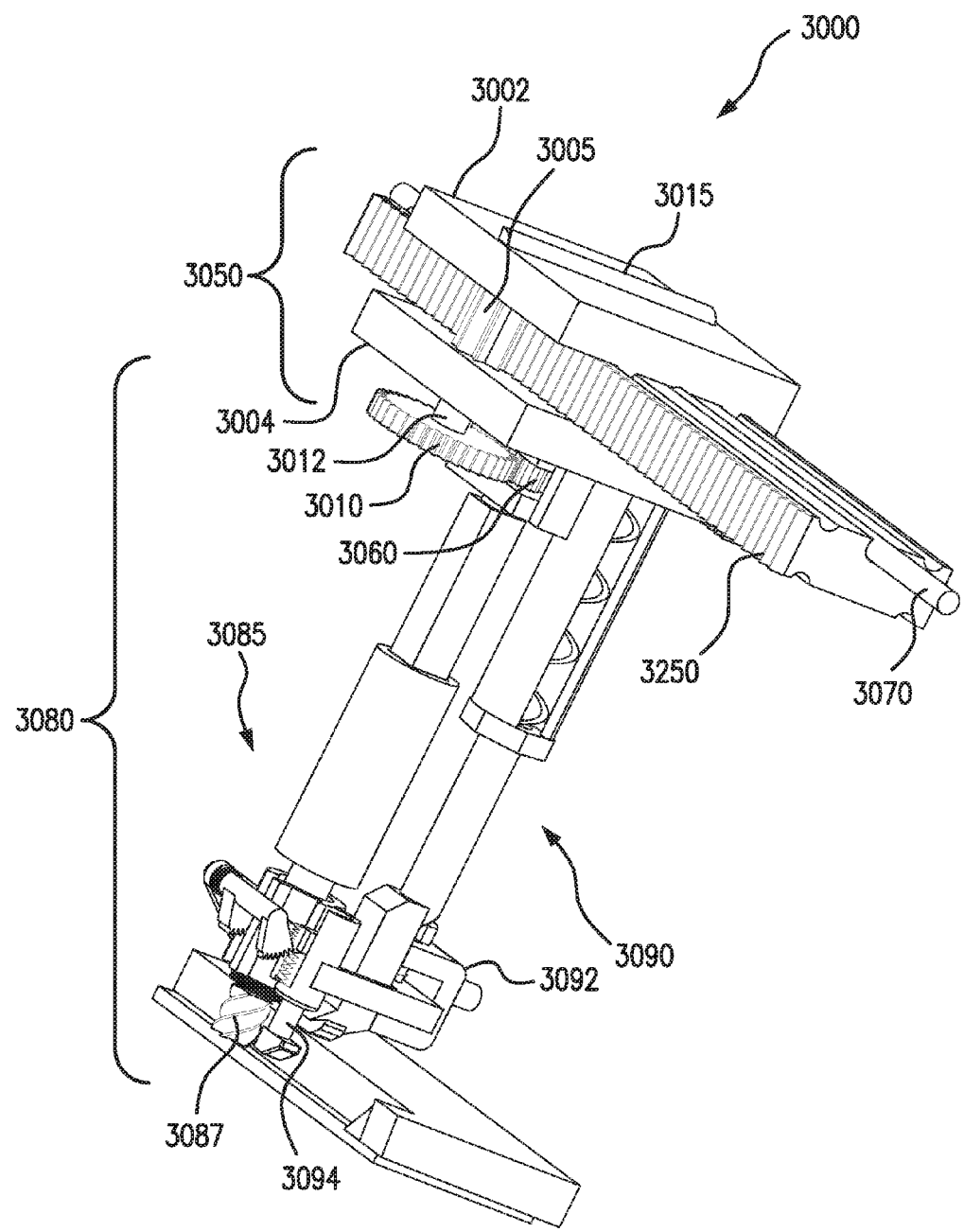
Figure 33:
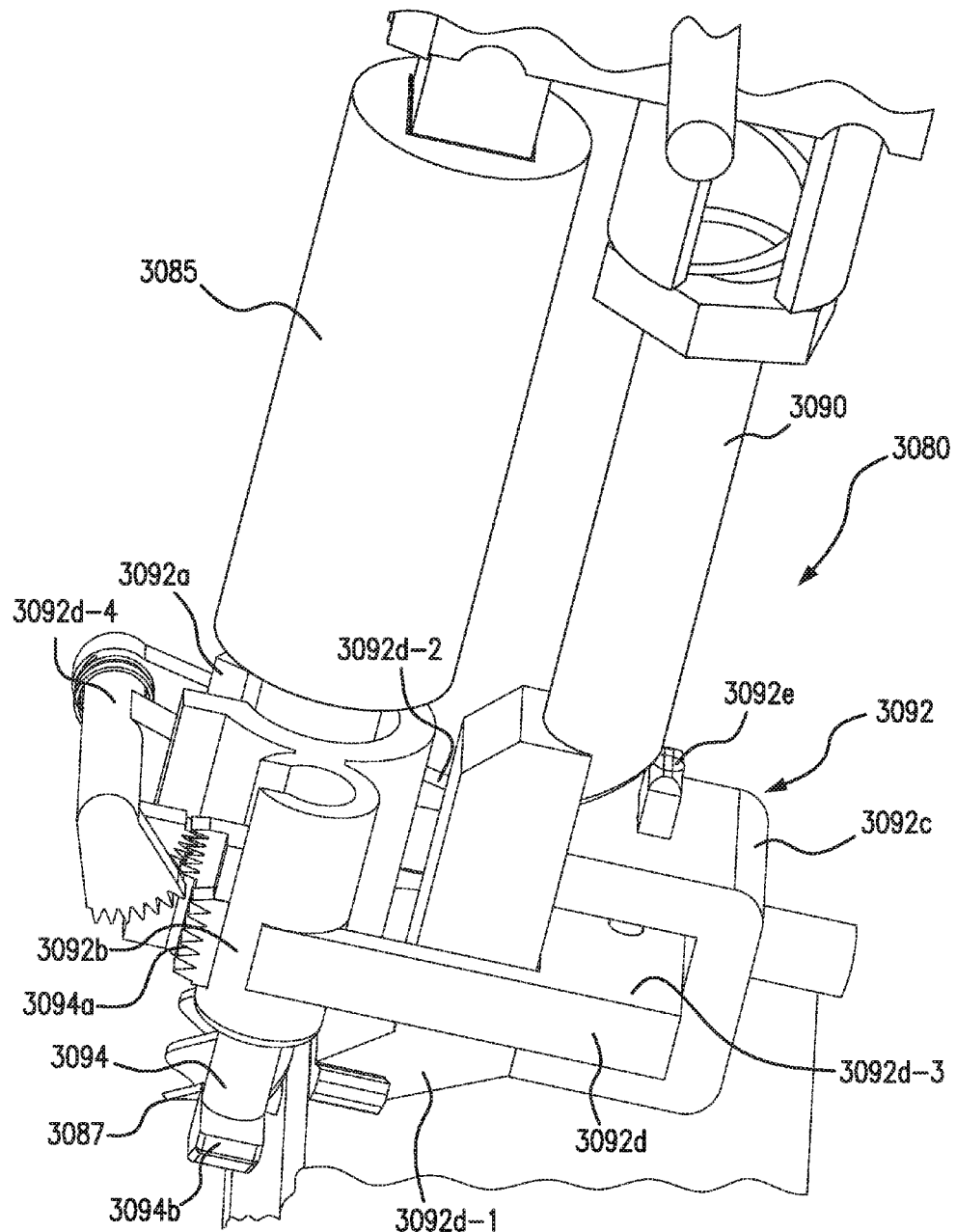
FIGS. 33-36 depict enlarged views of an illustrative drill aligning mechanism in accordance with some embodiments of the present invention.
Figure 34:
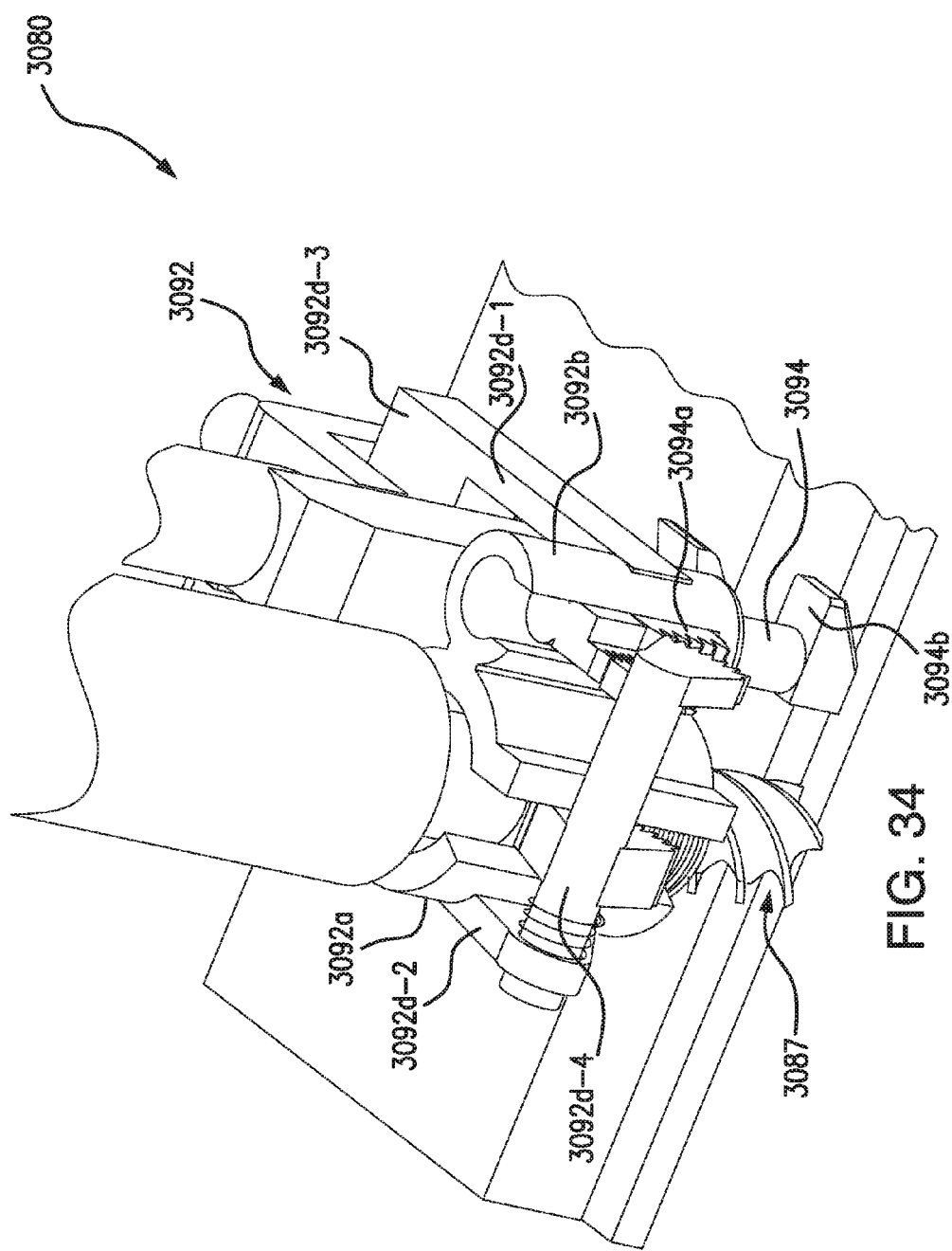
Figure 35:
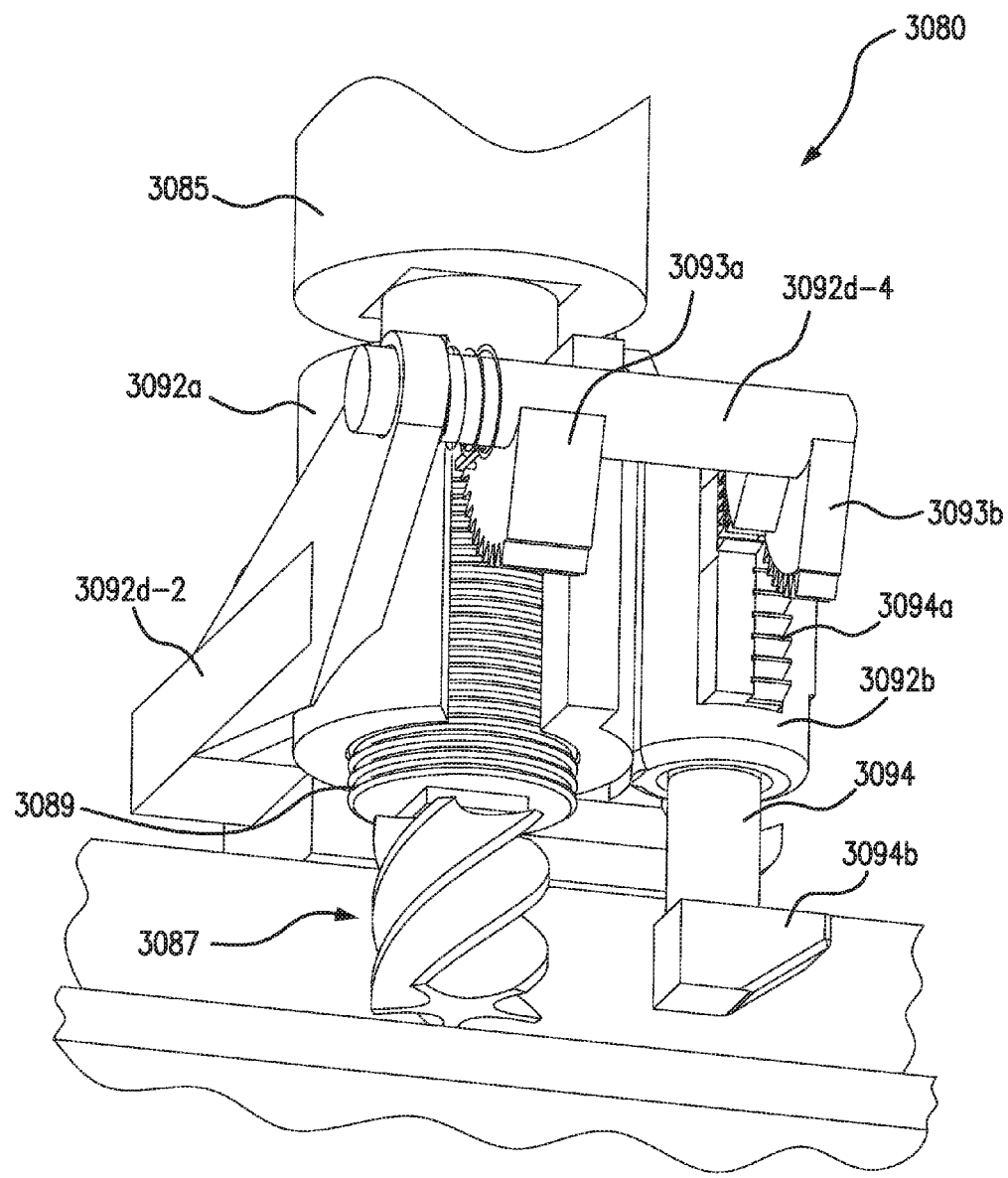
Figure 36:
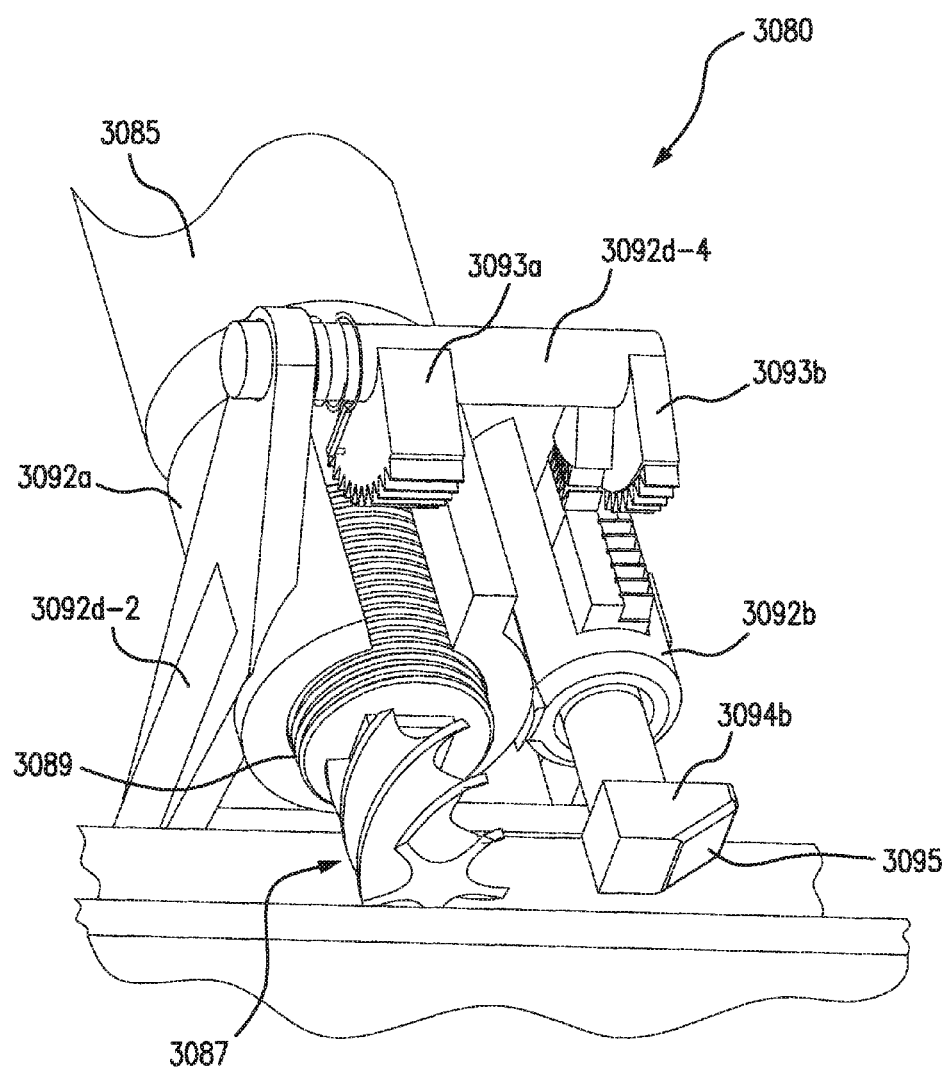

FIGS. 31 and 32 depict an enlarged view of the cutter 3000 (or the cutter 2260 in FIGS. 24-26). The cutter 3000 comprises a track engaging mechanism 3050 and a drill aligning mechanism 3080. The track engaging mechanism 3050 includes a pair of parallel plates 3002, 3004, a first gear 3005 between the plates 3002, 3004, a second gear 3010 connected to the first gear via a shaft 3012 and is adjacent to one of the plates (e.g., 3004), and an elastic protrusion 3015 located on another one of the plates (e.g., 3002). The plates 3002, 3004 include a space or distance corresponding to the width of the track 3250 and are configured to fit onto the track 3250. When the tracking engaging mechanism 3050 is installed on the track 3250, the first fear 3005 engages with the tooth of the track 3250. The wire 3070 (or the wire 2270 in FIGS. 25, 27, and 28) is positioned between the plate 3002 having the elastic protrusion 3015 and the track 3250. The wire 3082 may be in contact with the plate 3002, the track 3250, or both. When the wire 3070 is pulled by the tube, the release mechanism, or the wire storage, the track engaging mechanism 3050 is moved on the track 3050 via the first gear 3005. The rotation of the first gear 3005 also causes the second gear 3010 to rotate via the shaft 3012. The second gear 3010 is engaged with the drill aligning mechanism 3080, and the rotation of the second gear 3010 allows the drill aligning mechanism 3080 to remove tree bark and to move along the circumference of tree trunk.

The plate 3002 having the elastic protrusion 3015 is arranged to move between the track 3070 and the wheel (2245 in FIG. 30). The protrusion 3015 has a configuration and elasticity that that allows the cutter 3000 to move in one direction (first direction) without rotating the wheel and to move in another direction (second direction) that rotates the wheel. In one embodiment, the protrusion 3015 has a triangular configuration, preferably a right triangle. The protrusion 3015 is configured to allow the hypotenuse to contact the wheel first in the first direction and the side perpendicular to the plate 3002 (or the side not contacting the plate 3002) to contact the wheel first in the second direction. In the first direction, the protrusion enters the space between the wheel and the track 3250 and is pushed toward the plate 3002 by the wheel. In the second direction, the protrusion enters the space between the wheel and the track 3250 and the side perpendicular to the plate 3002 contacts a tooth of the wheel to rotate the wheel. The rotation of the wheel causes the rail to move upward to downward. The protrusion 3015 may have other configuration or shape to achieve this movement. The plate 3004 includes a plurality of teeth 3016 to engage with the gear 2265 or 2265a in FIGS. 27 and 28.

FIGS. 32-36 depict enlarged views of the drill aligning mechanism 3080. The mechanism 3080 comprises a first leg 3085 with one end attached to the track engaging mechanism 3050 and another end opposite to the one end attached to a drill bit 3087 and a second leg 3090 with one end attached to the track engaging mechanism 3050 and another end opposite to the one end attached to a drill adjuster 3092. The first leg includes a gear 3060 to engage with the gear 3010 attached to the plate 3004. Each leg 3085, 3090 may include one or more tubes and springs in sliding engagement (e.g., can be extended and retracted). The drill bit 3087 or the end of the first leg 3085 attaching to the drill bit 3087 includes a threaded region or a plurality of notches 3089. The drill adjuster 3092 includes a pair of tubes 3092a, 3092b with one configured to receive the drill bit 3087 and/or the first leg 3085 and another one configured to receive a third leg 3094, a bracket 3092a, a support 3092d holding the tubes to the bracket 3092a, and a control 3092e configured to adjust the height of the tubes 3092a, 3092b, the support 3092d, the first leg 3085, the drill bit 3087, the third leg 3094, or a combination thereof. The drill bit 3087 and/or the first leg 3085 and the third leg 3094 are slidable in their respective tubes. Each of the tubes 3092a, 3092b includes an opening to expose a portion of the drill bit 3087 and/or the first leg 3085 and the third leg 3094. In particular, it is the thread region or notches of the drill bit 3087 and/or the first leg 3085 and the third leg 3094 that are exposed (the third leg 3094 also includes a threaded region or a plurality of notches).

The support 3092d includes a pair of beams 3092d-1, 3092d-2 and a third beam 3092d-3 connecting the pair of beams. The tubes 3092a, 3092b are positioned between the pair of beams 3092d-1, 3092d-2. A portion of the bracket 3092c is between the support 3092d and the tubes 3092a, 3092b and between the pair of beams 3092d-1, 3092d-2. The control 3092e can be a switch, knob, or the like that may be operated by an user to adjust the height. The control 3092 includes the necessary hardware, such as shaft and spring, connected to the support 3092d so the operation of the control 3092 can maneuver the support 3092 vertically and maintain the support 3092d in the adjusted position. The support 3092d also includes a shaft 3092d-4 extending from one of the pair of beams (e.g., 3092d-2). The shaft 3092d-4 contains one or more first gears 3093a engaging the threaded region 3089 of the drill bit 3087 and/or the first leg 3085 and one or more second gears 3093b engaging the notches of the third leg 3094. Therefore, the control 3092e can also control the height of the first leg 3085, the drill bit 3087, and the third leg 3094. The opening on each tube allows the first gears 3093a and the second gears 3093b to contact their respective threaded region and notches. The size and number of the first gears 3093a and the second gears 3093b can depend on the amount of height the user wants to apply to each leg or drill bit upon operating the control 3092e. For example, when the user turns the control 3092e in one direction, that action may cause the third leg 3094 and the first leg 3085/the drill bit 3087 to move away from the tree, with the third leg 3094 being moved further away from the tree compared to the first leg 3085/the drill bit 3087 or vice versa. The first leg 3085/drill bit 3087 and the third leg 3094 may include one or more thread regions or one or more sets of notches to correspond to the different number of first or second gears. In one embodiment, the first gear 3093 includes one gear, the second gears 3093b includes two gears, and the one gear is larger each of the two gears. Larger means that the gear has more teeth, larger teeth height, larger spacing between the teeth, or a combination thereof.

The third leg 3094 includes a plurality of notches 3094a and a pad 3094b. The notches engage with the second gears 3093b so the height of the third leg 3094 is adjustable by the control 3092e. The pad 3094b operates similar pads 551c, 552b in FIG. 5a, 10 or pad 1705b in FIG. 17b and the function of the pad 3094b will not be repeated here. The pad 3094b, and pads 551c, 552b, and 1705b, may include a slanted surface 3095 to facilitate moving the pad 3094b and the drill bit 3087 from the area where the bark has been removed (already-cut area) to the area where the bark has not yet been removed (uncut area). The pad 3094b and the drill bit 3087 are moved onto an uncut area when the cutter completes cutting a portion of the bark through the rail 3350. The portion has a length corresponding to the length of the rail 3350. Upon completion, the cutter may be moved to the next portion where the bark needs to be removed The pad 3094b, and other pads, may include other surface corresponding to the shape of the incision on the trunk to bring the pad 3094b and the drill bit 3087 onto an uncut area.

When the cutter 3000 engages with the gear 2265 or 2265a in FIGS. 27-28, the third leg 3094, the drill bit 308, a portion of the bracket 3092, or a combination thereof is positioned on the plate 2290c in FIG. 28. The cutter 3000 and the rail may be configured such that the third leg 3094, the drill bit 308, a portion of the bracket 3092, or a combination thereof is positioned on the plate 2290c before, after, or simultaneously as the cutter 3000 engages with the gear 2265 or 2265a. The teeth 3016 engage with the gear 2265 or 2265a to rotate the gear 2265 or 2265a and to lift up the cutter 3000. The lifted up cutter 3000 will then return to the starting position (the end of the rail 2250 near the wire storage 2255). The cutter lifting device 2290 in FIGS. 27-28 allow the cutter to be returned to the starting portion smoothly without dragging against the surface of the tree.

The drill aligning mechanism 3080 may be replaced by the blade aligning mechanism 534 in FIG. 5 and vice versa in the tapping apparatus. The tapping apparatus 2200 is configured to spire along the tree trunk. Each of the beams 2220 and the rail 2205 (and the track 2250 in the rail) is also configured to spire along the tree trunk.

The system, apparatus, mounting structure, mechanism, and other components (e.g., leg, beam, bracket, tube, conduit, divider, etc.) discussed in this application may be made of metal, alloy, plastic, wood, composite, or a combination thereof. Other materials are also contemplated. In conjunction with the above disclosure, a person with ordinary skill in the art would understand the structures and shapes embodied by all these system and components. To the extent that their structures and shapes are not evident, the figures disclose their preferred structures and shapes.

The present invention contemplates a plant liquid tapping and collecting system. The system comprises a tapping apparatus configured to tap plant liquid and a collecting apparatus configured to collect plant liquid. The tapping apparatus can be mounted on a trunk of the plant and includes a blade. The tapping apparatus includes mechanisms (e.g., large and small tubes, a pin, a screw, a beam or leg, a wheel or gear, and other components) configured to position the blade in an incision on the trunk (or against the bottom of the incision). The mechanisms further allow manual distance and angle adjustment that can change the distance between the tip of the blade and the bottom of the incision (sometimes the user may not want the blade to touch against the bottom of the incision) and the angle in which the blade cuts the bark or other portion of the plant under the bark. The blade is configured to move at a slanted angle or in a path slanted at angle. The blade moves from an initial position (further from the ground) to an end position (closer to the ground). The tapping apparatus is configured to move the blade by a plurality of rails, one of which provides the force necessary to move the blade and two of which define the path in which the blade moves. The blade moves from an initial position (further from the ground) to an end position (closer to the ground) to remove a certain length (or area) of the bark (or other region under the bark). The blade is then returned to the initial position from the end position without cutting any portion of the plant or without touching the trunk. The returned position also corresponds to the starting position of the next area to be removed by the blade. The blade operates in this manner until a desired amount of bark has been removed or a desired amount of plant liquid has been collected.

The collecting apparatus is placed below the tapping apparatus. The collecting apparatus includes a slide positioned directly below the end position of the blade and a tube configured to receive tapped liquid. The slide has a first end adjacent to the plant and a second end adjacent to the tube. After the tapped liquid drips onto the slide from the plant through the first end, the tapped liquid drifts toward into the tube through the second end due to gravity and the slide positioned at a slanted angle. The tube has a length that can be routed through multiple plants and includes multiple sections with each section corresponding to each plant for storing liquid tapped from that plant. The tube is divided into multiple sections by a plurality of dividers.

In one embodiment, the operation of the tapping apparatus can be controlled by the movement of the collecting apparatus. The collecting apparatus is connected to an engine or motor that can rotate the tube around the plants and to pass through a container that stores all the tapped liquid in each section. The rotation movement can control the operation of the tapping apparatus. The tapping apparatus and the collecting apparatus are connected through two wires and a release mechanism. The force associated the rotation is transferred to the tapping apparatus through the wires and mechanism. The tapping apparatus depends on the transferred force to performs its function and the force generated from performing that function is then transferred to the tapping apparatus (or the mechanism) via the wires during or at the end of that performance to cause the collecting apparatus (or the mechanism) to execute a subsequent action. From these interactions, the blade can be moved between the initial position and the end position and to the next bark region to be removed after the current region is complete. The wires provide the necessary mechanical force to operate the tapping apparatus, release mechanism, and/or tube without conducting electricity. The wires are connected to the release mechanism that is installed on the collecting apparatus. When all or sufficient amount of the plant liquid is extracted or one or more of the sections in the tube are full, the tube is rotated by the engine to go through the container and to dispose the liquid in the section into the container. The dividers in the tube can be rigid (e.g., not bendable) or be configured to be bendable to facilitate the operation of the conduit. The conduit is a device used between the slide and the tube to transport the tapped liquid from the slide into the section. An electrical wire can be routed along the tube to provide electricity that may be required by the tapping apparatus, the collecting apparatus, and/or the release mechanism.

In one embodiment, the operation of the tapping apparatus can also be controlled by the movement of a separate mechanical wire or tube. The wire is routed along the tube and is connected to the engine and rotated by the engine. The tube having multiple section is not connected to and rotated by the engine. The tube remains stationary when the wire is rotated. The release mechanism is installed on the wire and connected to the tapping apparatus via the two wires. The interaction between the rotatable wire, the release mechanism, the two wires, and the tapping apparatus is similar to the interaction discussed in the above embodiment. The difference is that the interaction is now governed by the rotatable wire instead of the tube. The rotatable wire provides only mechanical force needed to operate the tapping apparatus, the collecting apparatus, and/or the release mechanism and it is not configured to provide electricity. An electrical wire is routed along the tube to provide electricity that may be required by the tapping apparatus, the collecting apparatus, and/or the release mechanism. The release mechanism includes a magnet to facilitate the operation of the release mechanism and the magnet can tighten or loosen the release mechanism on the rotatable wire when the electrical wire is turned on or off, respectively. The dividers in the tube can be configured to be maneuverable between different positions when a high pressure is and is not applied into the tube and the tube is connected to a pressure generator. When the pressure generator produces a pressure (e.g., compressed air) in the tube, the force is sufficient to push the tapped liquid in one section into the next section or the divider from a closed position to an open position so the tapped liquid in one section will flow into the next section. The pressure is applied until all the tapped liquid in the tube is ejected from the tube from one end or an opening of the tube that is aimed toward the container. When no pressure is applied, the dividers stay in the close position so that the tapped liquid collected in one section does not flow into another section. The divider can also be configured to close the opening on the tube for receiving the tapped liquid from the slide when the divider is moved to the opening position. In this embodiment, the conduit can be eliminated.

In some embodiments, the tapping apparatus can be equipped with a motor that controls the operation of the tapping apparatus. In this way, the two wires and the release mechanism are unnecessary and the tapping apparatus and the collected apparatus do not need to depend on each other's movement to perform their respective function. The tube can be connected to the pressure generator and the dividers can be configured to move to a different position in response to the applied pressure so that all the collected liquid can be transported to the container as described above. No tube or wire is rotated. The motor can be installed directly on the tapping apparatus or on the ground and be connected to the tapping apparatus.

Rod, tube, shaft and other similar terms used in this disclosure preferably have a cylindrical shape but they may also have other shapes.

The words "may" and "can" are used in the present description to indicate that this is one embodiment but the description should not be understood to be the only embodiment.

The terms "connect", "connected," "connecting," and other variations may refer to either direct or indirect connection. Direct connection may refer to that the components (e.g., beams, legs, rings, etc.) of the apparatuses are physically contacting each other. Indirect direction may refer to that the components of the apparatuses are connected to each other through one or more intermediary mechanisms. In a preferred embodiment, these terms refer to direct connection Threaded members and wheels may be substituted by other devices as long as they can facilitate the movements or achieve the functions described above.

The description "the end slanted higher from the ground" may also mean "the end slanted further from the ground," and the description "the end slanted lower from the ground may also mean "the end slanted closer to the ground."

In some embodiments, and with appropriate designs and configurations, each of the tapping apparatus and the collecting apparatus may be used individually without the other apparatus, and the other apparatus may be replaced by another device. For example, referring to FIG. 1, the tapping apparatus 105 may be used without the collecting apparatus 110 and the collecting apparatus 110 may be replaced by a bowl. For another example, the collecting apparatus 110 may be used without the tapping apparatus 105 and the tapping apparatus 105 may be replaced by a knife.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A system for tapping and collecting liquid from trees or plants, the system comprising:
   a tapping apparatus comprising:
      a rail supporting a track;
      a drill bit that moves between one end of the rail to another end of the rail to remove tree bark during movement, the track including a plurality of teeth;

a mounting structure configured to hold the rail and connect the tapping apparatus to a tree or plant, wherein the mounting structure includes;

a pair of beams sandwiching the rail;

a first ring with a first beam;

a second ring with a second beam;

multiple rods extending between the pair of beams and through the rail; wherein the first ring with the first beam is connected to one of the pair of beams and the second ring with the second beam is connected to another one of the pair of beams; and a track engaging mechanism connecting the drill bit to the track, the track engaging mechanism including a pair of parallel plates, a gear connecting the pair of parallel plates, and the plates and the gear including a space to accommodate the track.

2. The system according to claim 1, wherein one of the multiple rods is a screw or other external male thread and is oriented parallel to other rods in the multiple rods.

3. The system according to claim 2, wherein the one of the multiple rods includes a wheel adjacent to the track, the wheel and track provides a space in between allowing one of the plates to pass through while the drill bit is moved between one end of the rail to another end of the rail.

4. The system according to claim 1, wherein another one of the gears is connected a plate via one or more tubes.

5. The system according to claim 4, wherein the plate engages with the drill bit when the drill bit is directed to another end of the rail.

6. The system according to claim 5, wherein another one of the gears is connected to a third plate via one or more tubes.

7. The system according to claim 6, wherein the third plate engages with the drill bit when the drill bit is directed to another end of the rail.

8. The system according to claim 1, wherein the drill bit and the track engaging mechanism are connected by a drill aligning mechanism, the drill aligning mechanism includes a first leg with one end attached to the track engaging mechanism and another end attached to the drill bit and a second leg with one end attached to the track engaging mechanism and another end attached to a device configured to adjust height of the drill bit.

9. The system according to claim 1, further comprising a collecting apparatus positioned below the tapping apparatus for collecting rubber that exudes from a cut tree or plant, wherein the collecting apparatus comprises a slide and a tube having an opening and a divider that separates the tube into multiple sections.

10. The system according to claim 9, wherein the opening is aligned with the tapping apparatus to receive exuded rubber.

11. The system according to claim 10, wherein the divider is movable within the tube between a closed position and an open position.

12. The system according to claim 11, wherein the divider is moved away from the opening in the closed position.

13. The system according to claim 11, wherein the divider is moved toward the opening in the open position.

14. The system according to claim 11, wherein the divider is movable between the closed position and the open position in response to operation of a pressure generator.

15. The system according to claim 11, wherein the divider further includes a protrusion that blocks exuded rubber from entering the tube when the divider is in the open position.

16. The system according to claim 9, further comprises a wire connecting the tapping apparatus and the collecting apparatus.

17. The system according to claim 16, wherein the wire controls the movement of the drill bit.

18. The system according to claim 1, further comprises a wire configured to physically pull the drill bit from the one end of the rail to the other end of the rail.

* * * * *